United States Patent
Nguyen et al.

(10) Patent No.: US 6,983,232 B2
(45) Date of Patent: *Jan. 3, 2006

(54) ELECTRONICS ASSEMBLY SYSTEMS CUSTOMER BENEFIT MODELING TOOLS AND METHODS

(75) Inventors: Tuan Nguyen, Duluth, GA (US); Anthony Peter Duck, Austin, TX (US); Ian Rawles, Roswell, GA (US); Thomas Mair, Neuried (DE); Robert Gray, Buford, GA (US)

(73) Assignee: Siemens Dematic Electronic Assembly Systems Inc., Norcross, GA (US)

( * ) Notice: Subject to any disclaimer, the term of this patent is extended or adjusted under 35 U.S.C. 154(b) by 683 days.

This patent is subject to a terminal disclaimer.

(21) Appl. No.: 09/873,021

(22) Filed: Jun. 1, 2001

(65) Prior Publication Data

US 2002/0107677 A1 Aug. 8, 2002

Related U.S. Application Data

(60) Provisional application No. 60/280,679, filed on Mar. 30, 2001, provisional application No. 60/208,664, filed on Jun. 1, 2000.

(51) Int. Cl.
*G06F 7/48* (2006.01)
*G06F 9/45* (2006.01)

(52) U.S. Cl. .............................. 703/7; 700/32; 700/121

(58) Field of Classification Search ................. 703/6, 703/7, 14, 22; 717/135; 702/183; 700/29–32, 700/103, 121

See application file for complete search history.

(56) References Cited

U.S. PATENT DOCUMENTS

| 4,796,194 A | * | 1/1989 | Atherton | 700/103 |
| 5,280,425 A | | 1/1994 | Hogge | 364/402 |
| 5,402,367 A | | 3/1995 | Sullivan et al. | 364/578 |
| 5,452,218 A | | 9/1995 | Tucker et al. | 364/468 |
| 5,913,051 A | | 6/1999 | Leeke | 395/500 |
| 6,556,950 B1 | * | 4/2003 | Schwenke et al. | 702/183 |
| 6,618,856 B2 | * | 9/2003 | Coburn et al. | 717/135 |

FOREIGN PATENT DOCUMENTS

| GB | 0 811 941 A2 | 10/1997 |
| GB | 0 840 187 A2 | 6/1998 |

OTHER PUBLICATIONS

Herrmann et al., J.W. Evaluating the Impact of Process Changes on Cluster Tool Performance, IEEE Transactions on Semiconductor Manufacturing, vol. 13, No. 2, May 2000, pp. 181-192.*

(Continued)

*Primary Examiner*—Russell Frejd

(57) ABSTRACT

Methods and tools for quickly and accurately performing complex customer benefit modeling for an electronic components assembly system are disclosed. In one embodiment, predefined user interfaces allow a consultant, customers, salespersons, or line designers to input a line configuration by selecting from a list predefined objects that represent specific line components. In addition, the user inputs other line configuration data specific to the line being configured. The information contained in the user interface is extracted for use a discrete event simulator. Templates for simulation objects may be created in advance and populated with data from the input interface. A simulation is built and run. Simulation results may be exported to an output means, which may allow for custom generated reports. The reporting means may include a means for allowing customer specific information and data to be inputted.

19 Claims, 54 Drawing Sheets

OTHER PUBLICATIONS

Andersson et al., M. A Simulation Based Decision Support Approach for Operational Capacity Planning in a Customer Order Driven Assembly Line, IEEE, Simulation Conference Proceedings, vol. 2, Dec. 1998, pp. 935-941.*

Springfield et al., K.G. Analysis of Electronics Assembly Operations: Longbow Hellfire Missile Power Supply, IEEE, Proceedings of the 1999 Winter Simulation Conference, vol. 1, Dec. 1999, pp. 689-693.*

Brennan et al., R.W. Stochastic Optimization Applied to a Manufacturing System Operation Problem, IEEE, Proceedings of the 1995 Winter Simulation Conference, Dec. 1995, pp. 857-864.*

Herrmann et al., J.W. Understanding the Impact of Equipment and Process Changes with a Heterogeneous Semiconductor Manufacturing Simulation Environment, IEEE, Proceedings of the 2000 Winter Simulation Conference, vol. 2, Dec. 2000, pp. 1491-1498.*

Worhach et al., P. Integration of Environmental Factors in Process Modeling for Printed Circuit Board Manufacturing, Part I: Assembly, Proceedings of the 1997 IEEE Int. Symposium on Electronics and the Environment, May 1997, pp. 218-225.*

Dance et al., D.L. Modeling the Cost of Ownership of Assembly and Inspection, IEEE Transactions on Components, Packaging, and Manufacturing Technology-Part C, vol. 19, No. 1, Jan. 1996, pp. 57-60.*

Varney, S.E. Arm Your Salesforce with the Web, Datamation, Oct. 1996, pp. 72-74.*

Przekwas et al., A.J. A Virtual Prototyping Environment for Multi-Scale, Multi-Disciplinary Simulation of Electronics Packaging of MCMs, IEEE, 1996 Intersociety Conference on Thermal Phenomena, pp. 352-358.*

"A Comparison of Modeling Paradigms for Manufacturing Line": Robert de Souza and Richard Huynh: School of Mechanical & Production Engineering; Singapore: 1996, pp. 1253-1258.

"Incorporating Financial and Ergonomic Considerations into Models of Manufacturing Systems": Henry Herper & Thomas Kagerl; Otto-von-Guericke University of Magdeburg, Germany: 1996, p. 1149-1154.

"Simulation von Bestuckungs-automaten in der Elektronikmontage": Hans-Otto Gunther, Andreas Fohrenbach und Martin Grunow, Berlin: Simulation: 1998, pp. 255-258.

* cited by examiner

Customer Benefit Model

Files
- Project Name: 052201e    Scenario #
- CBM Directory: C:\IanRawlesProjects\CBM\latestthomas2
- CBM DE Directory: C:\IanRawlesProjects\CBM\latestthomas2\So
- CBM Project Directory: C:\IanRawlesProjects\CBM\latestthomas2\projects\052201d
- Simulation Directory: C:\program files\simulation2000

Time to run Simulation (days): 1

Workflow

- Create Project
- Shift Data
- Line Configuration
- Board Data
- Create Simulation
- Save and Exit Build your project and set up the directory for experiments

FIG. 2

|   | W | X | Y | Z | AA | AB |
|---|---|---|---|---|---|---|
| 1 | | | | | | |
| 2 | | C:\IanRawles\Projects\CBM\latestthomas2 | | | | |
| 3 | | C:\IanRawles\Projects\CBM\latestthomas2\So | | | | |
| 4 | | C:\IanRawles\Projects\CBM\latestthomas2\projects\l052201d | | | | |

FIG. 2A

Shift Schedule — Main

| | | SHIFT 1 | | | | | | | SHIFT 2 | | | | | | |
|---|---|---|---|---|---|---|---|---|---|---|---|---|---|---|---|
| | shift start | break 1 start | break 1 end | lunch start | lunch end | break 2 start | break 2 end | shift end | shift start | break1 start | break1 end | lunch start | lunch end | break2 start | break2 end | shift end |
| Monday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Tuesday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Wednesday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Thursday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Friday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Saturday | 7:00 | 7:00 | 7:00 | 12:00 | 13:00 | 13:00 | 13:00 | 15:00 | 15:00 | 15:00 | 15:00 | 20:00 | 21:00 | 21:00 | 21:00 | 23:00 |
| Sunday | 7:00 | 7:00 | 7:00 | 12:00 | 13:00 | 13:00 | 13:00 | 15:00 | not working | | | | | | | |

| | |
|---|---|
| shifts apply for model | 0 |
| initial Offset | 1 |
| Only lunch break applies | 0 |
| Breaks apply for machines | 0 |
| Weeks per year | 50 |
| Days off per year | 10 |
| Hours per day | 24.00 |
| Hours per day/average | 23.31 |
| Hours per week | 168.00 |
| Hours per week/average | 153.20 |
| Hours per year | 8160.00 |

| # | shift start | break1 start | break1 end | lunch start | lunch end | break2 start | break2 end | shift end | shift start | break1 start | break1 end | lunch start | lunch end | break2 start | break2 end | shift end |
|---|---|---|---|---|---|---|---|---|---|---|---|---|---|---|---|---|
| 1 | 6:00 | 8:00 | 8:15 | 10:00 | 10:30 | | | 14:00 | 14:00 | 16:00 | 16:15 | 18:00 | 18:30 | | | 22:00 |

FIG. 4

|    | A | B | C | D  | E    | F    | G    | H     | I     | J     | K     | L     | M     | N     | O     | P     | Q     | R    | S    | T     | U     |
|----|---|---|---|----|------|------|------|-------|-------|-------|-------|-------|-------|-------|-------|-------|-------|------|------|-------|-------|
| 31 |   |   |   |    |      |      |      |       |       |       |       |       |       |       |       |       |       |      |      |       |       |
| 32 |   |   |   | 12 | 7:00 |      |      | 12:00 |       | 13:00 |       | 15:00 | 15:00 |       |       | 20:00 | 21:00 |      |      | 23:00 | 23:00 |
| 33 |   |   |   | 13 | 7:00 | 8:00 | 8:15 | 12:00 | 12:30 |       | 15:00 | 15:15 | 19:30 | 20:00 | 20:15 | 0:00  | 0:30  | 3:00 | 3:15 | 7:00  |       |
| 34 |   |   |   | 14 | 7:00 |      |      | 12:00 |       | 13:00 |       | 15:00 | 15:00 |       |       | 20:00 | 21:00 |      |      | 23:00 | 23:00 |
| 35 |   |   |   | 15 |      |      |      |       |       |       |       |       |       |       |       |       |       |      |      |       |       |
| 36 |   |   |   | 16 |      |      |      |       |       |       |       |       |       |       |       |       |       |      |      |       |       |
| 37 |   |   |   | 17 |      |      |      |       |       |       |       |       |       |       |       |       |       |      |      |       |       |
| 38 |   |   |   | 18 |      |      |      |       |       |       |       |       |       |       |       |       |       |      |      |       |       |
| 39 |   |   |   | 19 |      |      |      |       |       |       |       |       |       |       |       |       |       |      |      |       |       |
| 40 |   |   |   | 20 |      |      |      |       |       |       |       |       |       |       |       |       |       |      |      |       |       |
| 41 |   |   |   | 21 |      |      |      |       |       |       |       |       |       |       |       |       |       |      |      |       |       |
| 42 |   |   |   | 22 |      |      |      |       |       |       |       |       |       |       |       |       |       |      |      |       |       |

| | V | W | X | Y | Z | AA | AB | AC | AD | AE | AF | AG | AH | AI | AJ | AK | AL | AM | AN | AO |
|---|---|---|---|---|---|---|---|---|---|---|---|---|---|---|---|---|---|---|---|---|
| 31 | | | | | | | | | | | | | | | | | | | | |
| 32 | | | 4:00 | 5:00 | | | 7:00 | →Customer 1 | | | | | | | | | | | | |
| 33 | | | | | | | | →Customer 2 | | | | | | | | | | | | |
| 34 | | | 4:00 | 5:00 | | | 7:00 | →Customer 3 | | | | | | | | | | | | |
| 35 | | | | | | | | →Customer 4 | | | | | | | | | | | | |
| 36 | | | | | | | | | | | | | | | | | | | | |
| 37 | | | | | | | | | | | | | | | | | | | | |
| 38 | | | | | | | | | | | | | | | | | | | | |
| 39 | | | | | | | | | | | | | | | | | | | | |
| 40 | | | | | | | | | | | | | | | | | | | | |
| 41 | | | | | | | | | | | | | | | | | | | | |
| 42 | | | | | | | | | | | | | | | | | | | | |

| | T | U | V | W | X | Y | Z | AA | AB | AC | AD | AE | AF | AG |
|---|---|---|---|---|---|---|---|---|---|---|---|---|---|---|
| 1 | | | long term | | | | | | | | | | | |
| 2 | e (h /min) | | year | | failure (h /min) | | | grafic | | Witness Module Single Lane | Witness Module Dual Lane | | | |
| 3 | | | | | level 2 | | level 3 | | | | | | | |
| 4 | MTTM | MTBM | MTTM | MTBF | MTTR | MTBF | MTTR | length | offset | | | Initial Position | | |
| 5 | | 8160 | | | | | | 100 | 0 | Buffers | 0 | B1 | | |
| 9 | 0 | 8160 | 0 | 0 | 0 | 0 | 0 | 0 | 0 | Conv2_1 | Conv2_2 | conv5_2001 | | |
| 10 | 0 | | 0 | 0 | 0 | 0 | 0 | | | | | | | |
| 11 | | | | | | | | | | | | | | |
| 12 | | | | | | | | | | | | | | |
| 13 | | | | | | | | | | | | | | |
| 14 | | | | | | | | | | | | | | |
| 15 | | | | | | | | | | | | | | |
| 16 | | | | | | | | | | | | | | |
| 17 | | | | | | | | | | | | | | |
| 18 | | | | | | | | | | | | | | |
| 19 | | | | | | | | | | | | | | |
| 20 | | | | | | | | | | | | | | |
| 21 | | | | | | | | | | | | | | |
| 22 | | | | | | | | | | | | | | |
| 23 | | | | | | | | | | | | | | |
| 24 | | | | | | | | | | | | | | |
| 25 | | | | | | | | | | | | | | |
| 26 | | | | | | | | | | | | | | |
| 27 | | | | | | | | | | | | | | |
| 28 | | | | | | | | | | | | | | |
| 29 | | | | | | | | | | | | | | |
| 30 | | | | | | | | | | | | | | |
| 31 | | | | | | | | | | | | | | |
| 32 | | | | | | | | | | | | | | |
| 33 | | | | | | | | | | | | | | |
| 34 | | | | | | | | | | | | | | |

| | AU | AV | AW | AX | AY | AZ |
|---|---|---|---|---|---|---|
| 1 | | | | Bare Board Loader | | |
| 2 | | | | Buffer | | |
| 3 | | | | Conveyor 1060 | | |
| 4 | | | | Conveyor 1590 | | |
| 5 | | | | Conveyor 2380 | | |
| 9 | | | | F4 x 2 / SPL | | |
| 10 | | | | F4 x 3 / SPL | | |
| 11 | | | | F5 | | |
| 12 | | | | F5 x 2 / SPL | | |
| 13 | | | | F5 x 3 / SPL | | |
| 14 | | | | Flip Station 180 | | |
| 15 | | | | HS-50 | | |
| 16 | | | | HS-50 x 2 / SPL | | |
| 17 | | | | HS-50 x 3 / SPL | | |
| 18 | | | | Last Lift | | |
| 19 | | | | Magazine Buffer MB100 | | |
| 20 | | | | Magazine Buffer MB50 | | |
| 21 | | | | Magazine Loader ML02 | | |
| 22 | | | | Magazine Loader ML05 | | |
| 23 | | | | Magazine Unloader MIJ02 | | |
| 24 | | | | Magazine Unloader MIJ05 | | |
| 25 | | | | Printer pro-flow | | |
| 26 | | | | Printer pro-flow temp control | | |
| 27 | | | | Printer squegee operation | | |
| 28 | | | | Printer squegee operation temp control | | |
| 29 | | | | RX 261 | | |
| 30 | | | | RX 262 | | |
| 31 | | | | RX 331 | | |
| 32 | | | | RX 332 | | |
| 33 | | | | RX 411 | | |
| 34 | | | | RX 412 | | |

FIG. 5B

| | AU | AV | AW | AX | AY | AZ |
|---|---|---|---|---|---|---|
| 35 | | | | | | |
| 36 | | | | S-20 | | |
| 37 | | | | S-23 | | |
| 38 | | | | S-25 | | |
| 39 | | | | Shuttle-1 lane to 2 lane | | |
| 40 | | | | Shuttle-2 lane to 1 lane | | |
| 41 | | | | Telescopic Gate TG | | |
| | | | | Turn Station TS | | |

| | A | B | C | D | E | F | G | H | I | J | K | L | M | N | O | P | Q | R |
|---|---|---|---|---|---|---|---|---|---|---|---|---|---|---|---|---|---|---|
| 1 | Database | | Line | | | assists (min/min) | | failure (h/min) | | | | | | shift | | weekly | | maintenance mo |
| 2 | | | | | | MTBF | MTTR | level 1 MTBF | MTTR | level 2 MTBF | MTTR | | | MTBM | MTTM | MTBM | MTTM | MTBM |
| 3 | | 1 | | | | | | | | | | | | | | | | |
| 4 | | 2 | | | | | | | | | | | | | | | | |
| 5 | | 3 | | | | | | | | | | | | | | 163.20 | | 680.00 |
| 6 | | 4 | | | | | | | | | | | | | | 163.20 | | 680.00 |
| 7 | | 5 | | | | | | | | | | | | | | 163.20 | | 680.00 |
| 8 | | 6 | | | | | | | | | | | | | | 163.20 | | 680.00 |
| 9 | | 7 | | | | | | | | | | | | | | 163.20 | | 680.00 |
| 10 | | 8 | | | | | | | | | | | | | | 163.20 | | 680.00 |
| 11 | | 9 | | | | | | | | | | | | | | 163.20 | | 680.00 |
| 12 | | 10 | | | | | | | | | | | | | | 163.20 | | 680.00 |
| 13 | | 11 | | | | | | | | | | | | | | 163.20 | | 680.00 |
| 14 | | 12 | | | | | | | | | | | | | | 163.20 | | 680.00 |
| 15 | | 13 | | | | | | | | | | | | | | 163.20 | | 680.00 |
| 16 | | 14 | | | | | | | | | | | | | | 163.20 | | 680.00 |
| 17 | | 15 | | | | | | | | | | | | | | 163.20 | | 680.00 |
| 18 | | 16 | | | | | | | | | | | | | | 163.20 | | 680.00 |
| 19 | | 17 | | | | | | | | | | | | | | 163.20 | | 680.00 |
| 20 | | 18 | | | | | | | | | | | | | | 163.20 | | 680.00 |
| 21 | | 19 | | | | | | | | | | | | | | 163.20 | | 680.00 |
| 22 | | 20 | | | | | | | | | | | | | | 163.20 | | 680.00 |
| 23 | | | | | | | | | | | | | | | | | | |
| 24 | | | | | | | | | | | | | | | | | | |
| 25 | Bare Board Loader | 7580 | | | | | | | | | | | | | | 163.20 | | 680.00 |
| 26 | Buffer | 7300 | 1 | | 0 | 60 | 1 | | | | | | | | | 163.20 | | 680.00 |
| 27 | Conveyor 1060 | 7511 | 0 | | 0 | 60 | 1 | | | | | | | | | 163.20 | | 680.00 |
| 28 | Conveyor 1590 | 7521 | 1 | | 0 | 60 | 1 | | | | | | | | | 163.20 | | 680.00 |
| 29 | Conveyor 2380 | 7531 | 1 | | 0 | 60 | 1 | | | | | | | | | 163.20 | | 680.00 |
| 30 | Conveyor 530 | 7501 | 1 | | 0 | 60 | 1 | | | | | | | | | 163.20 | | 680.00 |
| 31 | Conveyor 790 | 7541 | 1 | | 0 | 60 | 1 | | | | | | | | | 163.20 | | 680.00 |
| 32 | F4 | 1040 | 1 | | | | | | | | | | | | | | | |

| | A | B | C | D | E | F | G | H | I | J | K | L | M | N | O | P | Q | R |
|---|---|---|---|---|---|---|---|---|---|---|---|---|---|---|---|---|---|---|
| 33 | F4 x 2/SPL | 1042 | | | 2 | 60 | 1 | | | | | | 450 | | | 163.20 | | 680.00 |
| 34 | F4 x 3SPL | 1043 | | | 3 | 60 | 1 | | | | | | 875 | | | 163.20 | | 680.00 |
| 35 | F5 | 1050 | 1 | 1 | 1 | 60 | 1 | | | | | | 200 | | | 163.20 | | 680.00 |
| 36 | F5 x 2/SPL | 1052 | 1 | 1 | 2 | 60 | 1 | | | | | | 450 | | | 163.20 | | 680.00 |
| 37 | F5 x 3/SPL | 1053 | 1 | 1 | 3 | 60 | 1 | | | | | | 875 | | | 163.20 | | 680.00 |
| 38 | Flip Station 180 | 7580 | 1 | 1 | 0 | 60 | 1 | | | | | | 200 | | | 163.20 | | 680.00 |
| 39 | HS-50 | 1500 | 1 | 1 | 2 | 60 | 1 | | | | | | 400 | | | 163.20 | | 680.00 |
| 40 | HS-50 x 2/SPL | 1502 | 1 | 1 | 4 | 60 | 1 | | | | | | 850 | | | 163.20 | | 680.00 |
| 41 | HS-50 x 3/SPL | 1503 | 1 | 1 | 6 | 60 | 1 | | | | | | 1250 | | | 163.20 | | 680.00 |
| 42 | Last Lift | 7500 | 1 | 0 | 0 | 60 | 1 | | | | | | 700 | | | 163.20 | | 680.00 |
| 43 | Magazine Buffer MB100 | 7320 | 0 | 0 | 0 | 60 | 1 | | | | | | 100 | | | 163.20 | | 680.00 |
| 44 | Magazine Buffer MB50 | 7310 | 0 | 0 | 0 | 60 | 1 | | | | | | 100 | | | 163.20 | | 680.00 |
| 45 | Magazine Loader ML02 | 7600 | 1 | 1 | 0 | 60 | 1 | | | | | | 200 | | | 163.20 | | 680.00 |
| 46 | Magazine Loader ML05 | 7610 | 1 | 1 | 0 | 60 | 1 | | | | | | 200 | | | 163.20 | | 680.00 |
| 47 | Magazine Unloader MU02 | 7601 | 1 | 1 | 0 | 60 | 1 | | | | | | 200 | | | 163.20 | | 680.00 |
| 48 | Magazine Unloader MU05 | 7611 | 1 | 1 | 0 | 60 | 1 | | | | | | 200 | | | 163.20 | | 680.00 |
| 49 | Printer pro-flow | 9003 | 1 | 1 | 0 | 60 | 1 | | | | | | 200 | | | 163.20 | | 680.00 |
| 50 | Printer pro-flow temp control | 9004 | 1 | 1 | 1 | 60 | 1 | | | | | | 200 | | | 163.20 | | 680.00 |
| 51 | Printer squeegee operation | 9001 | 1 | 1 | 1 | 60 | 1 | | | | | | 200 | | | 163.20 | | 680.00 |
| 52 | Printer squeegee operation temp control | 9002 | 1 | 1 | 1 | 60 | 1 | | | | | | 200 | | | 163.20 | | 680.00 |
| 53 | RX 261 | 8001 | 1 | 1 | 1 | 60 | 1 | | | | | | 700 | | | 163.20 | | 680.00 |
| 54 | RX 262 | 8002 | 1 | 1 | 1 | 60 | 1 | | | | | | 700 | | | 163.20 | | 680.00 |
| 55 | RX 331 | 8003 | 1 | 1 | 1 | 60 | 1 | | | | | | 700 | | | 163.20 | | 680.00 |
| 56 | RX 332 | 8004 | 1 | 1 | 1 | 60 | 1 | | | | | | 700 | | | 163.20 | | 680.00 |
| 57 | RX 411 | 8005 | 1 | 1 | 1 | 60 | 1 | | | | | | 700 | | | 163.20 | | 680.00 |
| 58 | RX 412 | 8006 | 1 | 1 | 1 | 60 | 1 | | | | | | 700 | | | 163.20 | | 680.00 |
| 59 | S-20 | 1200 | 1 | 1 | 1 | 60 | 1 | | | | | | 200 | | | 163.20 | | 680.00 |
| 60 | S-23 | 1230 | 1 | 1 | 1 | 60 | 1 | | | | | | 200 | | | 163.20 | | 680.00 |
| 61 | S-25 | 1250 | 1 | 1 | 1 | 60 | 1 | | | | | | 200 | | | 163.20 | | 680.00 |
| 62 | Shuttle - 1 lane to 2 lane | 7100 | 0 | 0 | 0 | 60 | 1 | | | | | | 100 | | | 163.20 | | 680.00 |
| 63 | Shuttle - 2 lane to 1 lane | 7200 | 0 | 0 | 0 | 60 | 1 | | | | | | 100 | | | 163.20 | | 680.00 |
| 64 | Telescopic Gate TG | 7550 | 1 | 1 | 0 | 60 | 1 | | | | | | 150 | | | 163.20 | | 680.00 |
| 65 | Turn Station TS | 7570 | 1 | 1 | 0 | 60 | 1 | | | | | | 200 | | | 163.20 | | 680.00 |
| 66 | | | | | | | | | | | | | | | | | | |
| 67 | | | | | | | | | | | | | | | | | | |
| 68 | | | | | | | | | | | | | | | | | | |

FIG. 7A

| | A | B | C | D | E | F | G | H | I | J | K | L | M | N | O | P | Q | R |
|---|---|---|---|---|---|---|---|---|---|---|---|---|---|---|---|---|---|---|
| 33 | F4 x 2 / SPL | 1042 | 1 | 1 | 2 | 60 | 1 | | | | | | | | | 163.20 | | 680.00 |
| 34 | F4 x 3 / SPL | 1043 | 1 | 1 | 3 | 60 | 1 | | | | | | | | | 163.20 | | 680.00 |
| 35 | F5 | 1050 | 1 | 1 | 1 | 60 | 1 | | | | | | | | | 163.20 | | 680.00 |
| 36 | F5 x 2 / SPL | 1052 | 1 | 1 | 2 | 60 | 1 | | | | | | | | | 163.20 | | 680.00 |
| 37 | F5 x 3 / SPL | 1053 | 1 | 1 | 3 | 60 | 1 | | | | | | | | | 163.20 | | 680.00 |
| 38 | Flip Station 180 | 7560 | 1 | 1 | 0 | 60 | 1 | | | | | | | | | 163.20 | | 680.00 |
| 39 | HS-50 | 1500 | 1 | 1 | 1 | 60 | 1 | | | | | | | | | 163.20 | | 680.00 |
| 40 | HS-50 x 2 / SPL | 1502 | 1 | 1 | 2 | 60 | 1 | | | | | | | | | 163.20 | | 680.00 |
| 41 | HS-50 x 3 / SPL | 1503 | 1 | 1 | 3 | 60 | 1 | | | | | | | | | 163.20 | | 680.00 |
| 42 | Last Lift | 7500 | 1 | 1 | 0 | 60 | 1 | | | | | | | | | 163.20 | | 680.00 |
| 43 | Magazine Buffer MB100 | 7320 | 0 | 0 | 4 | 60 | 1 | | | | | | | | | 163.20 | | 680.00 |
| 44 | Magazine Buffer MB50 | 7310 | 0 | 0 | 6 | 60 | 1 | | | | | | | | | 163.20 | | 680.00 |
| 45 | Magazine Loader ML02 | 7600 | 1 | 1 | 0 | 60 | 1 | | | | | | | | | 163.20 | | 680.00 |
| 46 | Magazine Loader ML05 | 7610 | 1 | 1 | 0 | 60 | 1 | | | | | | | | | 163.20 | | 680.00 |
| 47 | Magazine Unloader MU02 | 7601 | 1 | 1 | 0 | 60 | 1 | | | | | | | | | 163.20 | | 680.00 |
| 48 | Magazine Unloader MU05 | 7611 | 1 | 1 | 0 | 60 | 1 | | | | | | | | | 163.20 | | 680.00 |
| 49 | Printer pro-flow | 9003 | 1 | 1 | 1 | 60 | 1 | | | | | | | | | 163.20 | | 680.00 |
| 50 | Printer pro-flow temp control | 9004 | 1 | 1 | 1 | 60 | 1 | | | | | | | | | 163.20 | | 680.00 |
| 51 | Printer squegee operation | 9001 | 1 | 1 | 1 | 60 | 1 | | | | | | | | | 163.20 | | 680.00 |
| 52 | Printer squegee operation temp control | 9002 | 1 | 1 | 1 | 60 | 1 | | | | | | | | | 163.20 | | 680.00 |
| 53 | RX 261 | 8001 | 1 | 1 | 1 | 60 | 1 | | | | | | | | | 163.20 | | 680.00 |
| 54 | RX 262 | 8002 | 1 | 1 | 1 | 60 | 1 | | | | | | | | | 163.20 | | 680.00 |
| 55 | RX 331 | 8003 | 1 | 1 | 1 | 60 | 1 | | | | | | | | | 163.20 | | 680.00 |
| 56 | RX 332 | 8004 | 1 | 1 | 1 | 60 | 1 | | | | | | | | | 163.20 | | 680.00 |
| 57 | RX 411 | 8005 | 1 | 1 | 1 | 60 | 1 | | | | | | | | | 163.20 | | 680.00 |
| 58 | RX 412 | 8006 | 1 | 1 | 1 | 60 | 1 | | | | | | | | | 163.20 | | 680.00 |
| 59 | S-20 | 1200 | 1 | 1 | 1 | 60 | 1 | | | | | | | | | 163.20 | | 680.00 |
| 60 | S-23 | 1230 | 0 | 0 | 0 | 60 | 1 | | | | | | | | | 163.20 | | 680.00 |
| 61 | S-25 | 1250 | 1 | 1 | 0 | 60 | 1 | | | | | | | | | 163.20 | | 680.00 |
| 62 | Shuttle - 1 lane to 2 lane | 7100 | 0 | 0 | 0 | 60 | 1 | | | | | | | | | 163.20 | | 680.00 |
| 63 | Shuttle - 2 lane to 1 lane | 7200 | 1 | 1 | 0 | 60 | 1 | | | | | | | | | 163.20 | | 680.00 |
| 64 | Telescopic Gate TG | 7550 | 1 | 1 | 0 | 60 | 1 | | | | | | | | | 163.20 | | 680.00 |
| 65 | Turn Station TS | 7570 | 1 | 1 | 0 | 60 | 1 | | | | | | | | | 163.20 | | 680.00 |

FIG. 7B

| | A | B | C | D | E | F | G | H | I | J | K | L | M | N | O | P | Q | R |
|---|---|---|---|---|---|---|---|---|---|---|---|---|---|---|---|---|---|---|
| 69 | | | | | | | | | | | | | | | | 163.20 | | 680.00 |
| 70 | | | | | | | | | | | | | | | | 163.20 | | 680.00 |
| 71 | | | | | | | | | | | | | | | | 163.20 | | 680.00 |
| 72 | | | | | | | | | | | | | | | | 163.20 | | 680.00 |
| 73 | | | | | | | | | | | | | | | | 163.20 | | 680.00 |
| 74 | | | | | | | | | | | | | | | | 163.20 | | 680.00 |
| 75 | | | | | | | | | | | | | | | | 163.20 | | 680.00 |
| 76 | | | | | | | | | | | | | | | | 163.20 | | 680.00 |
| 77 | | | | | | | | | | | | | | | | 163.20 | | 680.00 |
| 78 | | | | | | | | | | | | | | | | 163.20 | | 680.00 |
| 79 | | | | | | | | | | | | | | | | 163.20 | | 680.00 |
| 80 | | | | | | | | | | | | | | | | 163.20 | | 680.00 |
| 81 | | | | | | | | | | | | | | | | 163.20 | | 680.00 |
| 82 | | | | | | | | | | | | | | | | 163.20 | | 680.00 |
| 83 | | | | | | | | | | | | | | | | 163.20 | | 680.00 |
| 84 | | | | | | | | | | | | | | | | 163.20 | | 680.00 |
| 85 | | | | | | | | | | | | | | | | 163.20 | | 680.00 |
| 86 | | | | | | | | | | | | | | | | 163.20 | | 680.00 |
| 87 | | | | | | | | | | | | | | | | 163.20 | | 680.00 |
| 88 | | | | | | | | | | | | | | | | 163.20 | | 680.00 |
| 89 | | | | | | | | | | | | | | | | 163.20 | | 680.00 |
| 90 | | | | | | | | | | | | | | | | 163.20 | | 680.00 |
| 91 | | | | | | | | | | | | | | | | 163.20 | | 680.00 |
| 92 | | | | | | | | | | | | | | | | 163.20 | | 680.00 |
| 93 | | | | | | | | | | | | | | | | 163.20 | | 680.00 |
| 94 | | | | | | | | | | | | | | | | 163.20 | | 680.00 |
| 95 | | | | | | | | | | | | | | | | 163.20 | | 680.00 |
| 96 | | | | | | | | | | | | | | | | 163.20 | | 680.00 |
| 97 | | | | | | | | | | | | | | | | 163.20 | | 680.00 |
| 98 | | | | | | | | | | | | | | | | 163.20 | | 680.00 |
| 99 | | | | | | | | | | | | | | | | 163.20 | | 680.00 |

FIG. 7C

| | S | T | U | V | W | X | Y | Z | AA | AB | AC | AD | AE | AF | AG | AH |
|---|---|---|---|---|---|---|---|---|---|---|---|---|---|---|---|---|
| 1 | | | | | | | | | | | | | | | | |
| 2 | e(h/min) | | | | | grafic | | grafic | | witness module single lane | witness module dual lane | inbound routing | | | | |
| 3 | thly | quarterly | | yearly | | detailed length offset | | high level length offset | | | | | | | | |
| 4 | MTTM | MTBM | MTTM | MTBM | MTTM | | | | | | | | | | | |
| 5 | | 4080.00 | | 8160.00 | | | | | | | | | | | | |
| 6 | | 4080.00 | | 8160.00 | | | | | | | | | | | | |
| 7 | | 4080.00 | | 8160.00 | | | | | | | | | | | | |
| 8 | | 4080.00 | | 8160.00 | | | 0 | | | | | | | | | |
| 9 | | 4080.00 | | 8160.00 | | | 0 | | | | | | | | | |
| 10 | | 4080.00 | | 8160.00 | | | 0 | | | | | | | | | |
| 11 | | 4080.00 | | 8160.00 | | | 0 | | | | | | | | | |
| 12 | | 4080.00 | | 8160.00 | | | 0 | | | | | | | | | |
| 13 | | 4080.00 | | 8160.00 | | | 0 | | | | | | | | | |
| 14 | | 4080.00 | | 8160.00 | | | 0 | | | | | | | | | |
| 15 | | 4080.00 | | 8160.00 | | | 0 | | | | | | | | | |
| 16 | | 4080.00 | | 8160.00 | | | 0 | | | | | | | | | |
| 17 | | 4080.00 | | 8160.00 | | | 0 | | | | | | | | | |
| 18 | | 4080.00 | | 8160.00 | | | 0 | | | | | | | | | |
| 19 | | 4080.00 | | 8160.00 | | | 0 | | | | | | | | | |
| 20 | | 4080.00 | | 8160.00 | | | 0 | | | | | | | | | |
| 21 | | 4080.00 | | 8160.00 | | | 0 | | | | | | | | | |
| 22 | | 4080.00 | | 8160.00 | | | 0 | | | | | | | | | |
| 23 | | 4080.00 | | 8160.00 | | | 0 | | | | | | | | | |
| 24 | | 4080.00 | | 8160.00 | | | 0 | | | | | | | | | |
| 25 | | 4080.00 | | 8160.00 | | 200 | 0 | | BareBoard_Loader | | | | | | | |
| 26 | | 4080.00 | | 8160.00 | | | 0 | | Buffers | | | | | | | |
| 27 | | 4080.00 | | 8160.00 | | 150 | 0 | | Conv2_1 | Conv2_2 | | Printerrno | 200 | | | |
| 28 | | 4080.00 | | 8160.00 | | 150 | 0 | | Conv3_1 | Conv3_2 | | B1 | 100 | | | |
| 29 | | 4080.00 | | 8160.00 | | 150 | 0 | | Conv4_1 | Conv4_2 | | con5_2001 | 100 | | | |
| 30 | | 4080.00 | | 8160.00 | | 150 | 0 | | Conv1_1 | Conv1_2 | | con5_2001 | 100 | | | |
| 31 | | 4080.00 | | 8160.00 | | 150 | 0 | | Conv5_1 | Conv5_2 | | con5_2001 | 100 | | | |
| 32 | | 4080.00 | | 8160.00 | | 200 | 0 | | S25 L1 | S25 | | con5_2001 | 100 | | | |
| | | | | | | | | | | | | Conveyor001 | 200 | | | |

FIG. 7D

| | S | T | U | V | W | X | Y | Z | AA | AB | AC | AD | AE | AF | AG | AH |
|---|---|---|---|---|---|---|---|---|---|---|---|---|---|---|---|---|
| 33 | | 4080.00 | | 8160.00 | | 600 | 0 | | | S25Cluster2_L1 | S25Cluster2 | Lift1 | 450 | | | |
| 34 | | 4080.00 | | 8160.00 | | 900 | 0 | | | S25Cluster3_L1 | S25Cluster3 | Lift1 | 875 | | | |
| 35 | | 4080.00 | | 8160.00 | | 200 | 0 | | | S25_L1 | S25 | Conveyor001 | 200 | | | |
| 36 | | 4080.00 | | 8160.00 | | 600 | 0 | | | S25Cluster2_L1 | S25Cluster2 | Lift1 | 450 | | | |
| 37 | | 4080.00 | | 8160.00 | | 900 | 0 | | | S25Cluster3_L1 | S25Cluster3 | Lift1 | 875 | | | |
| 38 | | 4080.00 | | 8160.00 | | 200 | 0 | | | Flip_Station | | Printermc | 200 | | | |
| 39 | | 4080.00 | | 8160.00 | | 350 | 0 | | | HS50_L1 | HS50 | Conveyor001 | 400 | | | |
| 40 | | 4080.00 | | 8160.00 | | 900 | 0 | | | HS50Cluster2_L | HS50Cluster2L | Lift1 | 850 | | | |
| 41 | | 4080.00 | | 8160.00 | | 1350 | 0 | | | HS50Cluster3_L | HS50Cluster3L | Lift1 | 1250 | | | |
| 42 | | 4080.00 | | 8160.00 | | 100 | 0 | | | Lastlift | | Lift4 | 700 | | | |
| 43 | | 4080.00 | | 8160.00 | | 150 | 0 | | | Buffer_Magazine100 | | B1 | 100 | | | |
| 44 | | 4080.00 | | 8160.00 | | 150 | 0 | | | Buffer_Magazine50 | | B1 | 100 | | | |
| 45 | | 4080.00 | | 8160.00 | | 200 | 0 | | | Magazine_Loader2 | | Printermc | 200 | | | |
| 46 | | 4080.00 | | 8160.00 | | 200 | 0 | | | Magazine_Loader5 | | Printermc | 200 | | | |
| 47 | | 4080.00 | | 8160.00 | | 200 | 0 | | | Magazine_Unloader2 | | Printermc | 200 | | | |
| 48 | | 4080.00 | | 8160.00 | | 200 | 0 | | | Magazine_Unloader5 | | Printermc | 200 | | | |
| 49 | | 4080.00 | | 8160.00 | | 200 | 0 | | | Printer | | Printermc | 200 | | | |
| 50 | | 4080.00 | | 8160.00 | | 200 | 0 | | | Printer | | Printermc | 200 | | | |
| 51 | | 4080.00 | | 8160.00 | | 200 | 0 | | | Printer | | Printermc | 200 | | | |
| 52 | | 4080.00 | | 8160.00 | | 200 | 0 | | | Printer | | Printermc | 200 | | | |
| 53 | | 4080.00 | | 8160.00 | | 1400 | 0 | | | Oven_1Lane | Oven_2 | Oven_2001 | 700 | | | |
| 54 | | 4080.00 | | 8160.00 | | 1400 | 0 | | | Oven_1Lane | Oven_2 | Oven_2001 | 700 | | | |
| 55 | | 4080.00 | | 8160.00 | | 1400 | 0 | | | Oven_1Lane | Oven_2 | Oven_2001 | 700 | | | |
| 56 | | 4080.00 | | 8160.00 | | 1400 | 0 | | | Oven_1Lane | Oven_2 | Oven_2001 | 700 | | | |
| 57 | | 4080.00 | | 8160.00 | | 1400 | 0 | | | Oven_1Lane | Oven_2 | Oven_2001 | 700 | | | |
| 58 | | 4080.00 | | 8160.00 | | 1400 | 0 | | | Oven_1Lane | Oven_2 | Oven_2001 | 700 | | | |
| 59 | | 4080.00 | | 8160.00 | | 200 | 0 | | | S25_L1 | S25 | Conveyor001 | 200 | | | |
| 60 | | 4080.00 | | 8160.00 | | 200 | 0 | | | S25_L1 | S25 | Conveyor001 | 200 | | | |
| 61 | | 4080.00 | | 8160.00 | | 200 | 0 | | | S25_L1 | S25 | Conveyor001 | 200 | | | |
| 62 | | 4080.00 | | 8160.00 | | 100 | 0 | | | Shuttle1_2 | | Shuttle | 100 | | | |
| 63 | | 4080.00 | | 8160.00 | | 100 | 0 | | | Shuttle2_1 | | Shuttle | 100 | | | |
| 64 | | 4080.00 | | 8160.00 | | 150 | 0 | | | ConvTG | | conv5_2001 | 150 | | | |
| 65 | | 4080.00 | | 8160.00 | | 200 | 0 | | | Turn_Station | | Printermc | 200 | | | |
| 66 | | | | | | | | | | | | | | | | |
| 67 | | | | | | | | | | | | | | | | |
| 68 | | | | | | | | | | | | | | | | |

FIG. 7E

| S | T | U | V | W | X | Y | Z | AA | AB | AC | AD | AE | AF | AG | AH |
|---|---|---|---|---|---|---|---|---|---|---|---|---|---|---|---|
| 69 | 4080.00 | | 8160.00 | | | | | | | | | | | | |
| 70 | 4080.00 | | 8160.00 | | | | | | | | | | | | |
| 71 | 4080.00 | | 8160.00 | | | | | | | | | | | | |
| 72 | 4080.00 | | 8160.00 | | | | | | | | | | | | |
| 73 | 4080.00 | | 8160.00 | | | | | | | | | | | | |
| 74 | 4080.00 | | 8160.00 | | | | | | | | | | | | |
| 75 | 4080.00 | | 8160.00 | | | | | | | | | | | | |
| 76 | 4080.00 | | 8160.00 | | | | | | | | | | | | |
| 77 | 4080.00 | | 8160.00 | | | | | | | | | | | | |
| 78 | 4080.00 | | 8160.00 | | | | | | | | | | | | |
| 79 | 4080.00 | | 8160.00 | | | | | | | | | | | | |
| 80 | 4080.00 | | 8160.00 | | | | | | | | | | | | |
| 81 | 4080.00 | | 8160.00 | | | | | | | | | | | | |
| 82 | 4080.00 | | 8160.00 | | | | | | | | | | | | |
| 83 | 4080.00 | | 8160.00 | | | | | | | | | | | | |
| 84 | 4080.00 | | 8160.00 | | | | | | | | | | | | |
| 85 | 4080.00 | | 8160.00 | | | | | | | | | | | | |
| 86 | 4080.00 | | 8160.00 | | | | | | | | | | | | |
| 87 | 4080.00 | | 8160.00 | | | | | | | | | | | | |
| 88 | 4080.00 | | 8160.00 | | | | | | | | | | | | |
| 89 | 4080.00 | | 8160.00 | | | | | | | | | | | | |
| 90 | 4080.00 | | 8160.00 | | | | | | | | | | | | |
| 91 | 4080.00 | | 8160.00 | | | | | | | | | | | | |
| 92 | 4080.00 | | 8160.00 | | | | | | | | | | | | |
| 93 | 4080.00 | | 8160.00 | | | | | | | | | | | | |
| 94 | 4080.00 | | 8160.00 | | | | | | | | | | | | |
| 95 | 4080.00 | | 8160.00 | | | | | | | | | | | | |
| 96 | 4080.00 | | 8160.00 | | | | | | | | | | | | |
| 97 | 4080.00 | | 8160.00 | | | | | | | | | | | | |
| 98 | 4080.00 | | 8160.00 | | | | | | | | | | | | |
| 99 | 4080.00 | | 8160.00 | | | | | | | | | | | | |

FIG. 7F

|   | A | B | C | D | E | F | G | H | I | J | K | L | M |
|---|---|---|---|---|---|---|---|---|---|---|---|---|---|
| 1 | | | | | Main | | | | | | | | |
| 2 | | | board # | | 1 | 2 | 3 | 4 | 5 | 6 | 7 | 8 | 9 |
| 3 | | | board name | | | | | | | | | | |
| 4 | | | second side + | | | | | | | | | | |
| 5 | | | components per panel | | | | | | | | | | |
| 6 | | Boards | up to 18.7 x 18.7 | | | | | | | | | | |
| 7 | | | up to 32 x 32 | | | | | | | | | | |
| 8 | | | up to 55 x 55 | | | | | | | | | | |
| 9 | | | boards per panel | | | | | | | | | | |
| 10 | | | components per board | | | | | | | | | | |
| 11 | | | board for simulation | | | | | | | | | | |
| 12 | | # | name | pc | | | | | | | | | |
| 13 | 1 | 7300 | Buffer | 999 | 999 | 999 | 999 | 999 | 999 | 999 | 999 | 999 | 999 |
| 14 | 2 | 7511 | Conveyor 1060 | 999 | 999 | 999 | 999 | 999 | 999 | 999 | 999 | 999 | 999 |

FIG. 8

| | N | O | P | Q | R | S | T | U | V | W | X | Y |
|---|---|---|---|---|---|---|---|---|---|---|---|---|
| 1 | | | | | | | | | | | | |
| 2 | 10 | 11 | 12 | 13 | 14 | 15 | 16 | 17 | 18 | 19 | 20 | 21 |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | 999 | 999 | 999 | 999 | 999 | 999 | 999 | 999 | 999 | 999 | 999 | 999 |
| 14 | 999 | 999 | 999 | 999 | 999 | 999 | 999 | 999 | 999 | 999 | 999 | 999 |

FIG. 8A

| | Z | AA | AB | AC | AD | AE | AF | AG | AH |
|---|---|---|---|---|---|---|---|---|---|
| 1 | | | | | | | | | |
| 2 | 22 | 23 | 24 | 25 | 26 | 27 | 28 | 29 | 30 |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | 999 | 999 | 999 | 999 | 999 | 999 | 999 | 999 | 999 |
| 14 | 999 | 999 | 999 | 999 | 999 | 999 | 999 | 999 | 999 |

FIG. 8B

| | A | B | C | D | E | F | G |
|---|---|---|---|---|---|---|---|
| 1 | Boundaries | | | | | | |
| 2 | Project | Test1 | | | | | |
| 3 | Date | 31/March 2001 | | | | | |
| 4 | | | | | | | |
| 5 | | | default | project | | | |
| 6 | Financial | | | | | | |
| 7 | Currency (Input) | | | 0 | | | |
| 8 | Currency (Output) | | | 0 | | | |
| 9 | Exchang ratio (In/Out) | | | 0.00 | | | |
| 10 | Depreciation | | | 0.00% | | | |
| 11 | Interest Rate | | | 0% | | | |
| 12 | Labor | | | | | | |
| 13 | Operator | | | 0 | | | |
| 14 | Supervisor | | | 0.00 | | | |
| 15 | Maintenance | | | 0.00 | | | |
| 16 | Rework | | | 0.00 | | | |
| 17 | Utilities | | | | | | |
| 18 | floorspace (/year/spm) | | | 0 | | | |
| 19 | electricity (kWh) | | | 0.00 | | | |
| 20 | Nitrogen (???) | | | 0.00 | | | |
| 21 | air (???) | | | 0.00 | | | |
| 22 | | | | | | | |
| 23 | | | | | | | |
| 24 | | | | | | | |
| 25 | | | | | | | |
| 26 | | | | | | | |

Main

FIG. 11

| | A | B | C | D | E | F | G |
|---|---|---|---|---|---|---|---|
| 1 | Setup | | | | | | |
| 2 | | | | | | | |
| 3 | internal setup | | | | | | |
| 4 | Operator labor per hour | 0.00 | hours | | | | |
| 5 | setup changes every x h | | | | | | |
| 6 | # of setup changes per week | 0 | min. | | | | |
| 7 | setup changes per year | 0.00 | hours | | | | |
| 8 | time per setup | 0 | | | | | |
| 9 | setup time per year | | | | | Main | |
| 10 | internal setup costs | | | | | | |
| 11 | | | | | | | |
| 12 | external setup | | | | | | |
| 13 | external setup labour per hour | | minutes per setup | | | | |
| 14 | external setup | 0.00 | hours | | | | |
| 15 | external setup per year | | | | | | |
| 16 | Investment for external setup | | | | | | |
| 17 | | | | | | | |
| 18 | | | | | | | |
| 19 | external setup costs per year | 0 | | | | | |
| 20 | | | | | | | |
| 21 | setup costs | 0 | | | | | |

FIG. 12

|   | A | B | C | D | E | F | G | H |
|---|---|---|---|---|---|---|---|---|
| 1 | Quality | | | | | | | |
| 2 | material costs per board | | 0 | | | | | |
| 3 | DPM | 500 | | | | | | |
| 4 | components per board | 100% | | | | | | |
| 5 | first pass yield | | 0 | | | | | |
| 6 | rework costs per board to rework | #DIV/0! | | | | | | |
| 7 | scrap costs per board to rework | #DIV/0! | 0 | | | | | |
| 8 | rework costs per year | | 0 | | | | | |
| 9 | scrap costs per year | | | | | | | |
| 10 | | | | | | | | |
| 11 | quality costs per year | #DIV/0! | 0 | | | | | |
| 12 | | | | | | | | |
| 13 | | | | | | | Main | |
| 14 | | | | | | | | |
| 15 | | | | | | | | |
| 16 | | | | | | | | |
| 17 | | | | | | | | |
| 18 | | | | | | | | |

FIG. 13

| | A | B | C | D | E | F | G | H | I |
|---|---|---|---|---|---|---|---|---|---|
| 1 | Maintenance | | minutes | # of workers | who does maint. | downtime factor | line operator (h) | maint. team (h) | downtime (h) |
| 2 | line workers | | | 0 | | | | | 0 |
| 3 | maintenance per shift (min) | | | | 1 | 100% | 0.00 | 0.00 | #DIV/0! |
| 4 | maintenance weekly (min) | | | | 1 | 100% | 0.00 | 0.00 | #DIV/0! |
| 5 | maintenance monthly add. (min) | | | | 2 | 100% | #DIV/0! | #DIV/0! | #DIV/0! |
| 6 | maintenance quarterly add (min) | | | | 3 | 100% | 0.00 | 0.00 | #DIV/0! |
| 7 | maintenance every x h add (min) | | | | 3 | 100% | 0.00 | 0.00 | #DIV/0! |
| 8 | maintenance time calculated (h) | | | | | | | | |
| 9 | labor costs | 10,000 | | | | | #DIV/0! | #DIV/0! | |
| 10 | | | | | | | | | |
| 11 | maintenance costs per year | | | | | | #DIV/0! | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | 0.000000 € | |
| 18 | | | | | | | | | |
| 19 | | | | | | | Main | | |
| 20 | | | | | | | | | |
| 21 | | | | | | | | | |
| 22 | | | | | | | | | |

FIG. 14

| | A | B | C | D | E | F | G | H | I | J | K |
|---|---|---|---|---|---|---|---|---|---|---|---|
| 1 | Cost of Ownership | | | Cost per year | | Cost per board | | % | | Capacity | |
| 2 | Investment | | | | | | | | | hours available per year | 0.00 |
| 3 | investment | | % | | 0 | | | | | internal setup | #DIV/0! |
| 4 | spareparts | | % | | 0 | | | | | maintenance | #DIV/0! |
| 5 | service | | | | 0 | | | | | quality | |
| 6 | | | | | | | | | | technical availability | #DIV/0! |
| 7 | | | | | | #DIV/0! | 0 | ##### | | hours total | 83.56 |
| 8 | Labor | | | | | | | | | boards per hour | #DIV/0! |
| 9 | Operations | | | #DIV/0! | 0 | | | | | boards per shift | #DIV/0! |
| 10 | Supervisor | | | | 0 | | | | | boards per week | #DIV/0! |
| 11 | | | | #DIV/0! | 0 | | | | | boards per year | #DIV/0! |
| 12 | | | | | | #DIV/0! | 0 | ##### | | | |
| 13 | Misc. | | | | | | | | | | |
| 14 | Setup | | | #DIV/0! | 0 | | | | | | |
| 15 | Maintenance | | | #DIV/0! | 0 | | | | | | |
| 16 | | | | | | | | | | | |
| 17 | | | | | | #DIV/0! | 0 | ##### | | | |
| 18 | Utilities | | | | | | | | | | |
| 19 | Floorspace | | sqm | #DIV/0! | 0 | | | | | | |
| 20 | Electricity | | kw | #DIV/0! | 0 | | | | | | |
| 21 | Nitrogen | | cbm/h | #DIV/0! | 0 | | | | | | |
| 22 | Air | | Nl/min | #DIV/0! | 0 | | | | | | |
| 23 | | | | | | #DIV/0! | 0 | ##### | | | Main |
| 24 | | | | | | | | | | | |
| 25 | Quality | | | | | | | | | | |
| 26 | rework costs per year | | | #DIV/0! | 0 | | | | | | |
| 27 | scrap costs per year | | | #DIV/0! | 0 | | | | | | |
| 28 | | | | #DIV/0! | 0 | | | | | | |
| 29 | | | | | | #DIV/0! | 0 | ##### | | | |
| 30 | | | | | | | | | | | |
| 31 | Costs per year | | | #DIV/0! | 0 | #DIV/0! | 0 | | | | |

FIG. 15

ELECTRONICS ASSEMBLY SYSTEMS CUSTOMER BENEFIT MODELING TOOLS AND METHODS

CROSS-REFERENCE TO RELATED APPLICATIONS

This applications claims the benefit for purposes of priority, under 35 U.S.C. §119(e), of U.S. Patent Application Ser. Nos. 60/208,664, filed Jun. 1, 2000, and 60/280,679 filed Mar. 30, 2001, the contents of which are herein incorporated by reference in their entirety.

COMPUTER PROGRAM LISTING APPENDIX

This application incorporates by reference in its entirety a computer program listing appendix containing the source code listings which were described in the patent application at the time of filing and which have now been reproduced on compact disc. The compact disc contains the file entitled, "APPENDIX (Source Code)" that was created on Feb. 17, 2005 and encompasses 213 kilobytes.

FIELD OF THE INVENTION

The present invention relates in general to the field of electronics assembly systems and, in particular, to tools and methods for customer benefit modeling for purposes of electronics assembly system configurations.

BACKGROUND OF THE INVENTION

Numerous methods and tools exist for modeling and simulating production and assembly lines. For example, a spreadsheet such as Microsoft Excel® 98 can be used to perform static modeling of an assembly line. While spreadsheets are easy to use, and may provide results based on static modeling, they do not adequately take into account how various factors interact with each other. For instance, a spreadsheet can be configured to show that certain pieces of equipment in an assembly line may have a downtime of 25%, but it cannot be configured adequately to show that at various times, all of these pieces of equipment might be down at the same time, much less predict the actual impact such an event might have on line performance.

Discrete event simulation software products, such as Witness® 2000 (available from Lanner Group, Greenwich England), provide better estimates of how a line will actually operate. One drawback of using existing discrete event simulation products is the amount of time and skill it takes to set up a discrete event simulation of an actual or proposed system. Most discrete event simulation packages require that highly detailed simulation objects be created by the person performing the modeling. These objects contain numerous parameters, some of which may be variable in nature and some of which are inherent in the piece of equipment that the simulation object represents.

Consultants typically spend a great deal of time, sometimes several weeks, building a discrete event simulation model. This long turn-around time is not helpful for a salesperson pitching equipment, or consultants trying to demonstrate their ability to increase a line's efficiency. It would be preferable if a consultant or a salesperson who is attempting to sell products or services could deliver a persuasive, well-supported sales pitch, or needed consultation in far less time.

Prior to the present invention, there appears to have been no adequate way for a consultant to quickly and easily build and run a simulation model for a proposed line configuration. Moreover, the level of skill required to build a simulation often exceeds that possessed by a typical salesperson. It would therefore be valuable to have tools and methods that: demand only a low level of skill to use, similar to that required to use a spreadsheet; can be quickly programmed; and give accurate results, similar to those of a sophisticated discrete event simulation modeling tool.

SUMMARY OF THE INVENTION

The present invention provides methods and tools for modeling a configuration for, among other things, an electronics assembly system and generating performance measures associated with a given configuration based upon a simulation of the behavior of the system. In particular, the methods and tools make it possible for electronics assembly equipment salespersons or consultants to generate a simulation model for purposes of a sales pitch or a consulting project on the order of magnitude of about a half and hour, or even less, to conduct model-based prediction of system performance under various configuration assumptions, and to generate for an actual or prospective customer one or more expected cost of ownership values for particular configuration assumptions.

The customer benefit modeling tool of the present invention enables trained consultants to accurately model current and future customer assembly systems at the line, multi-line, shop floor and factory levels. It also enables the performance of customer systems to be expressed in a range of key metrics that include, for example, throughput, cost performance, yield, OEE and COO. The customer benefit tool according to the present invention can be used to accurately represent production reality because, in one embodiment, it can handle distributed inputs and events by using a dynamic model based on discrete event simulation. This modeling approach enables separate analysis of system design issues (e.g. equipment configuration, wip buffer sizing) and operations issues (e.g. staffing, material availability).

The customer benefit modeling tool can also provide customer/project specific target benchmarking under defined, ideal operating conditions (e.g. no break downs, no run outs). That is, the performance that one would expect under short duration "acceptance testing." The tool may also be configured to enable target production metrics to be established based on realistic conditions. It can also be configured to model the impact of changing operations related variables.

The tool advantageously allows customer models to be validated under "acceptance test" conditions to ensure that the machine based processes and cycle times have been accurately modeled. As part of the validation process, the tool may allow a customer-specific model to be calibrated against real data. The validation process may focus on throughput or yield. In one embodiment, throughput is dominant factor.

In accordance with the present invention, a user proposes a configuration for an assembly line by selecting from among objects that represent assembly line equipment and parameters characterizing the operation of the equipment. The assembly line equipment often has various operating characteristics well-known to industrial engineers (e.g., mean time between failure, mean time to repair, how often a piece of equipment needs manual assistance, how long the manual assistance takes, etc.). Typically, these operating characteristics are empirically derived statistical measures or models that may be fixed or that may vary as a function of one or more variables. Sometimes, the order in which the equipment will be laid out to form a line may also be part of the configuration process. Specific values for the operating characteristics, determined statistically, are associated with each piece of equipment in the proposed line configuration. Shift data, production part data, and other line parameters may also be assigned values. The configuration and associated operating characteristic values are then used to build a discrete event simulation.

In some embodiments of the present invention, building a discrete event simulation requires creating detailed simulation objects. To streamline the building of a simulation by selecting and arranging the simulation objects, templates may be created in advance for each simulation object and values may be read into the template to create the simulation object. After the discrete event simulation is run through a suitable number of trials, performance results gathered for those trials are exported to a reporting means. The reporting means may contain an interface that allows the user to input specific data, which in turn would allow for custom reports to be generated that present the performance results in a manner that can be tailored by a salesperson, customer, or consultant to the needs of the customer or the situation.

The assembly equipment modeling and simulation according to the present invention may be performed virtually anywhere, using suitable computer software, further described below, that runs solely on the process of any type of personal computer, or in a client-server fashion over a network, such as the Internet, or in communication with sites on the World-Wide-Web.

The computer software provides a means for representing assembly line components and parameters in a configuration that is chosen on the fly. A means for reading data and parameters about each selected component and proposed line configuration and parameter setting is also provided. A simulation generating means takes the inputted line configuration and parameter setting and associated data and uses that information to generate a simulation, which in some embodiments involves building simulation objects from templates. Output information derived by running the simulation over a suitable number of trials is sent to a reporting means.

The means for representing the assembly line components in the user-chosen configuration and having user-chosen parameter settings, as well as the reporting means, may take the form of a spreadsheet. Since the reporting means may be a spreadsheet, it may be configured to accept user-specific inputs and generate custom reports based on this information.

BRIEF DESCRIPTION OF THE DRAWINGS

FIGS. 2–2A are screen views of spreadsheets (e.g., in MS Excel®) that are configured to act as an input interface in an embodiment of the present invention.

FIGS. 4–4C are screen views of spreadsheets (e.g., in MS Excel®) configured to act as interface for inputting shift schedule data in an embodiment of the present invention.

FIGS. 5–5C are screen views of spreadsheets (e.g., in MS Excel®) configured to act as an interface for inputting line configurations in an embodiment of the present invention.

FIG. 6 illustrates how pull-down menus, in an embodiment of the present invention, may be used with the screen shown in FIG. 5.

FIGS. 7–7F illustrates a partially populated line configuration spread sheet interface in an embodiment of the present invention.

FIGS. 8–8B illustrates a board data input interface in an embodiment of the present invention.

FIG. 11 is a screen view of the screen that appears, in an embodiment of the present invention, when the "Boundaries" button of FIG. 10 is selected.

FIG. 12 is a screen view of the screen that appears, in an embodiment of the present invention, when the "Set-up" button of FIG. 10 is selected.

FIG. 13 is a screen view of the screen that appears, in an embodiment of the present invention, when the "Quality" button of FIG. 10 is selected.

FIG. 14 is a screen view of the screen that appears, in an embodiment of the present invention, when the "Maintenance" button of FIG. 10 is selected.

FIG. 15 is a screen view of the screen that appears, in an embodiment of the present invention, when the "Cost of Ownership" button of FIG. 10 is selected.

DETAILED DESCRIPTION OF THE INVENTION

The present invention provides, among other things, tools and methods that enable quick and easy modeling and simulation of production assembly lines without the need to spend days or weeks building simulation models. It is particularly well-suited for use in modeling electronic component assembly production lines. Of course, it is also useful in modeling other assembly and manufacturing processes. Because the present invention enables quick, efficient modeling that typically can be performed in approximately 30 minutes or less, it is an ideal tool for use by electronics assembly equipment salespersons, as well as consultants and customers.

In accordance with the present invention, a consultant, sales person, customer, or an assembly line designer can quickly perform sophisticated simulations on a computer by inputting or selecting simple designer computer representations, e.g., designer objects, which represent particular pieces of equipment that are used in an assembly line, from a set of such representations created in advance. In the description of the embodiments, "designer objects" and "simulation objects" are described, but the invention contemplates the use of any suitable computer representations. The computer is configured to take this list of designer objects, and import from a database key parameters for each designer object in the list, as well as other production line data; launch a discrete event simulation tool, which contains templates for detailed simulation objects; build detailed simulation objects from the templates and the designer objects; run a simulation, using simulation software, such as Witness®, ProModel,® Automod,® Simul8,® Arena,® Saimple®; and output specific simulation and modeling parameters in a user friendly manner.

The present invention achieves its efficiency for several reasons. Notably, the populating of detail-intensive simulation objects in the simulation tool is largely automated. A user performing the simulation needs only a low level of computer skill and does not need to spend large amounts of time setting up and building a simulation. In one embodiment, the user input interface takes the form of a spreadsheet, preferably an MS Excel® spreadsheet. From the spreadsheet, the user can build a simulation model in a sophisticated simulation software package, examples of which were listed above, launch the simulation software, and run the simulation. After a particular simulation is run, the outputs may stored in a separate spreadsheet.

Figure 1:
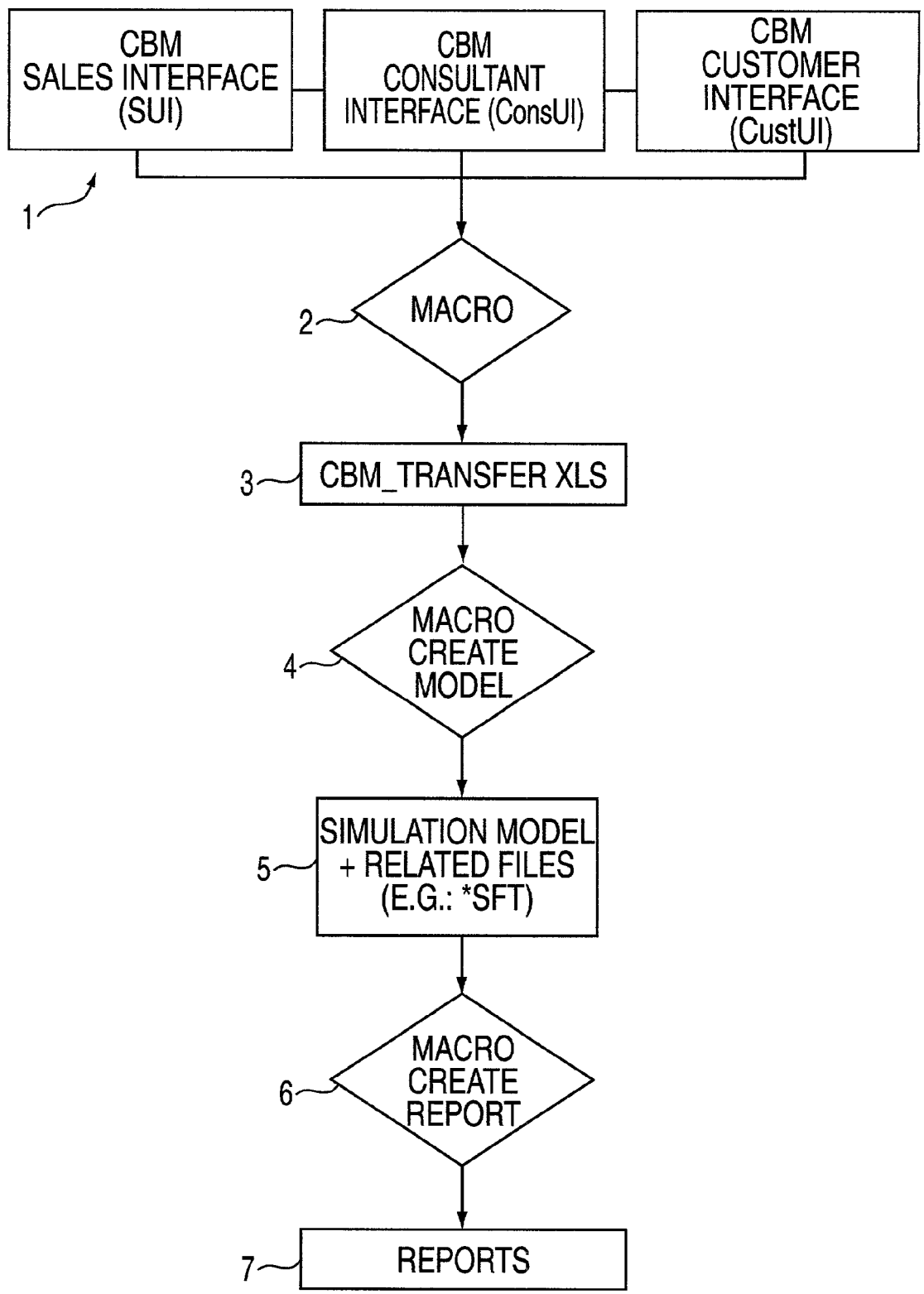
FIG. 1 is a flow chart illustrating the overall file structure and logic flow of one embodiment of the present invention.

FIG. 1 provides a high-level logic flow for one embodiment of the present invention. As is illustrated in FIG. 1, several different user interfaces are available. MS Excel,® spread sheets may be configured to function as input interfaces. In some embodiments, Visual Basic forms and Web forms may also be configured to function as the input interfaces. Not all of the input interfaces needs to take the same form. For example, a salesperson's interface may be a spread sheet, a customer's may be a web form, and a consultant's may be a Visual Basic form. Those skilled in the art will recognize that various software can be used to generate the input interfaces and in some cases they may be written from scratch by a skilled programmer.

By having multiple interfaces available, the interfaces may be adapted to a specific type of user. For example, there may be one interface for use by salespersons, another for use by consultants, and yet another for use by customers. To facilitate input, dialog boxes may be created as part of the input interfaces. This allows for easy inputting of data and allows for selecting in advance the number and type of inputs available.

After the user enters the requisite data via a user input interface, step 1 in FIG. 1, a routine is run to create and put the data in correct files and formats necessary to run a simulation. The routine at step 2 formats the data that was entered through the interface at step 1 for use with a particular simulation software package according to the requirements of that package. For example, the interface may allow a user to input cycle time in hours or minutes, but the simulation software may need cycle time in seconds. As a further example, Witness® 2000 has a specific format for shift data; however, it may be easier for a user to input shift data in terms of start time, break time, and end time. The routine at step 2 takes the shift data as entered by the user and builds files and structures that can be used by the simulation package (e.g., Witness® 2000 or other available package). In some embodiments, data may be exported from the input interface directly to the simulation package.

The routine in step 2, builds the module that is shown in Step 3 as the CBM_Transfer.XLS module. This module may, but does not necessarily, take the form of a spreadsheet. This module contains all the files and data in the format required by the simulation software. In essence, the module shown in Step 3 is a repository for the information read in from the interface. The files and data in this module have a fixed structure that is required by the simulation software.

Another routine is executed to build simulation objects from the templates, step 4. The code for implementing this module, in an embodiment of the present invention, is shown and described below. During this step, data, files, and information are read into the simulation software from the module of step 3 to build a simulation. Also, during this step, the simulation software is launched.

Next, a simulation is run, step 5. At this point the simulation model and all associated files exist. The simulation is run and displayed on a computer screen.

A routine then exports values from the simulation routine to a Reports spreadsheet, such as for example, an MS Excel® spreadsheet, step 6. The Reports spreadsheet may contain a user input interface to allow for the generation of custom reports based on customer-specific data. In some embodiments, the reports may be generated in the simulation software in addition to or in place of a report spreadsheet.

As is shown in FIG. 2, an input interface spreadsheet is configured to accept certain set-up data, such as the name of the project being modeled, file management information, time of the simulation run, etc. The user may, for example, enter the directory where the simulation software is saved. The user may also input a project name, and the user may input a simulation time in a convenient unit, such as days.

Figure 3:
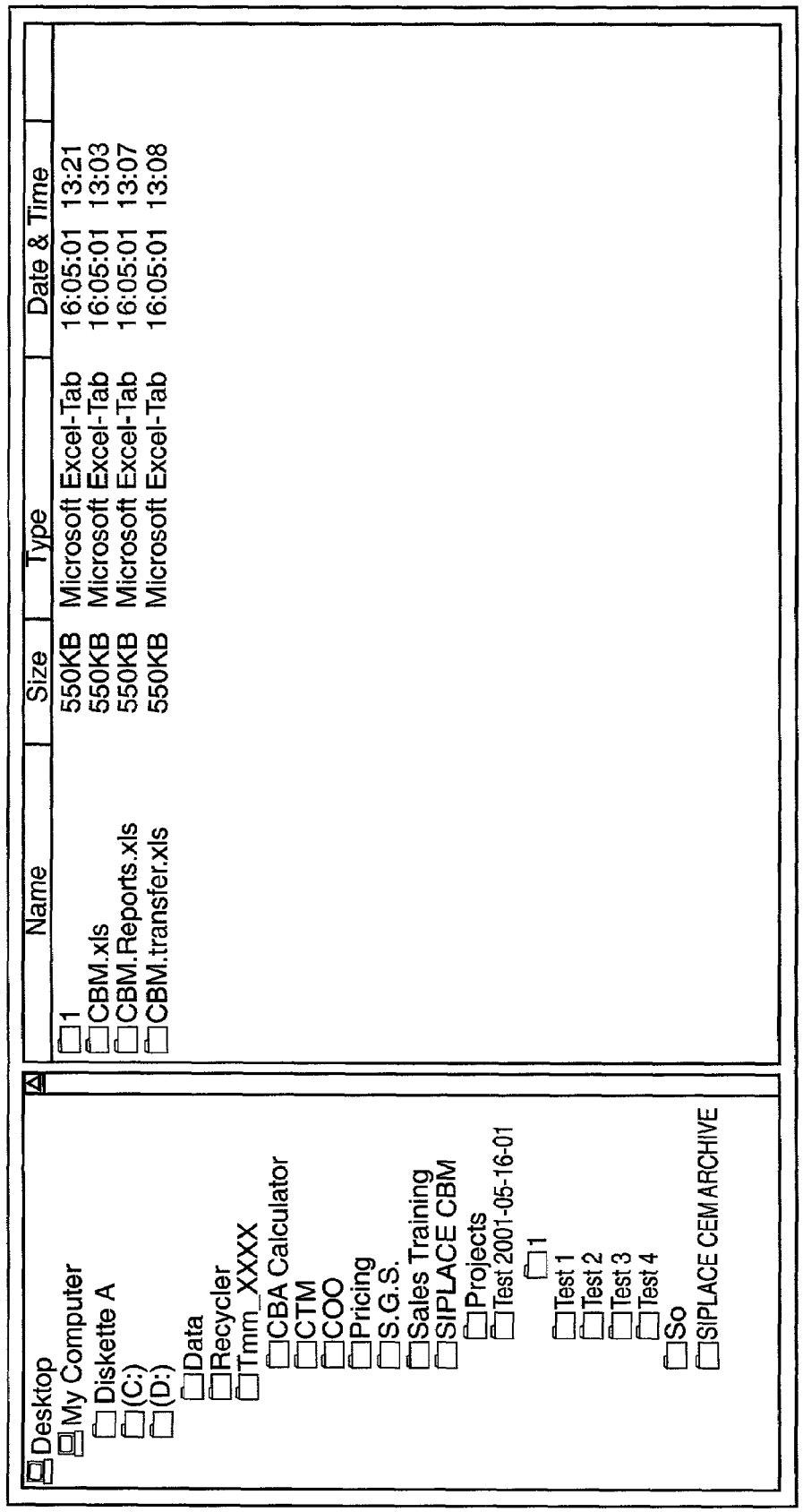
FIG. 3 illustrates the files and directories that are set up when the tool according to an embodiment of the present invention is run.

The input spreadsheet can be configured with a soft button or other selection mechanism, such as the "Create Project" button shown in FIG. 2. When the user selects the "Create Project" button the appropriate subdirectories appear and the required files are copied. FIG. 3 illustrates files and directories that are created in the background when the "Create Project" button is selected in one embodiment. For example, a CBM directory may be created and appropriate templates copied. In addition, a project directory may be created for a specific project and populated with appropriate templates and files, such as the CBM.XLS, CMB-Transfer.XLS, and the CBM_Reports.XLS, as shown.

Figure 4B:
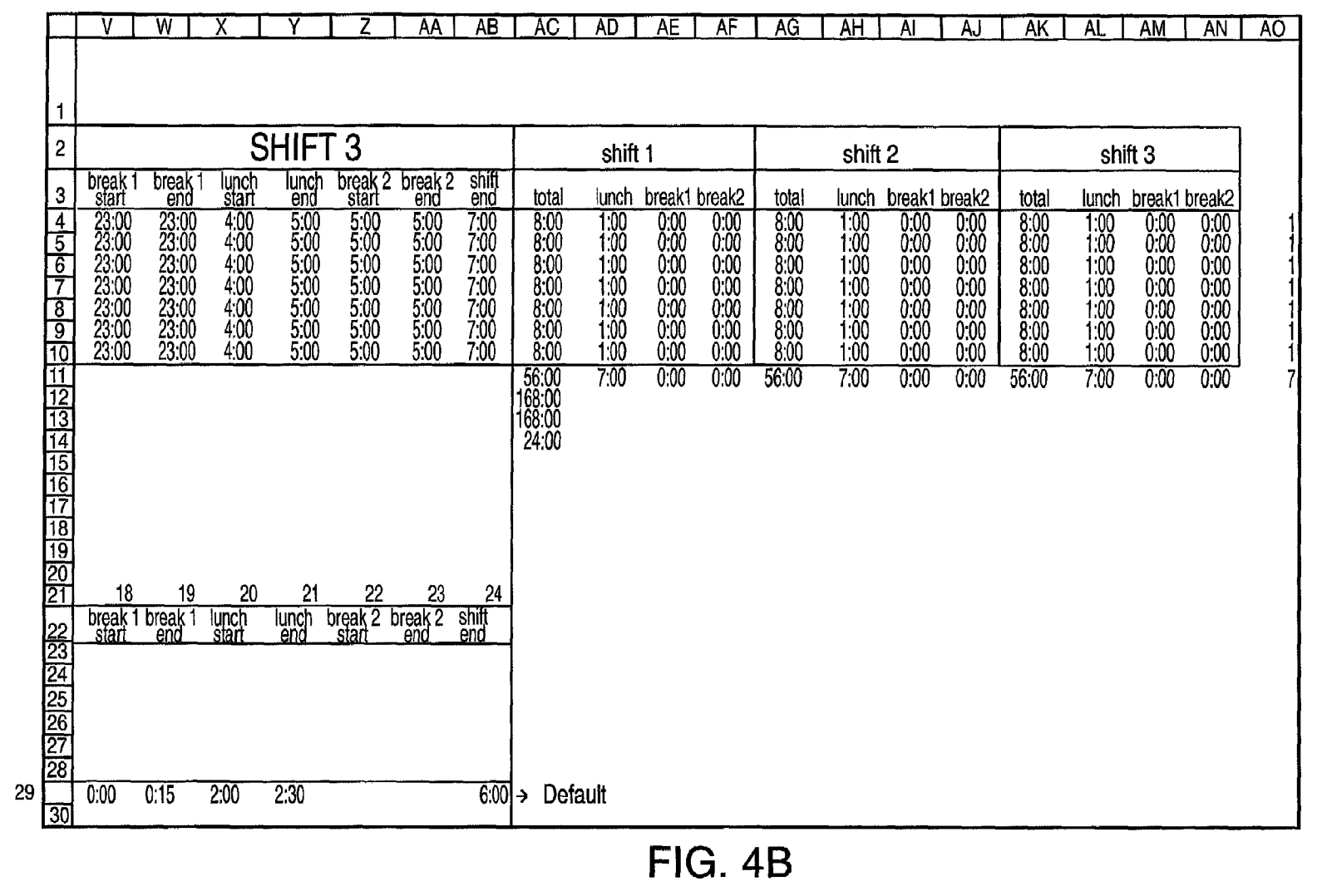

As is shown in FIG. 2, various other soft buttons may be employed to select various user interfaces and user requested processes. The "Shift Data" button opens a user interface as depicted in FIGS. 4–4C. This interface also takes the form of a spreadsheet. The user populates this spreadsheet with appropriate shift patterns, an example of which is shown in FIGS. 4–4C.

Figure 5:
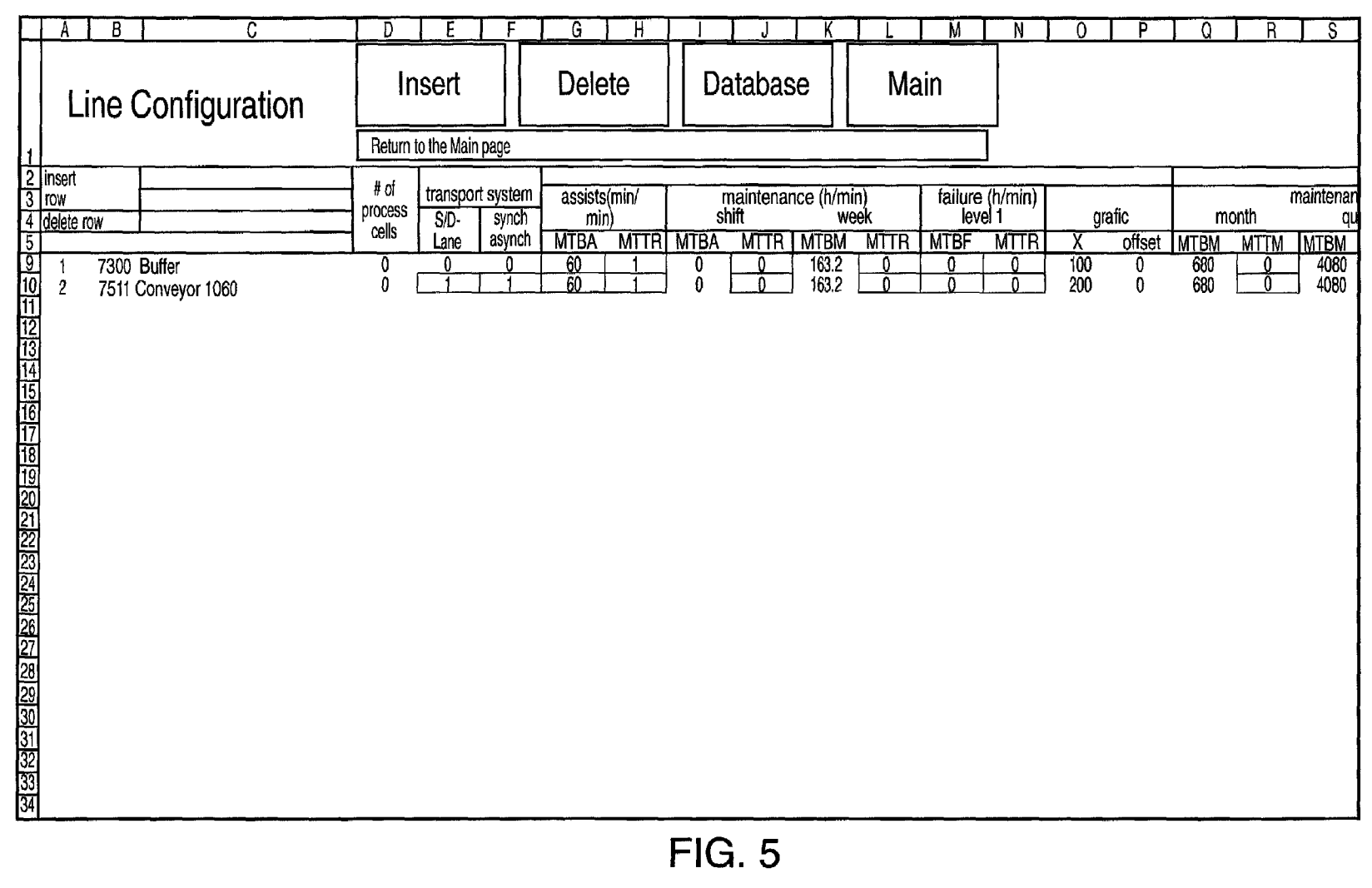
Figure 6:
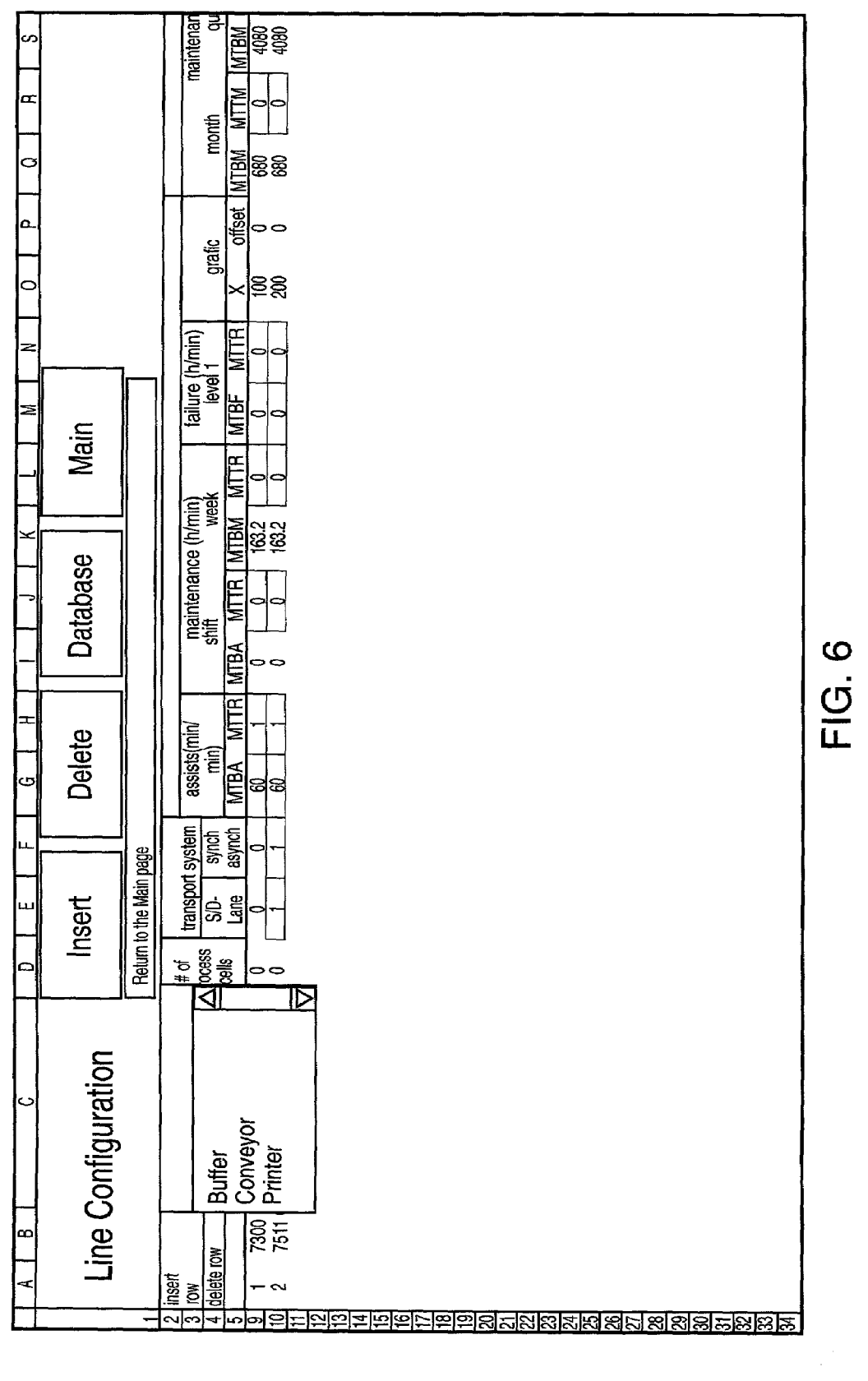

After the appropriate Shift data is entered, the user may select the "Line Configuration" button, shown in FIG. 2. Upon selecting this button, the screen in FIGS. 5–5C appears. The user may then select the equipment to be added to the line. The user also can select where to insert a piece of equipment. As is shown in FIG. 6, a drop down menu can be employed to facilitate populating this spreadsheet.

Adding a piece of equipment results in the addition of a row in the line configuration spreadsheet and adds to the number of lines which are stored in process cells of the board spreadsheet, discussed below. (See FIGS. 7–7F). The process of adding equipment is continued until a line is completed. By using an insert procedure with the input of a row number and a delete procedure, which works accordingly, the first version of the line can be manipulated. Clicking on "Main" returns to the main user interface.

As the user enters a specific piece of equipment at a particular cell of the column (or row), other cells in the same column (or row) are automatically populated with values that correspond to specific operating parameters for that piece of equipment. These parameters may include, but are not limited to, Machine Cycle Time, Mean Time Between Manual Assists, Mean Time to Assist, Shift Pattern (i.e. how many shifts per day the machine will be operated for), Mean Time Between Failure, etc. FIGS. 5–5C illustrates, without limitation, some of the parameters that may be associated with a specific piece of equipment.

The values for these parameters may be stored in an object parameter database, which may take the form of another spreadsheet, that can be periodically updated based on real-world experience. One advantage of maintaining a parameter database as a separate spreadsheet is that it may be updated over time with empirically derived, real-world data, that is gathered in the field for each component and each line configuration that is developed. For example, the components of an assembly line can be configured to automatically track the data required for these parameters. That data can then be used to update the second spreadsheet. The tool may use the latest data available at the conclusion of each project, where the tool is employed, to update the object database parameters.

In addition to inputting a specific line configuration through the "Line Configuration" spreadsheet interface and shift data through the "Shift Data" interface, the user can input specific board data by selecting the "Board Data" button at the main user interface shown in FIG. 2. As is shown in FIG. 8 the user may enter cycle times for every piece of equipment, enter board specific data, enter a board to use for the simulation, and then return to the main menu by clicking on "Main."

After all the input spreadsheet interfaces are populated with the necessary data, the user executes one or more routines that build simulation objects from the data in the spreadsheet. As is shown in FIG. 2, the spreadsheet can be configured with a soft button, such as the "Create Simulation" button, to build the simulation objects and, in some embodiments, may automatically run a simulation; in other embodiments, the user may be prompted to run the simulation after the simulation objects are built.

Figure 9:
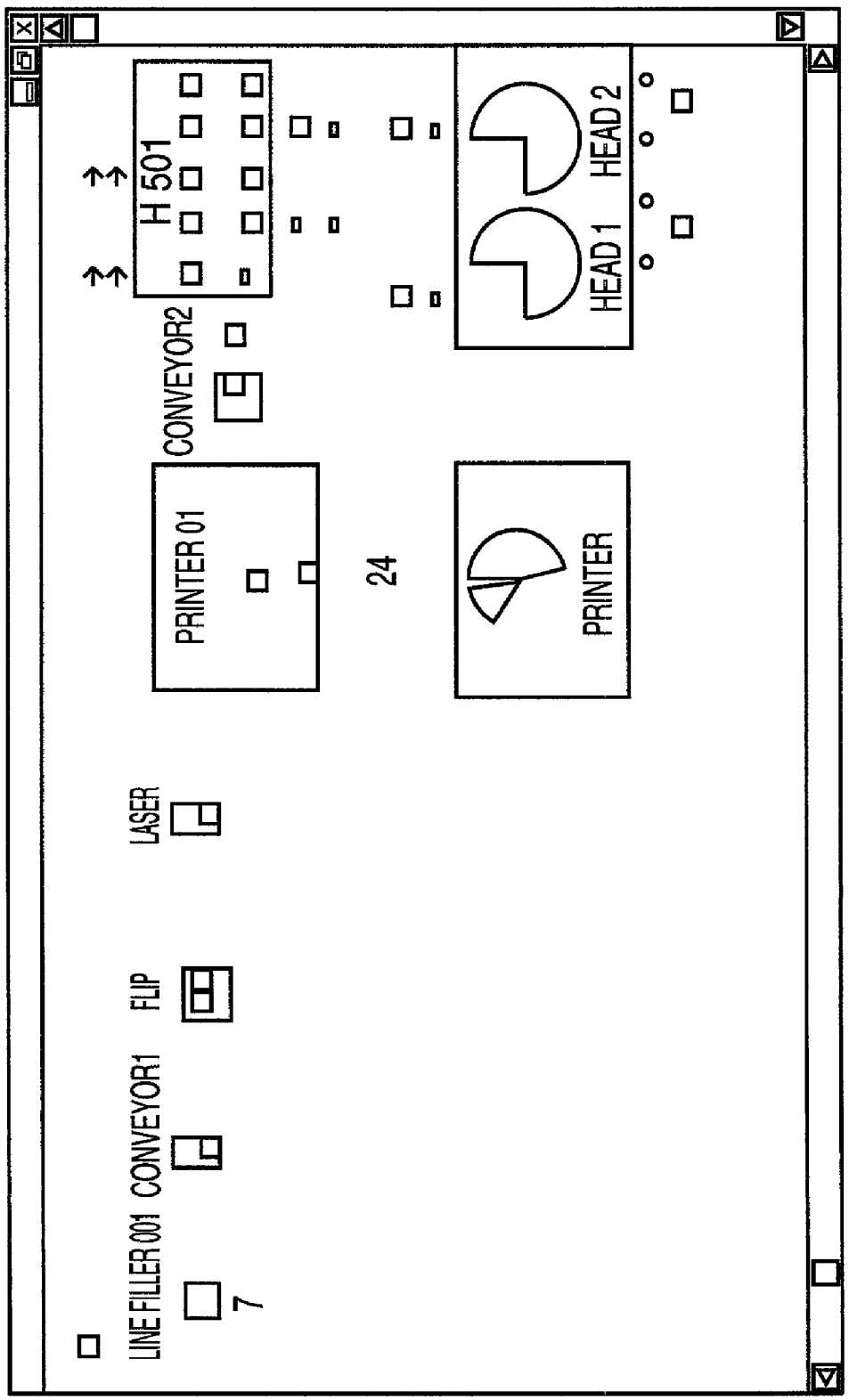
FIGS. 9–9B illustrates a built simulation, in an embodiment of the present invention, that is ready to be run.
Figure 9A:
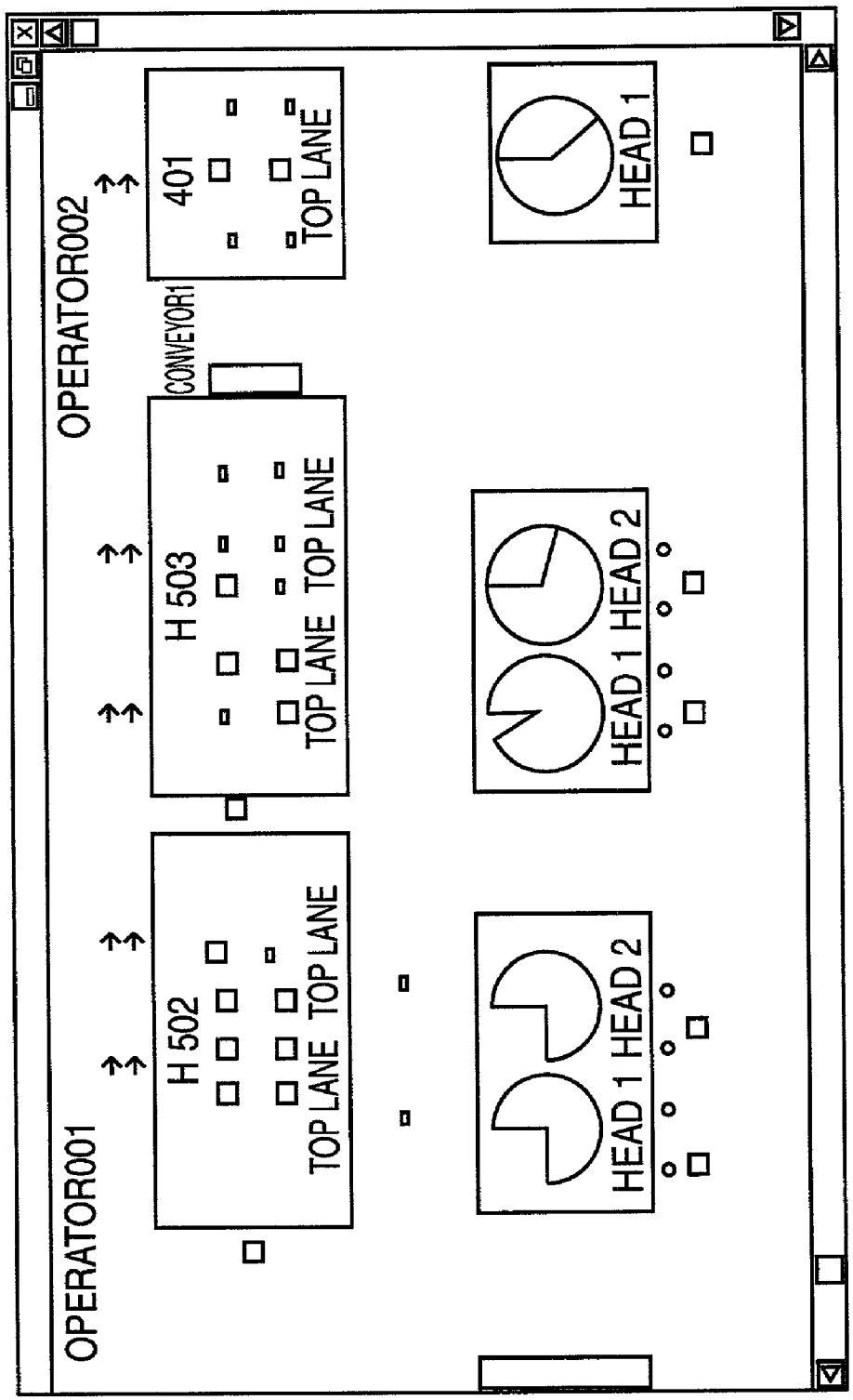
Figure 9B:
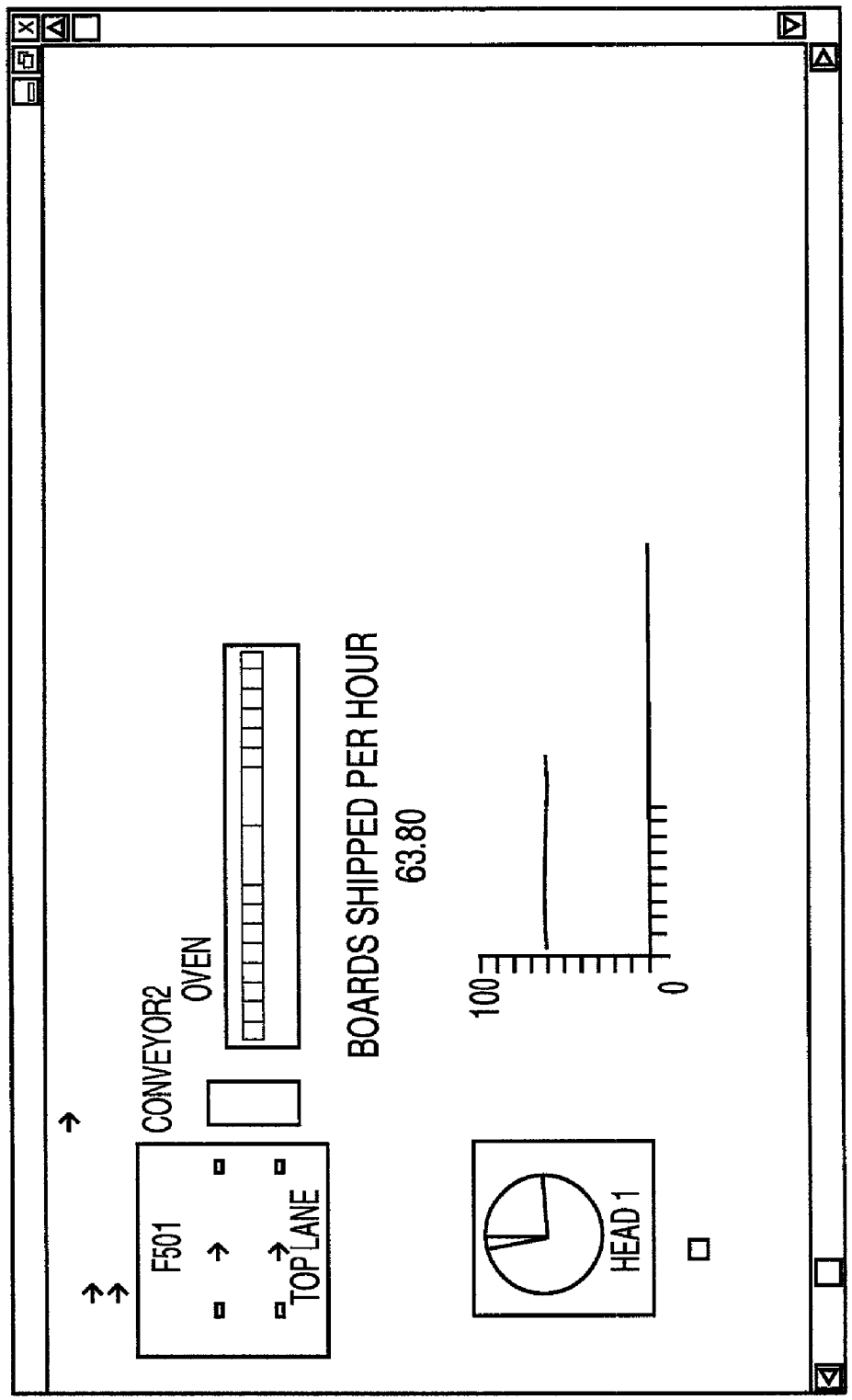

FIG. 9 illustrates a screen view that is reached by selecting the "Create Simulation" button. At this point, all data out of the simulation is transferred from the input interfaces to the CBM_Transfer.XLS module, a Base Mod is copied to the project directory, and Witness® 2000 or other simulation software is opened. The simulation is started and the line or other electronics assembly configuration is built on the screen.

The process for building the simulation objects may be streamlined by creating templates in the simulation software for the simulation objects. Set forth in the APPENDIX is an example of a template for a simulation object for a cluster of 3 Siemens HS-50 machines that may be used with Witness® 2000.

The templates according to the present invention may contain certain values for the parameters for each piece of equipment or process step that are inherent and cannot be readily varied. For example, the conveyor speed, machine routing logic, and station time of a pick and place machine is often fixed. Some of these values may be proprietary. One advantage of burying the proprietary values in the template is that the contents of the The template may also contain place holders for values for other parameters that may vary. These values correspond to the parameters and data in the populated spreadsheet. For example, FIG. 7A, at Row 40, depicts certain parameters for a cluster of two Siemens® HS 50, such as Mean Time Between Failure, etc. The Simulation object template for the HS 50 cluster has corresponding parameters that utilize the values from the populated spreadsheets.

In order to build the simulation objects that are needed to run the simulation software, a simulation development tool interfaces the spreadsheet with the discrete simulation software. The development tool extracts data from the user interface spreadsheets and other sheets, e.g. board data, shift data, etc. It puts this data in a Transfer File, such as, CBM_Transfer.XLS, where the data can be used to the build large and data intensive simulation objects in the discrete event simulation software. In one embodiment, the development tool uses an OLE connection to interface a spreadsheet, such as MS Excel®, with a discrete event simulation software package, such as Witness® 2000. Other simulation, such as ProModel® (available from Promodel Corp., Provo Utah), Automod® (available from Autosimulations, Provo Utah), Arena® (available from Systems Modeling, Pittsburgh Pa.), Saimple® (available from AESOP GmbH, Germany) can also be used. Preferably, the development tool has grouping functionality similar to that found in products such as Microsoft Powerpoint.® To avoid accidentally moving objects, a lock function can be incorporated. The lock can be on a module base and the lock may be password protected.

The APPENDIX provides exemplary code for a software tool that, as is shown as step 4 of FIG. 1, extracts designer objects from an Excel Spreadsheet, builds simulation objects and places the current data in a Witness® 2000 simulation.

After the simulation objects are built, they may be outputted, e.g., to the screen, in a spreadsheet form as is shown in FIG. 9. A simulation may be run by selecting a button to execute the simulation, or the simulation may be programmed to run automatically after it is built.

After the simulation is run, outputs from the simulation software may be exported to an output spread sheet. When used to perform electronic assembly solutions, outputs may comprise data such as the number of circuit boards processed per time period of simulation and utilization of machines and conveyors. The present invention could be used in other areas besides the electronic assembly area and would provide data appropriate to these areas.

Figure 10:
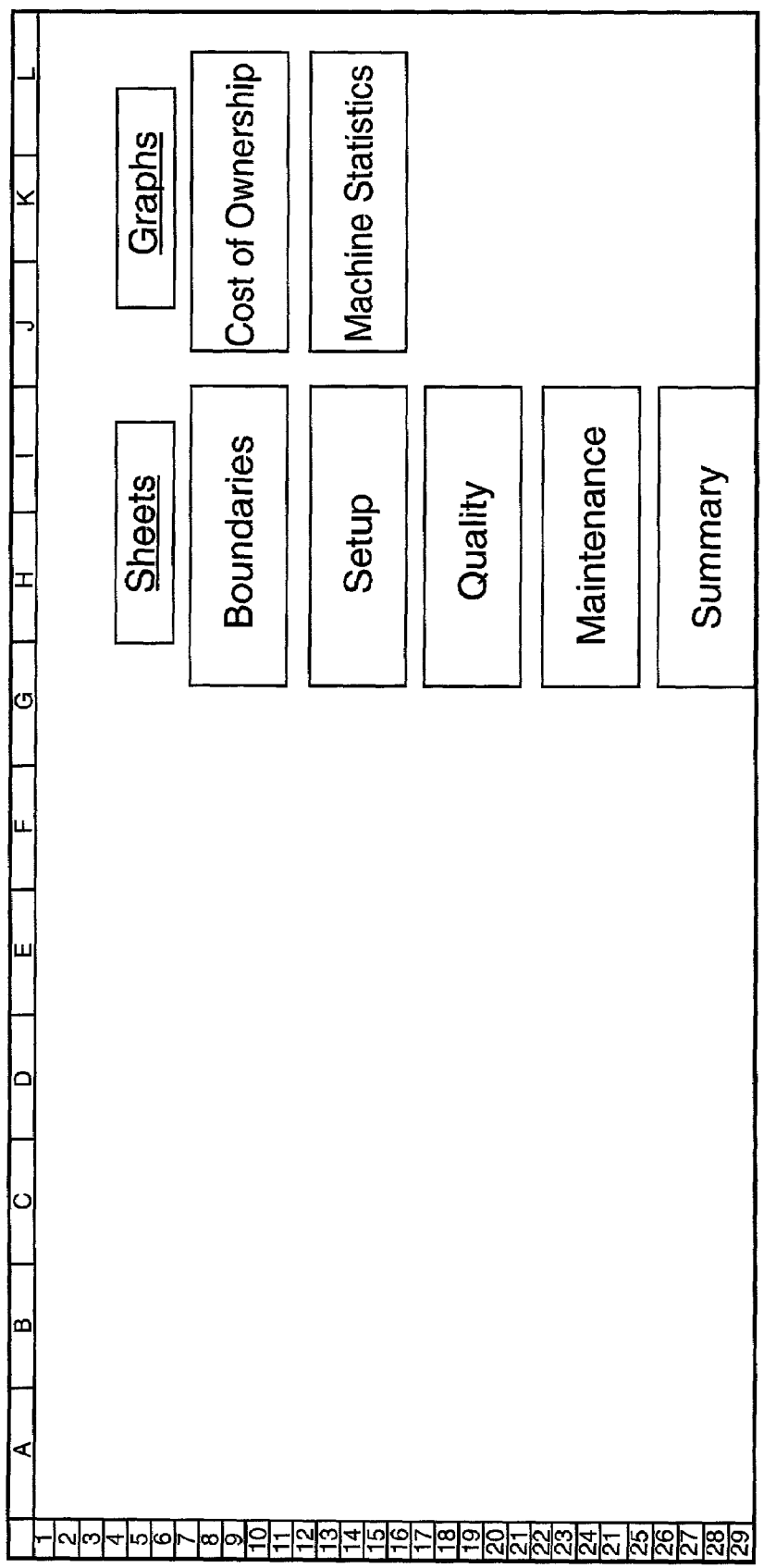
FIG. 10 is a screen view of an output interface in the form of a spreadsheet that is capable of generating customer specific reports, in an embodiment of the present invention.

The output spreadsheet may be configured to accept certain inputs, such as boundary conditions, exchange rates, and depreciation rates. In some embodiments, the output spreadsheet may contain buttons such as those shown in FIG. 10. The spreadsheet may also be configured to provide useful machine and assemble line data, such as cost of ownership and machine statistics.

Selecting the "Boundaries" button opens the interface shown in FIG. 11 and allows the user to enter boundary data. Selecting the "Setup" button results in the launching of an interface as depicted in FIG. 12 and allows the user to enter Setup information. The user may also select the "Quality" button to launch an interface as is depicted in FIG. 13. This allows the user to input quality data and criteria. Likewise, the user can input maintenance data by clicking on the "Maintenance" button, which launches another input interface permitting the entry of maintenance-related information. (See FIG. 14).

Figure 16:
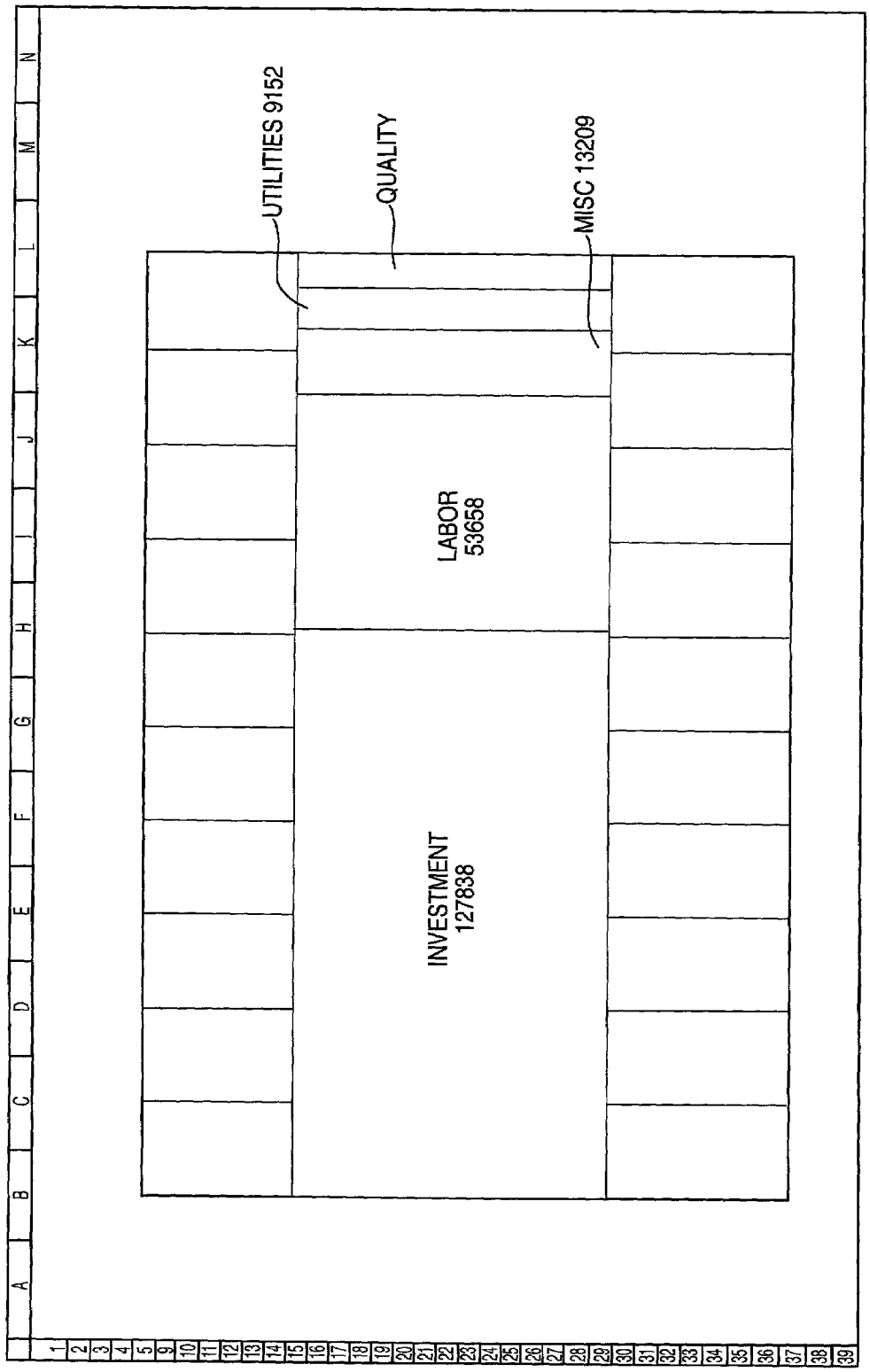
FIG. 16 is a screen view of a graphical report of Cost of Ownership, in an embodiment of the present invention.

FIG. 15 depicts a spreadsheet configured to provide cost of ownership data. The data may also be depicted graphically as is shown in FIG. 16. Typical cost of ownership calculations may employ the following equations.

Cost per Year=Investment*depreciation(%)*(1+Interest Rate)+Labor cost Operator+Labor cost Technician+Electricity cost+Air costs+Nitrogen costs+Floorspace costs+Spare part costs+Setup cost+Maintenance cost. All costs may be summarized per year.

Output per year=(Yearly working hours−setup time−maintenance time−quality time)*Real placement capacity (by simulation)

Quality time=time which is necessary to reproduce bad boards.

Figure 16A:
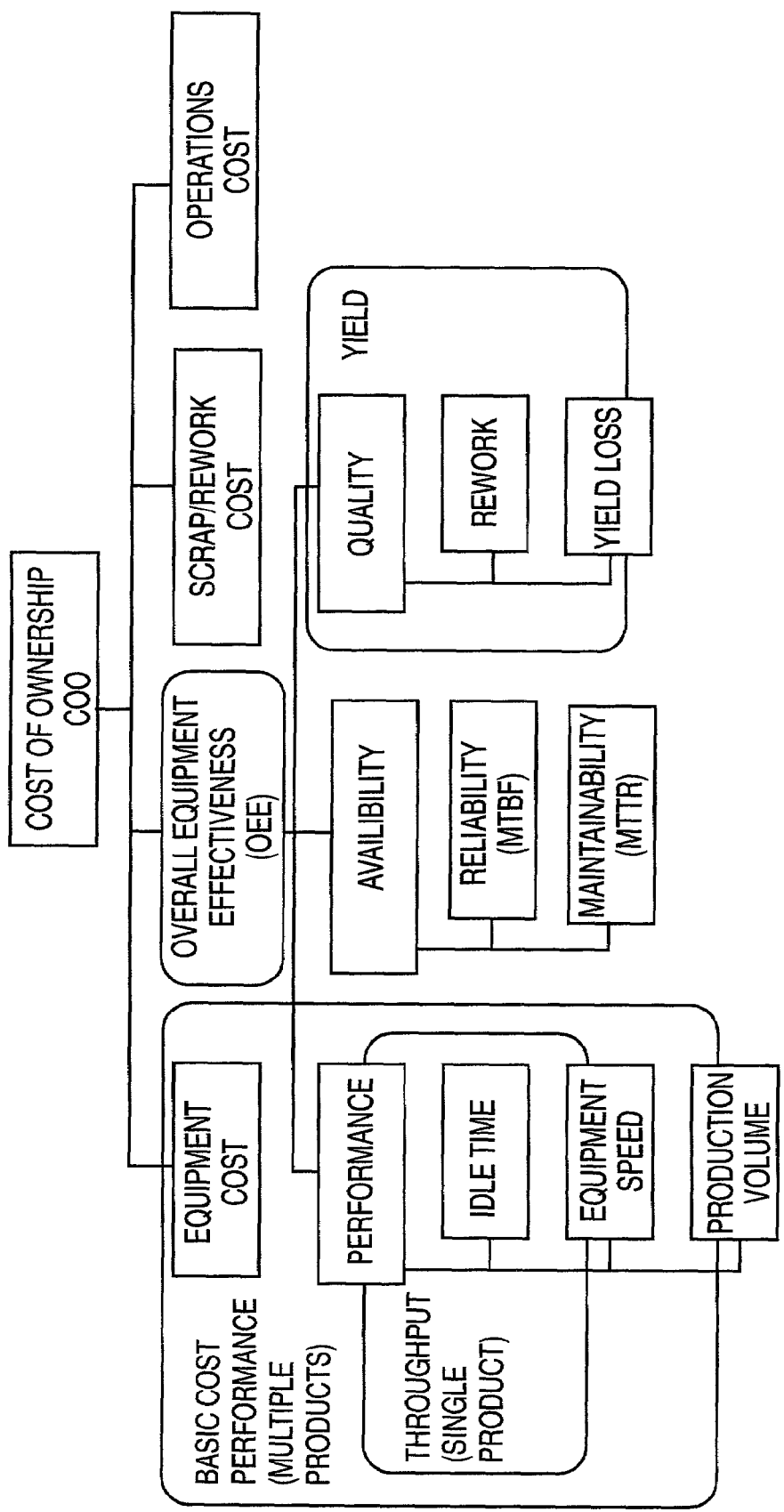
FIG. 16A is a flow-chart illustrating a cost of ownership routine, in an embodiment of the present invention.

FIG. 16A is a flowchart illustrating how a cost of ownership function may be configured. Typically, cost of ownership will be calculated in conformance with SEMI E 35 standards, which are hereby incorporated by reference.

Central to a successful modeling and simulation effort is the arrival at an appropriate level of abstraction for modeling the system of interest. While simulations may be run at various levels of abstraction, tradeoffs between accuracy and speed often exist. One wants to represent the system with sufficient fidelity and detail to generate results that satisfy the developer's objectives. At the same time, this goal needs to be achieved without excessive use of scarce resources, which, among other things, include the time available to set up particular models of systems to be simulated, as well as the time for the simulations to execute.

According to the present invention, satisfactory results in the electronic assembly solutions area may be obtained by modeling assembly system configurations at a material flow level of abstraction. Other levels of abstraction may be used might be used consistent with other aspects of the present invention; however, a higher level of abstraction may produce less accurate results and a lower level of abstraction may require more resources and may give more detail than is necessary for adequate customer benefit modeling. For example, to simulate at a lower level of abstraction, more details may be required for the simulation objects.

Because the present invention allows simulation objects to be built, and simulations to be run, in a comparatively short period of time, it is possible to quickly and easily model actual production line configurations. This modeling allows the accuracy of the simulation to be accessed and also allows simulation parameters to be adjusted to improve the overall performance of the simulation tool. For example, if the cycle time of a particular machine were reduced by one second, the tool can be used to predict the effect on the entire line's performance.

The present invention provides numerous advantages when modeling and designing assembly lines and other systems. In particular, the present invention provides an easy-to-use customer benefit modeling tool that is readily adaptable for use in the electronic assembly systems equipment and/or solutions areas. It enables a method for applying customer benefit modeling to permit new pricing and financing arrangements for the electronic assembly systems, equipment and solutions areas, and it provides for a consultative sales process that employs these modeling approaches. For example, consultants and others may employ the customer benefit modeling to develop performance-based contracts for configuring and/or selling of assembly and/or production systems. By incorporating a customer solutions database that employs standard calculations, all consultants employing the tools and techniques of the present invention will have at their disposal standardized calculating schemes. This will enable improved solutions business models based on analysis, modeling, simulation, and quantification of customer benefits.

The tools and techniques of the present invention may be used to provide a model-based, closed loop process control approach to electronic assembly. An optimizer module based on advanced computing methodology may be added, as well as a combined business rule repository/optimizer module for electronic assembly systems, equipment and/or solutions. A combination data mining module and business rule repository may also be added.

The present invention may also be enabled to function over a network, such as the Internet. Consultants and customers can then access the tools and methods of the present invention from virtually anywhere. In addition, a web-based version allows the simulation objects to be centrally maintained and the database of parameters for the designer elements may also be centrally maintained and readily updated.

Figure 17:
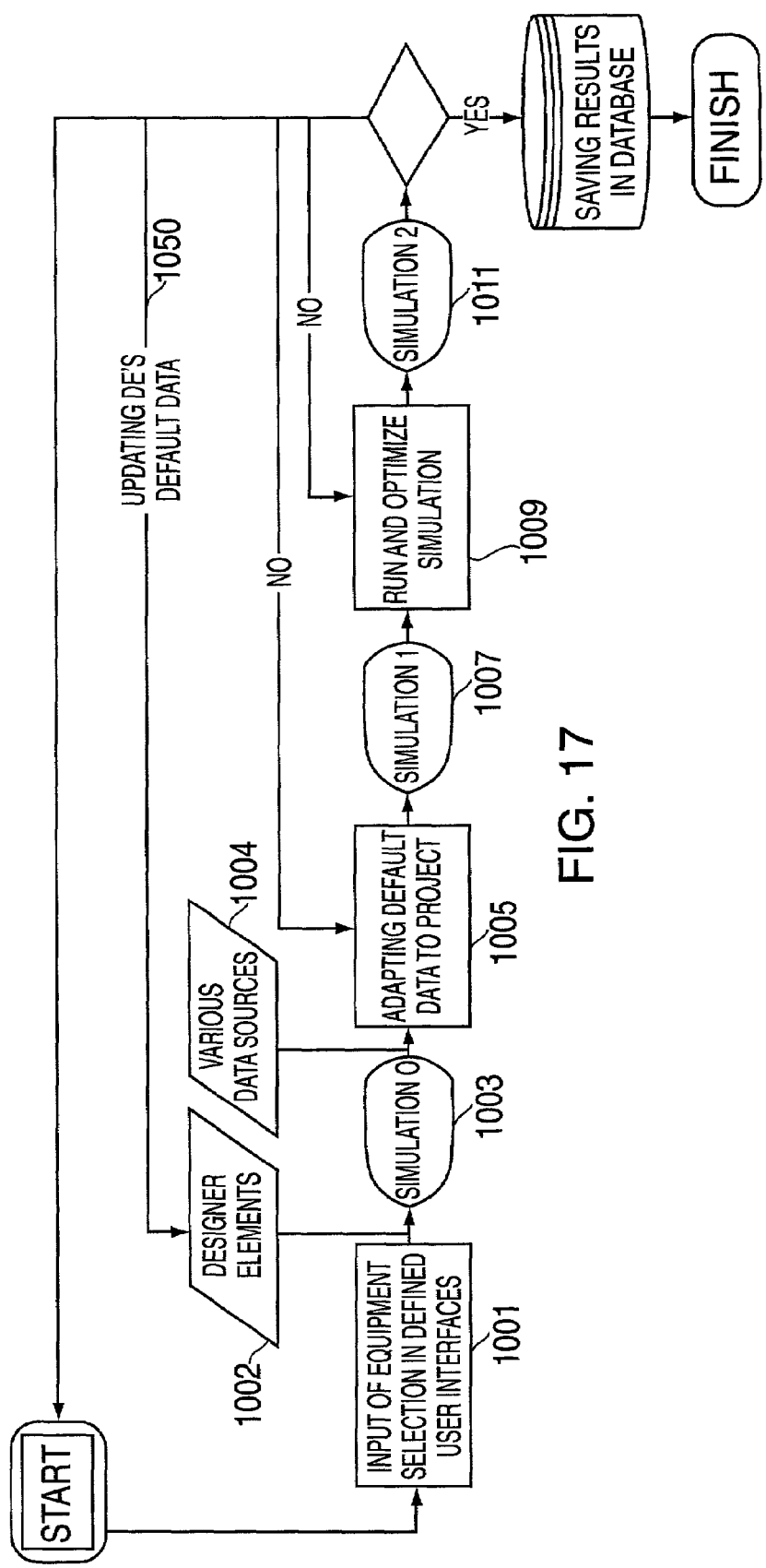
FIG. 17 is a flow-chart illustrating a process for using the Customer Benefit Tool, in an embodiment of the present invention.

The present invention is particularly well suited for use by consultants wishing to improve the efficiency of assembly lines. FIG. 17 illustrates the logic flow of how the present invention may be used. A consultant first inputs, in a defined user interface, a configuration resembling an existing assembly line, step 1001. The consultant may do this by selecting or inputting predefined Designer Elements, 1002, which may include values for certain operating parameters associated with the equipment and line being modeled. These values may be stored in a separate database, which can be periodically updated. This results in a base case configuration, Step 1003. Next, various data, such as actual customer data inputs, 1004, including actual operating parameters from the existing line may be incorporated and used to adapt the default data of the base case, step 1005. If data on the actual operating parameters is not available, default data can be used. Next, a simulation is re-run using the actual customer data, step 1007. The values obtained by the model can be compared with the customer's actual production line data.

Next, at step 1009, the consultant, using his own consulting knowledge, may attempt to optimize certain line parameters, such as cycle times, times to repair a particular machine, length or speed of conveyors, etc. It is also possible to allow the simulation software to automatically optimize some of these parameters. For example, Witness® 2000, contains a function to do this automatic optimization. Some of these parameter values may have initially been incorporated from the data associated with the Designer Elements.

Another simulation is created, step 1011. If the simulation produces erroneous results, it may be necessary to redefine and re-adapt the default data to the project at step 1005. If the results produced at step 1011 are reasonable, the configuration and associated parameters can be stored in a database, 1020, or the optimization step 1009, may be re-run to further optimize the line.

Logic flow line 1050 in FIG. 17 shows one possible embodiment where the operating parameter database associated with the designer elements is updated based on real world experience. This database may be updated and be customized to reflect actual experiences of a particular customer.

Figure 18:
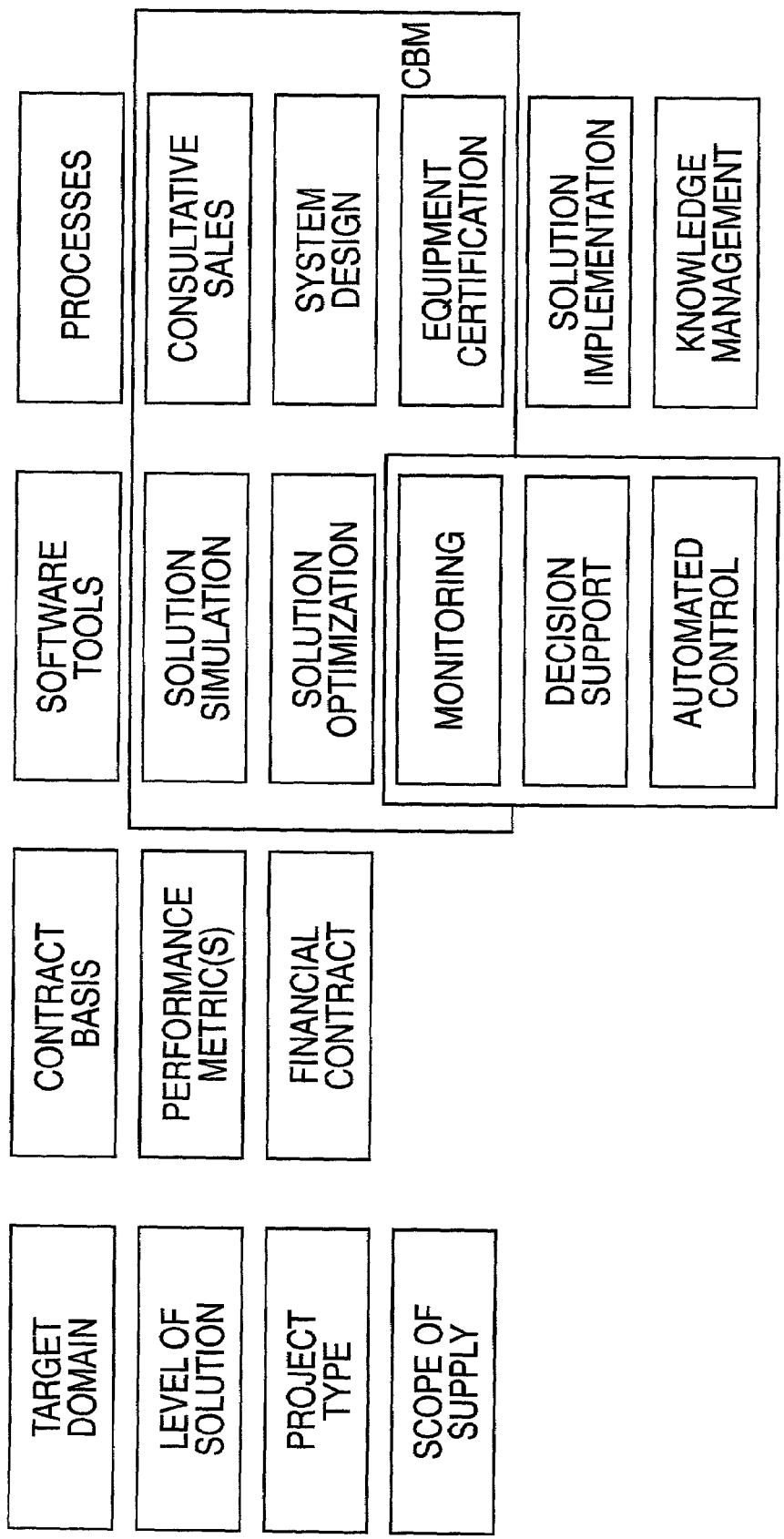
FIG. 18 is a diagram showing a set of relationships between customer benefit modeling according to the present invention to various aspects of objectives of a business model that may employ aspects of the present invention.
Figure 19:
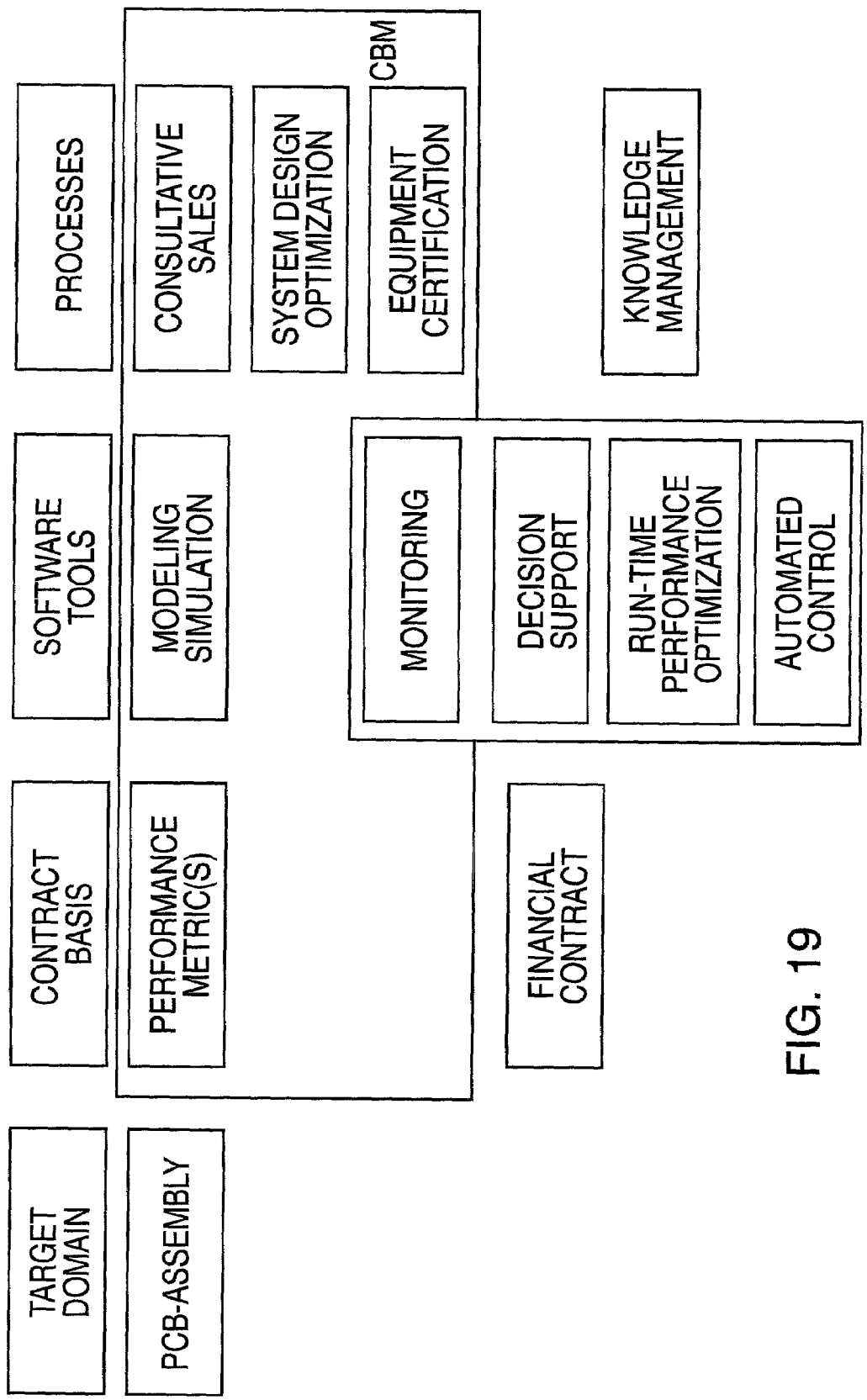
FIG. 19 is a diagram showing a set of relationships between customer benefit modeling according to the present invention to various aspects of objectives of an alternative business model that may employ aspects of the present invention.
Figure 20:
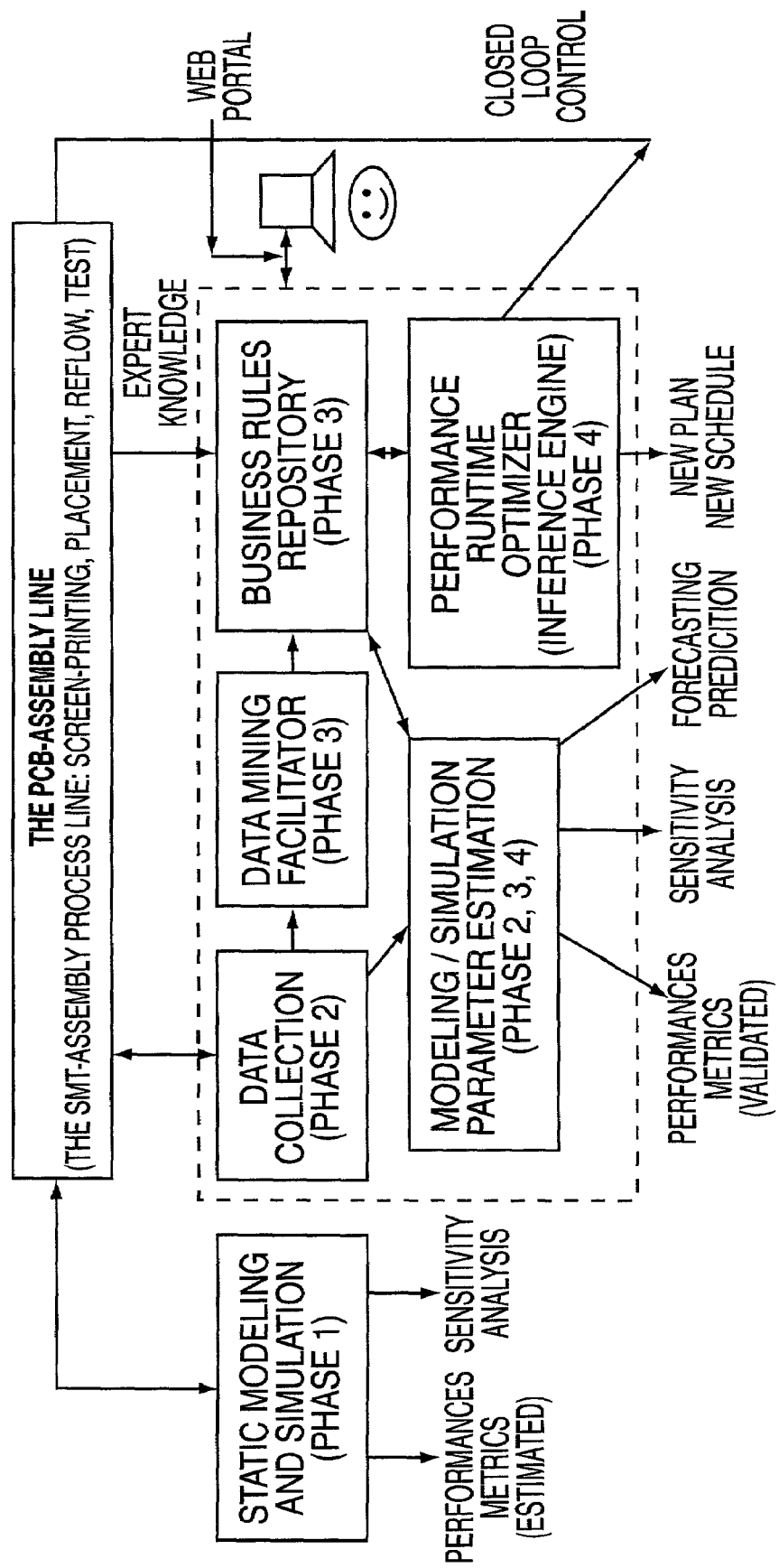
FIG. 20 illustrates an electronics assembly systems solutions business model embodying and employing aspects of the present invention.

The customer benefit modeling tool of the present invention may support various business models and methods. For example, the tool may be used as part of a method of doing business for an electronics assembly solutions business, such as is outlined in FIGS. 18 and 19. An electronics assembly solutions business method may employ various phases, as is outlined in FIG. 20. In phase 1, a PCB assembly line may be modeled statically and a simulation may be run using performance metrics that are estimated and may perform sensitivity analysis. In a phase 2, data may be collected from the PCB assembly line. In phase 3, data mining may occur through a Facilitator. The data collected may be used to perform modeling and simulation, as well as parameter estimation to validate performance metrics, perform sensitivity analysis, to perform forecasting and prediction. A business rule repository may be implemented that may, in some embodiments, acquire expert knowledge—from consultants and customers. The business rule repository may exchange information with modeling and simulation parameter groups, which may in turn with the business rules repository data be used to do line optimization. Performance may be optimized by the use of an Inference Engine. The method may be web-enabled using web portals and may provide feedback to the PCB assembly line for closed loop control.

The electronics assembly solutions business method may focus on the line, multi-line and shop floor levels in a customer's electronics assembly facilities. Customers may be both original equipment manufacturers ("OEMs") and contract manufacturers ("CMs"). A solutions business method may encompass a scope of supply that includes placement machines and other machines from Certified Partners, line level software products and a full range of service and support capabilities. The sales of electronics assembly solutions may be managed through a new Consultative Sales Process based on Customer Value Space Analysis and Fulfillment. The primary opportunities to increase customer solutions value include: Increased utilization, throughput, yield, flexibility and responsiveness; Reduced inventories; and Effective new product and new technology introduction. Long term performance may be optimized through bundled packages of innovative software and consulting services. This may enable real people in real factories to achieve high levels of ongoing system performance. Once a system has been modeled and implemented, real production data can be used to calibrate the model and improve the accuracy of future system changes.

Figure 21:
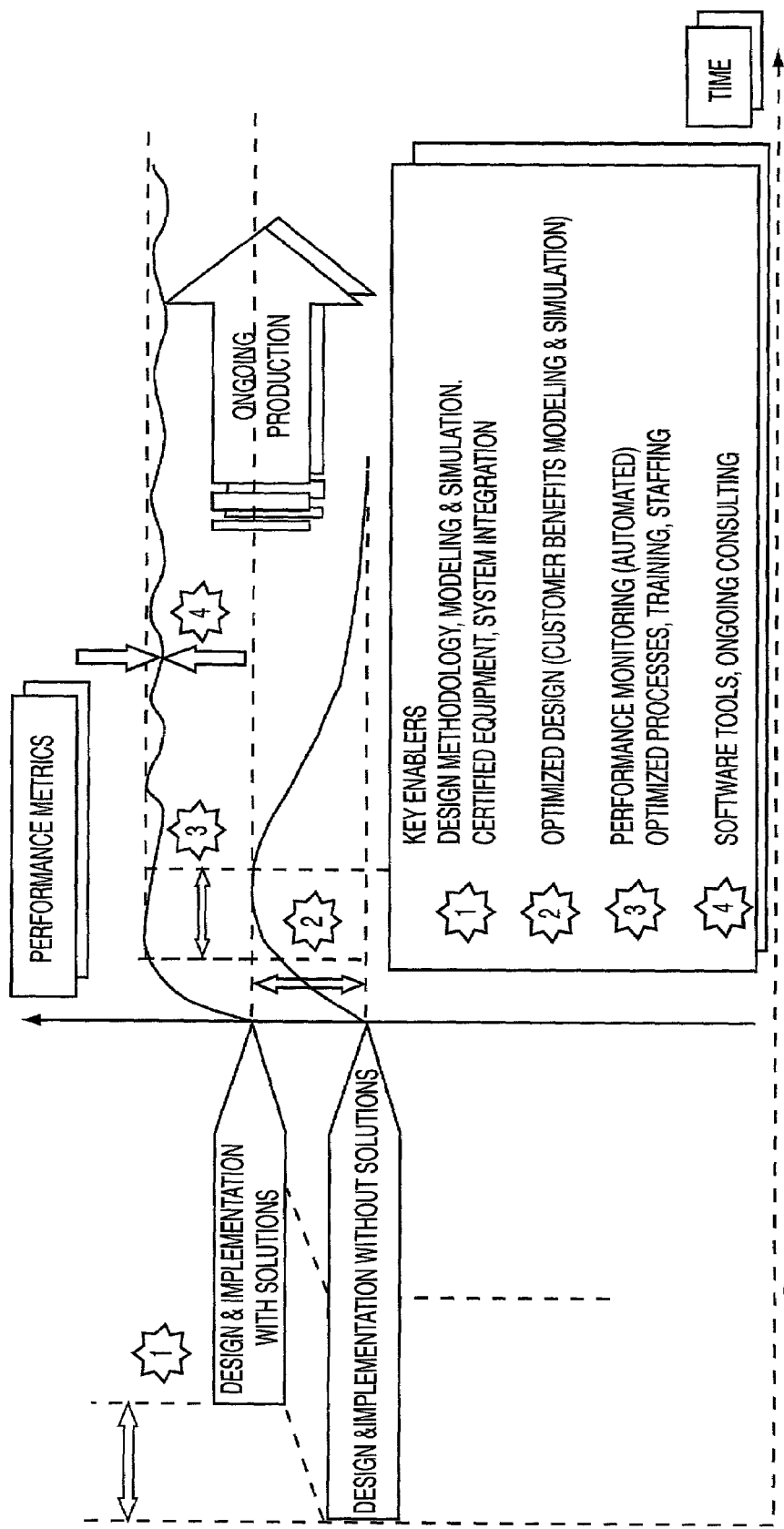
FIG. 21 graphically shows electronics assembly customer benefits and enablers provided by various aspects of the present invention.

FIG. 21 graphically represent the advantages that are achievable with the tools and methods of the present invention when compared with prior art tools and methods. As is graphically depicted, key enablers, i.e. products, methodologies, practices, tools, software applications, services, etc. enable customers to improve their performance and enhance performance metrics. Enhancement may be improved as part of an ongoing production line.

Figure 22:
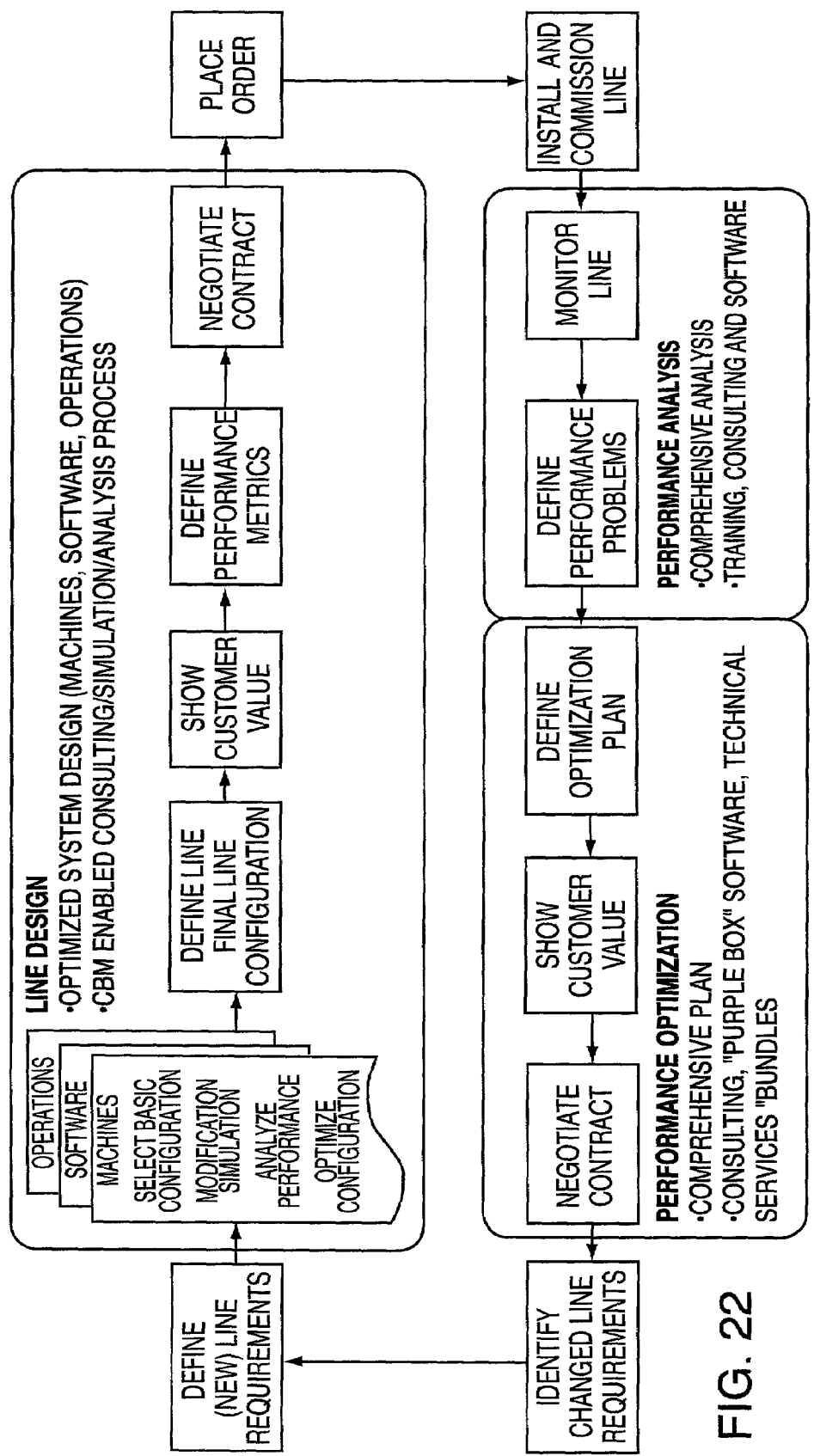
FIG. 22 graphically illustrates an electronics assembly solutions value proposition from a customer project life cycle view.

The flowchart in FIG. 22 graphically illustrates a solutions value proposition from a customer project life cycle view. First, new line requirements are defined. Next, the basic configuration is selected. Suggested modifications are simulated, performance is analyzed, and the line configuration is optimized. A final line configuration is defined and a customer is shown the value of the optimization. Key performance metrics are defined and a contract implementing the optimization is negotiated.

Next, orders are placed for necessary equipment and components. The new line is then installed and commissioned. The line is monitored and performance problems are defined as part of a comprehensive performance analysis. An optimization plan is defined and the customer is shown the value of the optimization. A contract is then negotiated and required line changes are identified. The process may be repeated until the desired level of optimization is reached.

The customer benefit modeling tool of the present invention enables a business method that includes the steps of providing a specific set of documented, quantitative consulting process by trained consultants within a defined consulting framework. In an embodiment of the consulting process according to the present invention, a consultant: benchmarks existing customer operations; identifies and prioritizes solutions opportunities at a customer site; designs optimized solutions comprising machines, software tools, and operating parameters, such as staffing; defines achievable target performance metrics for proposed solutions; and quantifies and shows the customer benefit of implementing the proposed solutions.

The tools and methods of the present invention define: optimum shop floor configuration for a defined set of products and production volume; optimum line configurations and specific equipment within the shop floor; optimum batch sizing; set-up and changeover strategy; achievable target set-up and changeover metrics; achievable target run-time performance metrics; the operating environment needed to achieve target performance metrix, such as staffing, material supply, maintenance, operating rules; when and how to introduce specific new technology; and when and how to introduce new products.

The customer benefit modeling tool can accurately predict the performance of real production systems because it uses a dynamic model based on discrete event simulation. Accordingly, it enables customer system performance to be expressed in a range of metrics, including for example, throughput, cost performance, yield, OEE, and COO.

Figure 23:
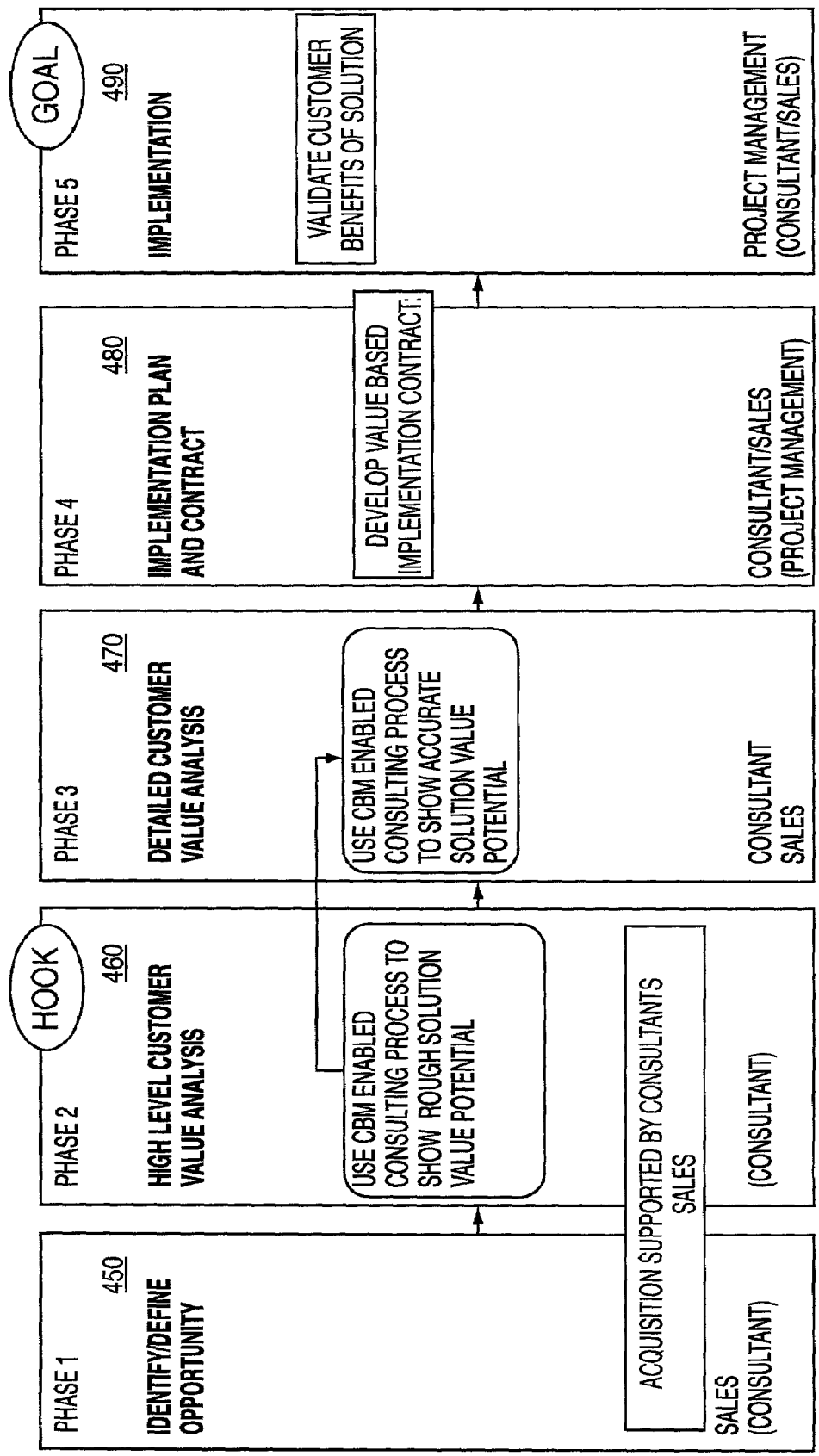
FIG. 23 is a high-level flow-chart illustrating a consultative sales process business method according to the present invention.

An embodiment of a method according to the present invention of using the customer benefit modeling tools described above involves managing a given customer's specific project through a series of phases defined by a consultative sales process, as is outline in FIG. 23. These method steps include:

Step, 450, phase 1—Identify opportunity. In this step, which is a solution level, custom details, primary issues and goal are identified. Key criteria, such as needs, willingness to pay, and potential costs and savings are also identified. This step may be performed by a consultant or salesperson. If performed by a salesperson, a consultant may provide any necessary support.

Step 460, phase 2—Identify specific high level analysis. In this step, specific opportunities are identified for detailed analysis. The customer benefit tool of the present invention enables a consulting process, which may include showing a rough solution with value potential to a customer. In some embodiments, this will be generated on the fly during a sales call or initial meeting with the client. "What if" scenarios can be evaluated quickly to illustrate the value that can be added for the customer.

Step 470, phase 3—Detailed Customer value analysis. In this step, detailed measurements and analysis for each area covered in phase 2 can be performed. The customer benefit modeling tool of the present invention enables a consultant to show accurately the solutions value potential. "What if" changes and benefits can be analyzed. In this phase, more detailed analysis is performed. In one embodiment, the consultant is paid for his time and efforts in this phase, whereas in phase 2, the consultant or sales person may make only sales pitches and therefore not be compensated for the effort expended there.

Step 480, phase 4—Implementation plan and contract. In this phase, a detao;ed performance improvement plan for each area from phase 3 is developed. A value based implementation contract may be drawn-up and negotiated. Also in this phase, the equipment, software, implementation plan, scope of consulting and technical services can be specified.

Step 490, phase 5—Implement. In this phase, the plan of phase 4 is implemented. The proposed customer benefits of the proposed solution are validated. This phase provides an opportunity for the consultant to demonstrate excellent implementation capability. The consultant also has the opportunity in this phase to become a preferred supplier (over internal resources) for the next project. The consultant, in some embodiments, is paid on a value added basis.

In an embodiment of the consultative sales process, all results from customer specific projects are used to build a customer solutions database. This database enables: Benchmarking of the current and proposed solutions; Proliferation of "best practice;" Consistency of processes and solutions; and Minimization of overall solution variety.

A consulting knowledge management process can be used to organize, update, and disseminate knowledge about the customer benefit tool, the consulting process, the consulting framework and the customer solutions database. In one embodiment, the consulting knowledge management process comprise: Documenting; Training; Performing case studies; and Meeting to discuss "Best Practices."

The customer benefit modeling tool of the present invention is particularly well-suited to enable electronics assembly solutions selling based on customer value. The tool allows firm performance metrics to be established for any electronics assembly solutions project prior to implementation. The metrics may span the range from throughput, basic cost performance and yield, through overall equipment effectiveness ("OEE") and onto full cost of ownership ("COO"). The tool enables a consultant to accurately quantify unfulfilled value spaces at a customer site; design an optimized assembly solution to "fill the spaces"—this results in low cost of production and other customer specific goals; and to quantify and show the customer benefit of the proposed solution.

The customer benefit tool of the present invention enables unique and innovative sales and marketing techniques by offering low-risk line level performance guarantees (e.g. throughput, yield, OEE, COO, unit assembly cost). The present invention also offers gain share pricing solutions packages.

The tools and methods of the present invention may be used to model various processes and production environments. One primary target domain is for electronics assembly/test line and shop floor levels, although it is also well-suited for use in the general electronic assembly factory level, including sub-assembly levels of building, final assembly, testing, and packaging). In some key sectors (e.g. cellphone manufacture) electronics assembly and testing are directly in-line with final assembly and testing. In situations such as these, final assembly and testing may be considered part of the electronics assembly line for modeling purposes. Electronics assembly/test lines typically comprise a linked series of linked processing machines and board handling equipment. The handling equipment may include WIP buffers. Local, dedicated, component storage areas may be present. Individual machines may be able to buffer boards between one or more process stages and lince can be single or dual conveyor, synchronous or asynchronous operations.

The primary processes and environments that may be modeled may include SMT assembly (print, dispense, place, reflow/cure), through hole assembly (auto, manual, pin/connector insertion), inspection (manual, auto-optical, x-ray), and Test (in circuit, functional). An electronics assembly shop floor typically comprises: multiple lines that start and finish with a magazine load/unload unit; workcells containing groups of machines (not all in-line); WIP buffers; local component storage areas; tooling storage areas; and feeder set-up/kitting areas.

One business method of the present invention may employ the use of certified machine suppliers. All machines that are offered as part of an electronics assembly solutions will come from a certified OEM partner. Certification may require providing and maintaining for each of the specific equipment/option configurations: Tools for calculation nominal cycle time for a defined electronic assembly; Tools for calculating nominal process yield for a defined electronic assembly; Full and validated COO model, including accurate MTBF/MTTR data; Full classification/definition of interrupts that can decrease throughput from nominal levels; Information/acceptable roadmap for automated provision of key event data automatically available from equipment; and Full classification/definition of factors that can increase defects above nominal levels.

Assembly lines that may be the subject of the consultative sales process and that are suitable for use with the customer benefit model tool include:

Type A lines, which are very high volume, low mix lines having the following characteristic: 100 to 300 k components per hour ("cph"); Up to 14 assembly systems per line (top and bottom assembly); Up to 40 total machines per line with a line length up to 100 m; Fixed set-up (i.e. less than 1 product change per month); 24×7 production; and Pulse time 10 to 45 seconds.

Type B lines, which are High Volume, Medium Mix lines having the following characteristics: 40 to 120 cph; Up to 6 SIPLACE in ine (single sided assembly); Up to 25 machines per line with a line length up to 50 m; Flexibility through "cluster configuration;" and 24×5 operation.

Type C lines, which are medium volume, high mix lines and have the following characteristics: 15 to 50 cph; Up to 3 SIPLACE machines per line; Up to 15 machines per line with a line length up to 25 m; Small batch sizes, wide component and packaging type variety; and Ratio of production to setup/changeover time can be less then 1:1.

Figure 24:
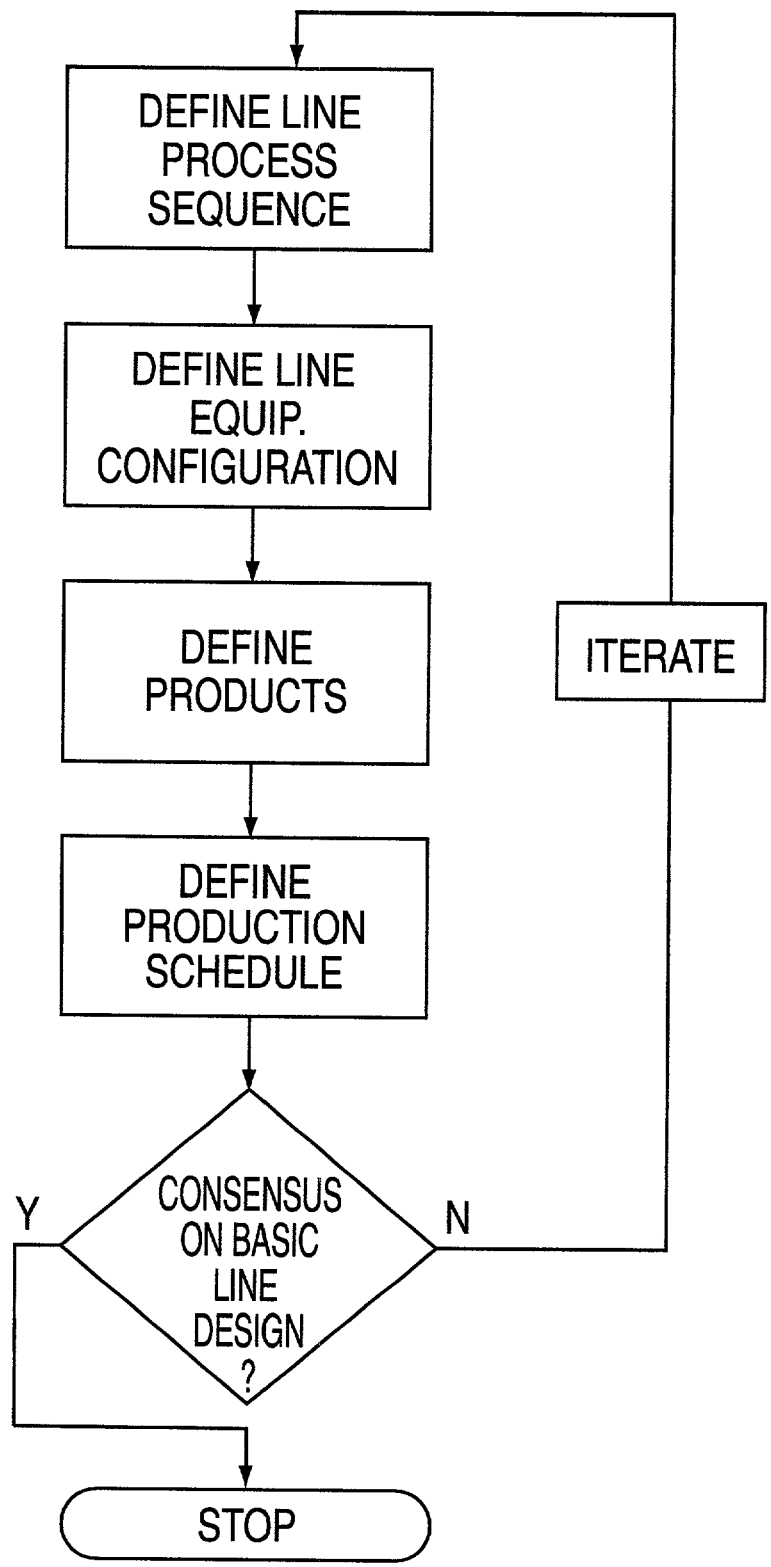
FIG. 24 is a flow-chart illustrating a method for using the customer benefit modeling tool of the present invention to develop a basic line scenario.

A consultant may use the customer benefit modeling tool of the present invention to develop a basic line scenario. As is shown in FIG. 24, the process flow for developing the scenario may start with the defining of a line process sequence. This may be selected from a library of supported process stages. Next the line equipment configuration is defined. This includes selecting models, number of units and options. These may be selected from a library of supported machines. In one embodiment, all have certified/expected COO models associated with them.

Next, in the "products defined" step, a process sequence is entered and for each stage in the process cycle time, composite yield, cost of material added, and handling data are inputted. This definitional step may be manual or may be automated through the use of such tools as Siemens SICALC tool. Next, a production schedule is defined. Set-up cycle time for a first cluster is entered, as is set-up and changeover time. This may be manually inputted or may be automatically inputted from a tool such as Siemens SIPLACE cluster tool. The process may require running several iterations to get a consensus on basic line design.

Figure 25:
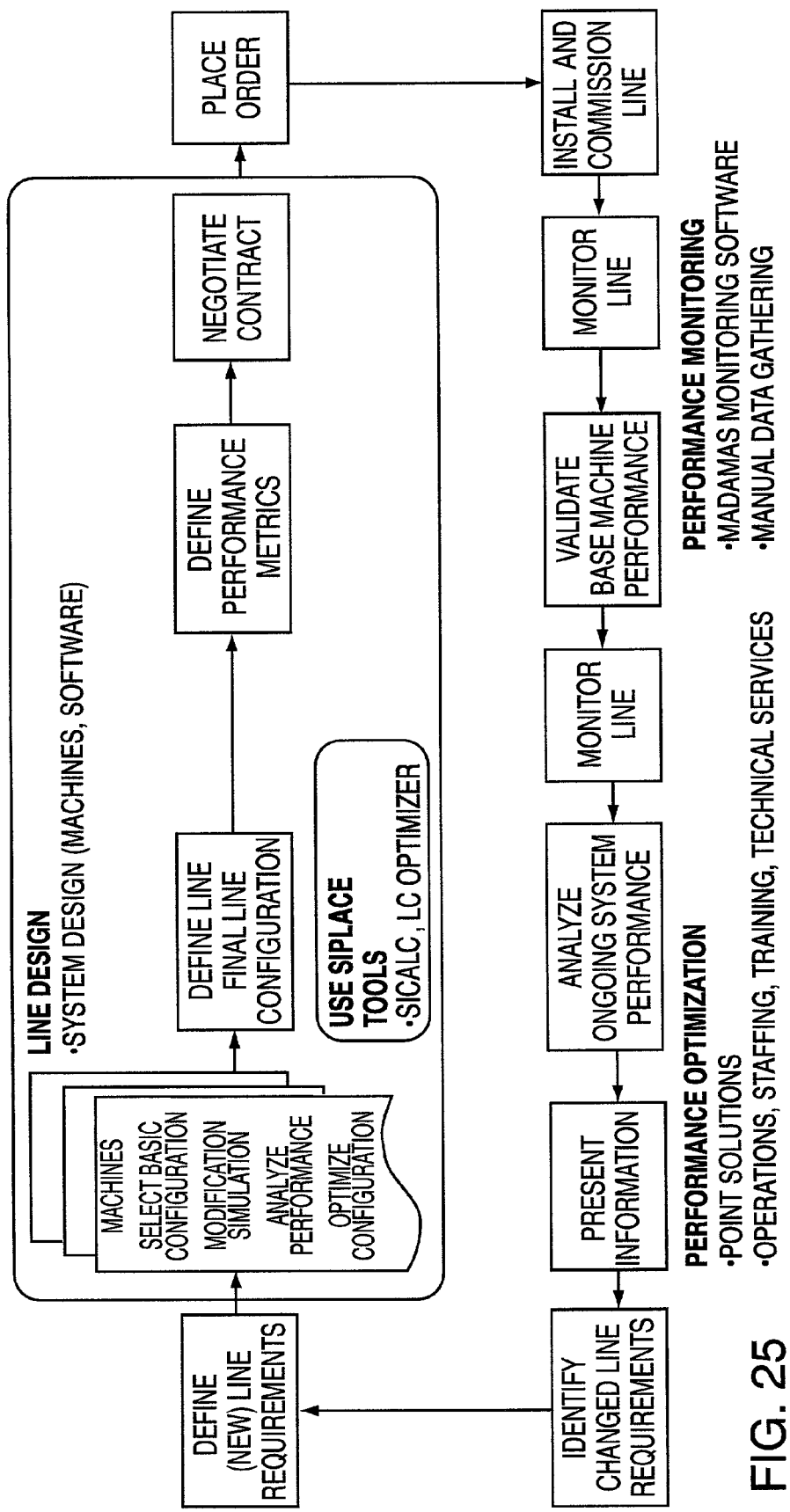
FIG. 25 is a flow-chart illustrating customer project life cycle development in accordance with the present invention.
Figure 26:
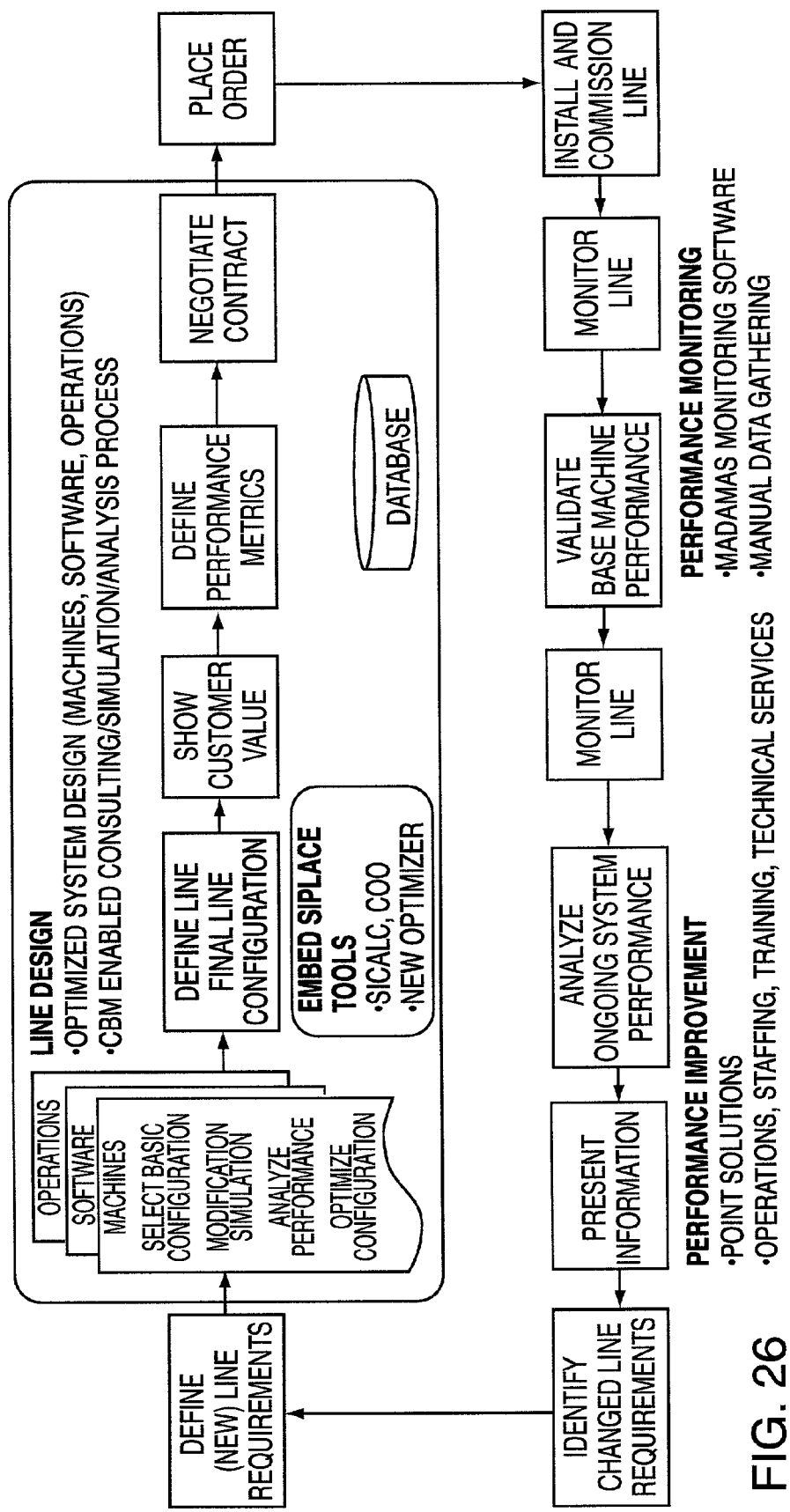
FIG. 26 is a flow-chart illustrating customer project life cycle development with added optimized design capabilities, in accordance with the present invention.
Figure 27:
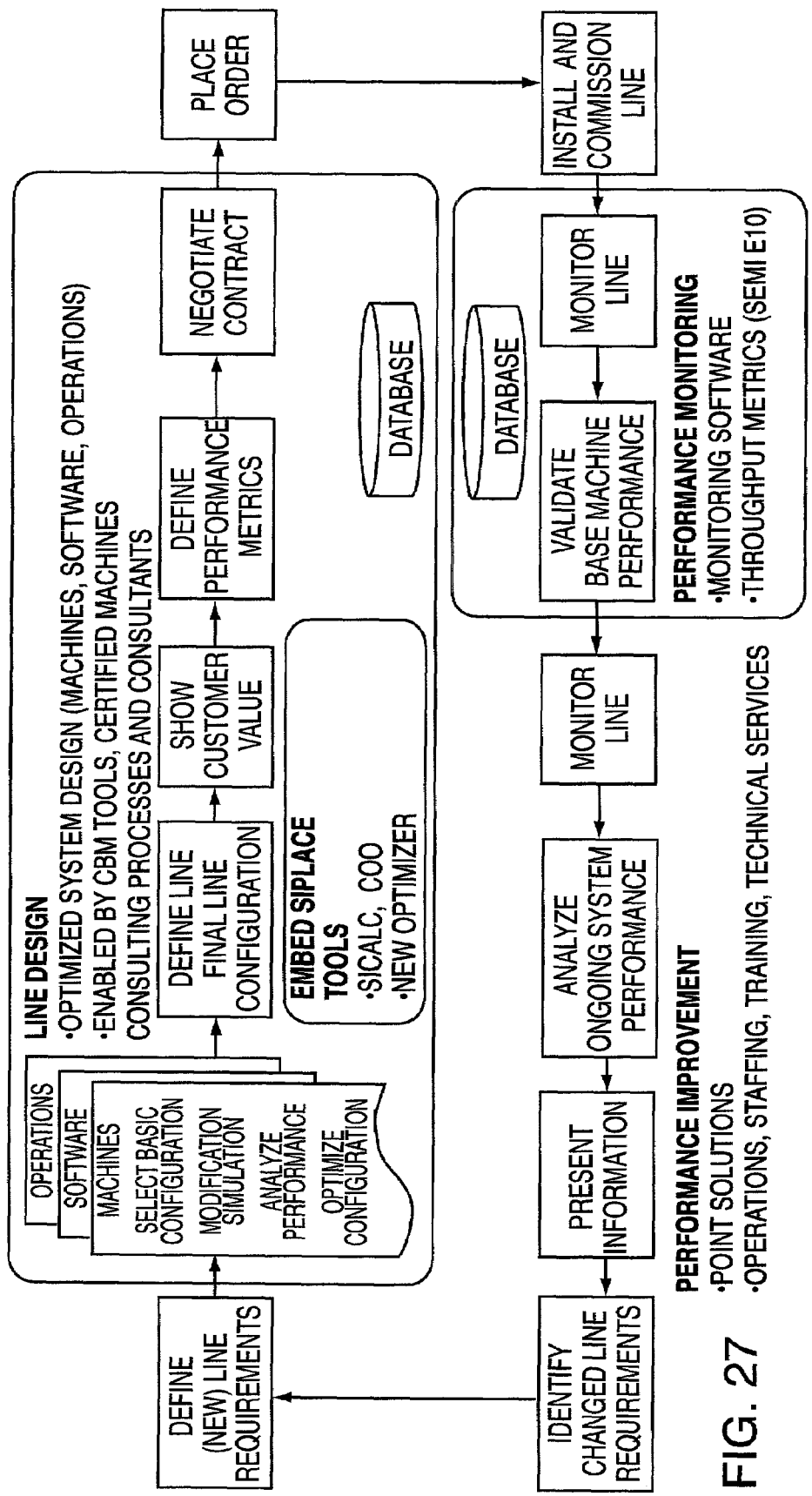
FIG. 27 is a flow-chart illustrating customer project life cycle development with added automated performance monitoring capabilities, in accordance with the present invention.
Figure 28:
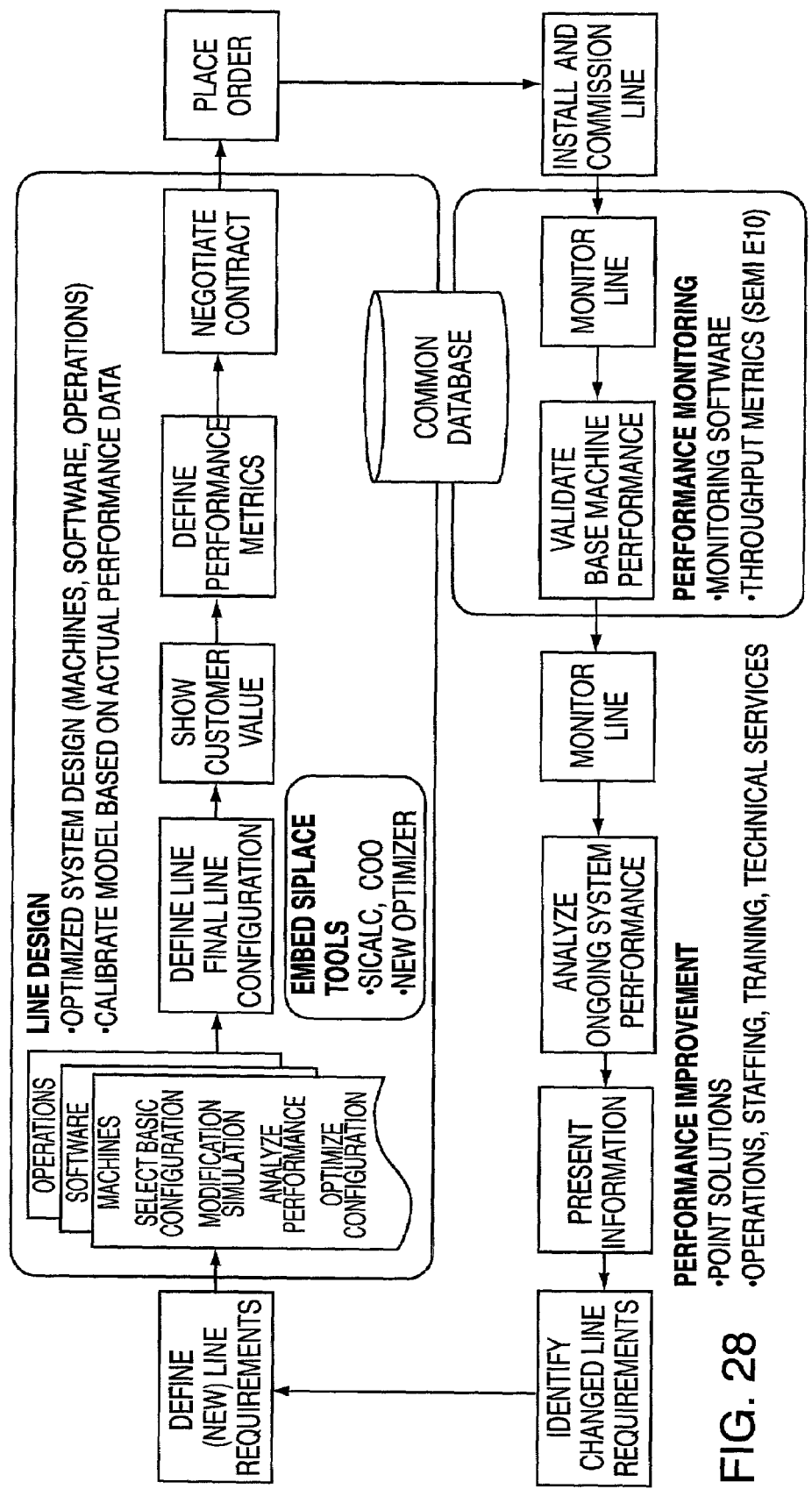
FIG. 28 is a flow-chart illustrating customer project life cycle development with added capabilities to share data between design and monitoring activities, in accordance with the present invention.
Figure 29:
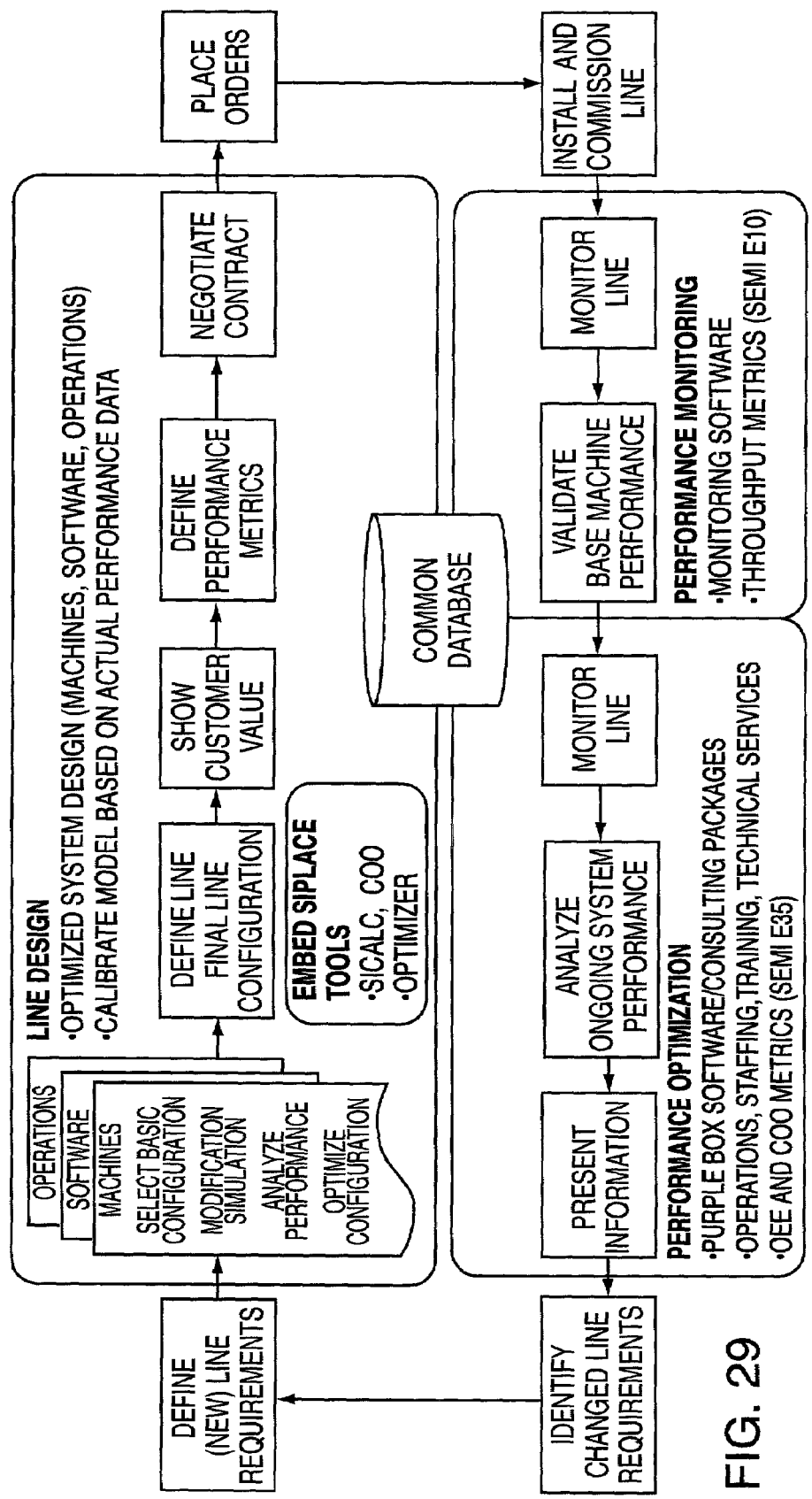
FIG. 29 is a flow-chart illustrating customer project life cycle development with added optimized performance capabilities in which a common database is used, in accordance with the present invention.

The customer benefit model tool of the present invention may also be used to perform customer project lifecycle development. This lifecycle development process is outline in the flowcharts of FIGS. 25 to 29. As shown in FIG. 25 the process can line and system design. It can include optimized design capabilities (see FIG. 26); it may include automated performance monitoring. (See FIG. 27). In some embodiments data between design and monitoring activities may be shared. (See FIG. 28). A common data base may also be employed to aid in performance optimization. (See FIG. 29).

Line Performance Monitoring/Basic Analysis.

One aspect of the present invention is that it allows for line performance monitoring and basic analysis. In one embodiment a line level software application that can be built upon is implemented. All machines in the line may be connected to together through an interface or in any suitable manner. The application monitors and records key time-based event data, such as "Board xyz is entering," or "Begin processing on Boardxyz," or "Board ID='xyz001 is complete," or "Part ABC123 is rejected at pickup location 15." Preferably, the application supports machine/line level performance reporting and simple "drill down" capabilities defined to current accepted industry standards, for example from Semiconductor Equipment and Materials International ("SEMI") or Association Connecting Electronic Industries ("IPC"). Basic line performance guarantees are fully enabled. This embodiment requires the installation of "Solution X" infrastructure (server, framework, database—at least one per site). In this embodiment connectivity to each machine is achieved with interface/adapter kits (i.e. network adapters, drivers, etc.) Other software modules may "Plug and Play" into the infrastructure. This minimizes customer time and the costs involved.

This aspect of the invention is applicable to various manufacturers equipment. The lines that may be monitored may be proprietary, such as Siemens SIPLACE® lines, or they can be comprised of equipment from various competitors.

This aspect of the invention provides for a targeted sales business method where line monitoring capabilities are installed on all new lines. It also enables concurrent/subsequent sale of high value/high margin customer benefit modeling, consulting and sale of software packages.

The customer benefit modeling tool of the present invention may also be used to optimize line set-up and line change over. One method of optimization involves optimizing set-up and changeover strategy to achieve required production goals. The set-up process can be managed to achieve a target performance.

The present invention provides for a consultative method that may include the steps of developing a strategy for optimization, developing an implementation plan, and showing the benefits of the plan to the customer by using the customer benefit modeling tool of the present invention.

Line Set-Up and Changeover Optimization.

In one embodiment, the method of line set-up and changeover optimization may be implemented by software to optimize clustering, perform comprehensive set-up verification, perform changeover management, and handle local logistics.

Optimizing clustering involves consideration of comprehensive production constraints. These may include: board output requirements (wip, lot cycle time, due date); nominal changeover time; component placement rate; number of component reels (or trays, sticks); and number of feeders and feeder tables.

Comprehensive Set-up Verification includes external set-up; it is preferably performed in a closed loop fashion to avoid mistakes. It should cover critical parts, such as value, reworkability, test coverage, and shortages). Changeover Management involves the development of nominal schedules, monitoring key events, and configuring escalation processes/messages. Local Logistics often involve completing a list of required materials to ensure set-ups for the next time intervals.

The benefits of this method include equipment efficiency increases of up to 35%. Less scrap is generated and rework is reduced. This method also results in less set-up errors. The customers that may be prime targets for this method include all Type B and C production, and some Type A (e.g. prototype/pilot runs). When this method is employed, the customer benefit modeling tool may provide to the customer the impact of different clustering and set-up strategies on OEE/COO, the impact of effective changeover management on OEE/COO, the impact of set-up verification on OEE/COO. The cost of a single mistake and the material and rework cost elements may also be shown to a customer. The customer can see the value of the consultants process in terms of real dollars because the customer benefit model can be quickly and easily run for the customer.

The customer benefit tool of the present invention also provides for a method for optimizing line performance during runtime. According to this method, a consultant designs an optimized line. The consultant may select a specific configuration or add or select specific equipment that will result in optimization (e.g. buffers and feeders). Staffing requirements are defined and may include (number, skill level, and tasks). Local material management practices/levels are also defined and may include components, WIP, and consumables. PM strategy is also defined and may include frequency and duration.

Software may be employed to perform line monitoring. It may incorporate additional events not provided in the basic monitoring package. The software may also be useful for performing analysis, such as providing a range of basic analysis relevant to different "User Views." In other words, each user, depending on his or her role, will have a different view of the information provided by the entire system. Accordingly, each role within an organization will have access to the right information/applications in the right form to effectively perform their tasks. For example, a line operator will have another set of information than the line supervisor or the maintenance technician or the production manager. As a further example, a solution may be expressed in terms of capacity for line management and terms of cost of ownership for executive management. The software may assist with local logistics. The software can manage, among other things, lists of required materials to avoid run out during the next time interval(s). It can also provide reports of separate scrap usage of components, as well as packaging related groups.

The benefits of the line runtime performance optimization method include the following. Equipment effectiveness may be increased by up to 35%. Bottleneck analysis and optimization may be provided. Material run out may be avoided. And other interrupts, such as feeder jams, mispicks, etc. may be minimized. Scrap and rework costs are reduced. The method results in the elimination of incorrect components added. It also results in the process being optimized. Staffing costs are also optimized.

This method may be targeted to Type A and B production customers, as well as some Type C customers. The customer benefit tool of the present invention works well with this method to provide to the customer: the impact of different line configurations on OEE/COO; the impact of material run out on OEE/COO; the impact of incorrect material replenishment on OEE/COO; the Impact of Process Yields on OEE/COO; and the Impact of different staffing strategies on COO/OEE.

Figure 30:
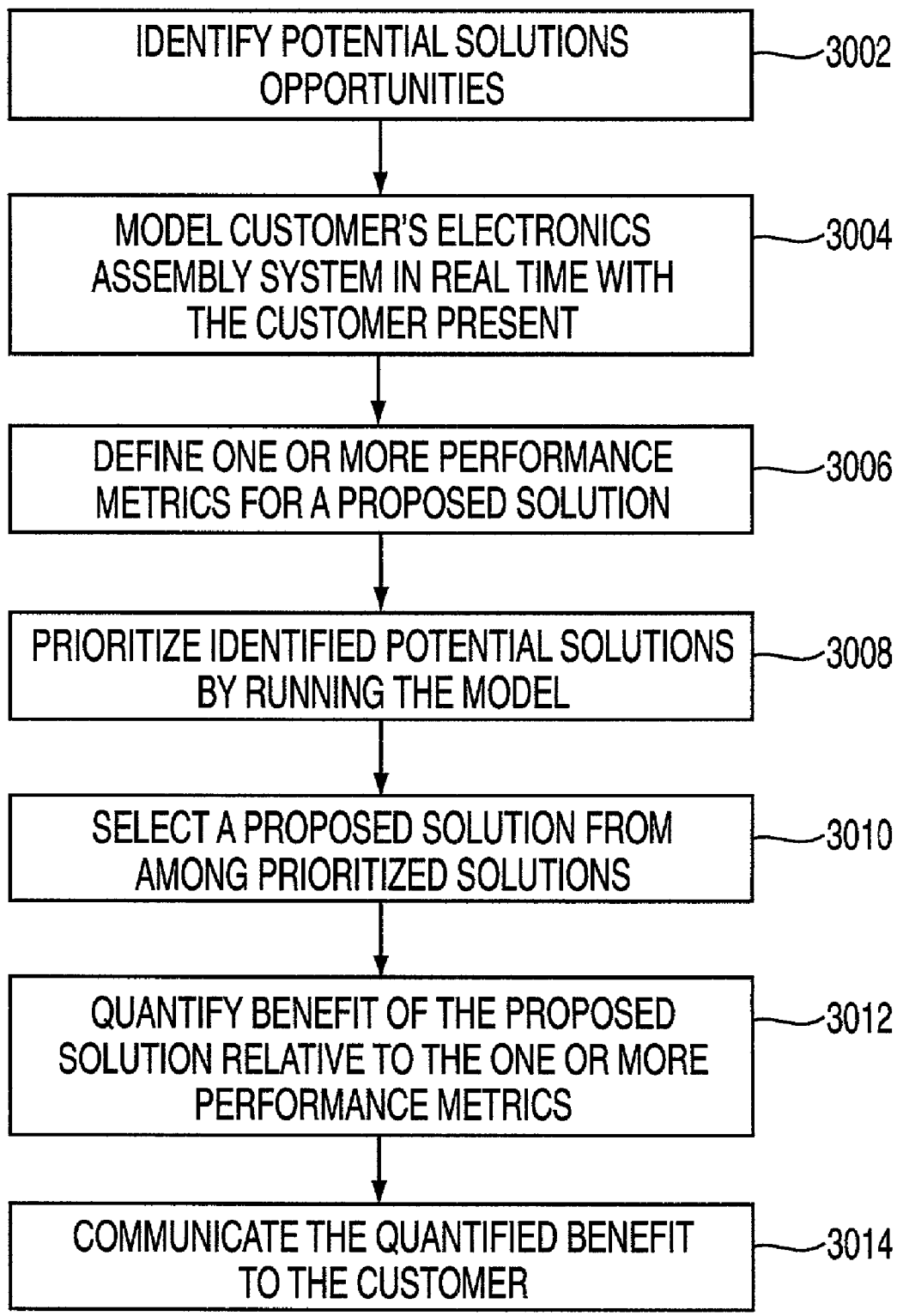
FIG. 30 is a flowchart illustrating an embodiment of a consultative sales method according to the present invention.

An embodiment of a consultative sales method according to the present invention is shown in flowchart form in FIG. 30. This embodiment of the method, like those described below, may be implemented over any time frame, but may be most suitable for performing during a consultation or sales session with the customer. First, at 3002, the consultant or salesperson, after becoming familiar with the customer's electronics assembly system needs, identifies a corresponding set of one or more potential solutions opportunities. The solutions opportunities may involve any combination of equipment and parameter settings that may be involved in the design and/or configuration of an electronics assembly system. At 3004, the consultant or salesperson models the customer's electronics assembly system, which is preferably done in "real time," that is with the customer present, using the methods and tools described above. In this embodiment, as with the others described herein, this approach is done using a laptop computer on which all the necessary functionality for the methods according to the present invention have been programmed.

At 3006, one or more performance metrics may be defined for the electronics assembly system. This definition can occur at any time prior to evaluating the system, and could well be determined prior to the consulting or sales meeting by the customer. At step 3008, the potential solutions are prioritized by including them in the model and running the model under these configurations, and then by comparing them with each other and possibly with the one or more performance metrics. At step 3010, one or more proposed solutions may be selected from among those that have been prioritized, preferably, although not necessarily, according to their priority. At step 3012, the benefit of the proposed solution or solutions are quantified, again according to the methods described above. When the quantified benefit(s) have been computed, they can then be communicated to the customer for his or her consideration.

Figure 31:
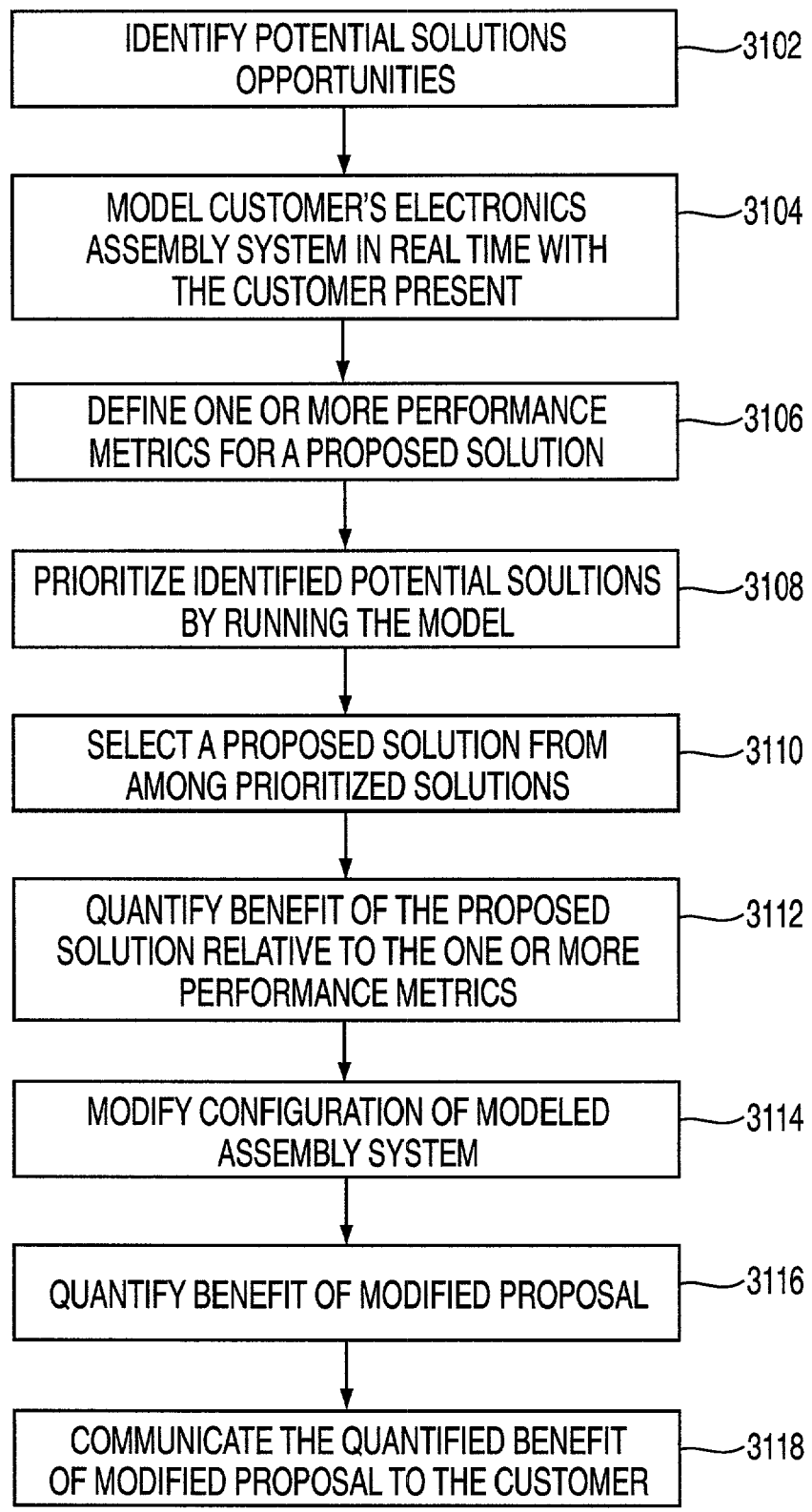
FIG. 31 is a flowchart illustrating an alternative to the embodiment of FIG. 30, which steps providing for the modification of a proposed assembly system solution.

Referring to FIG. 31, steps 3102 to 3112 are similar to the corresponding and like numbered steps of the flowchart in FIG. 30. At step 3114, the configuration of the modeled assembly system under the one or more potential solutions may be modified, which could be the case, for example, if the results of the modeling of those potential solutions (as evidenced, e.g., in the performance metrics) did not compare favorably with customer needs and/or expectations. In this event, the benefit(s) of the modified proposal(s) are again quantified at 3116 (which would involve running the model again under the modifications), at which point a final quantified benefit may be presented to the customer. Steps 3114 and 3116 could be repeated as necessary, time permitting, to explore various configuration options, or to search for new possible solutions in the event that the predicted performance of the previous potential solutions have not approached customer needs.

Figure 32:
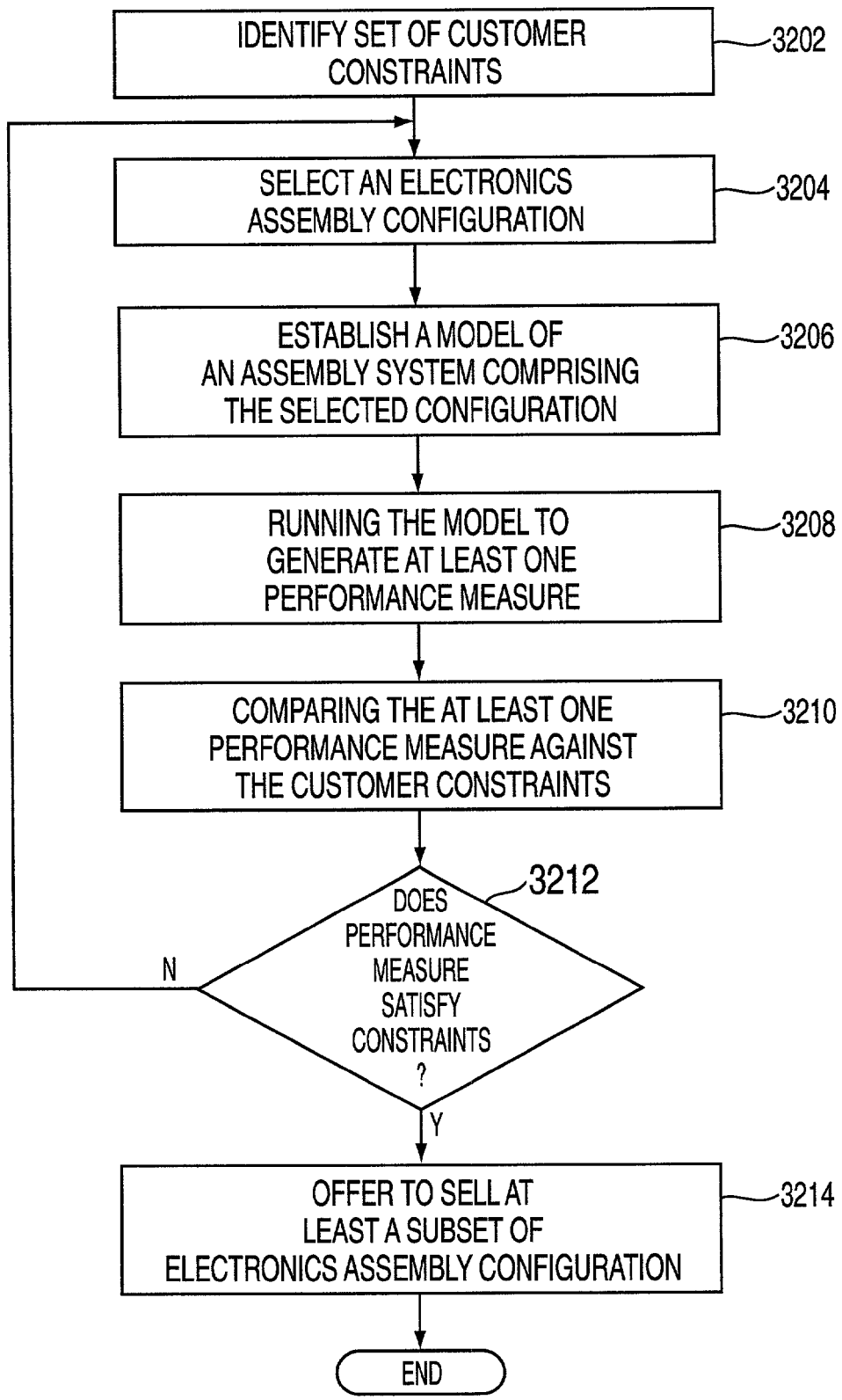
FIG. 32 is a flowchart illustrating an embodiment of a consultative sales method according to the present invention, in which the configuration, modeling and evaluation of electronics assembly configurations is performed in an iterative manner until a performance measure satisfies one or more customer constraints and an offer is made.

Another embodiment of a consultative sales method according to the present invention is shown in FIG. 32, in which the configuration, modeling and evaluation of electronics assembly configurations is performed in an iterative manner until a performance measure satisfies one or more customer constraints. A set of customer constraints, needs, or expectations are first identified, at 3202. As described above, this identification, and the rest of the method, can ideally be done according to the present invention, in real time (or "on the fly") during the course of a particular consultation or sales meeting with the customer. At 3204, an electronics assembly configuration (or solution) is selected. Then, at 3206, a model is established for the customer electronics assembly system comprising the selected configuration. The model is run, at 3208, to generate at least one performance measure (which as in the embodiment of FIG. 30 should have been arrived at in advance). The at least one performance measure is then compared, at 3210, against the customer constraints. If, as determined at 3212, the at least one performance measure does not satisfy customer constraints, then a new electronics assembly configuration or solution can be selected, at step 3204, and the process is repeated. If, however, the performance measures, as determined by the modeling process, do meet customer constraints, then at 3214, the consultant or salesperson may offer to sell to the customer at least a subset of the solution or of the electronics assembly equipment associated with that configuration or solution.

Figure 33:
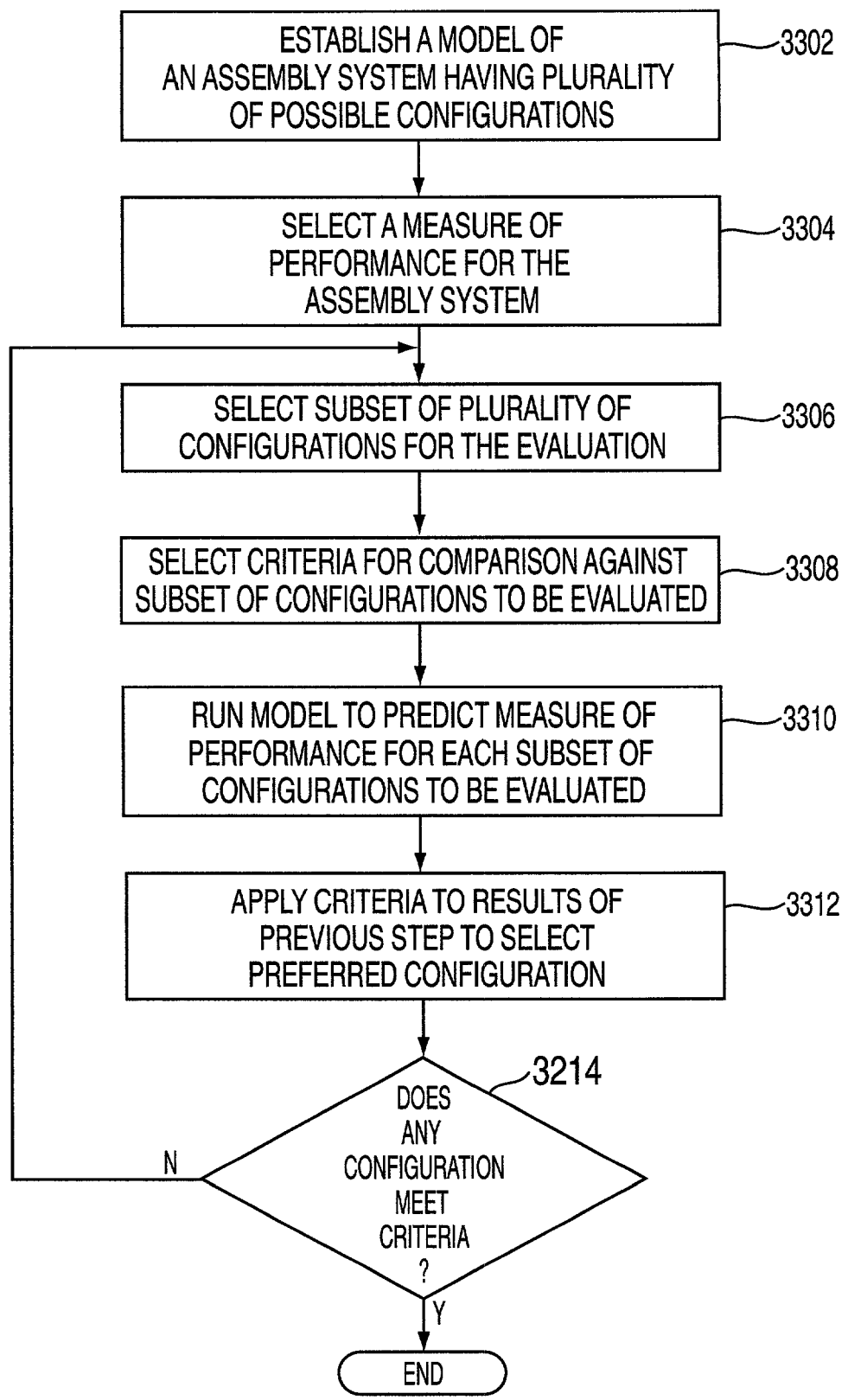
FIG. 33 is a flowchart illustrating an alternative embodiment of a consultative sales method according to the present invention, in which the configuration, modeling and evaluation of electronics assembly configurations are performed.

Turning to FIG. 33, an alternative embodiment of a consultative sales method according to the present invention involves first establishing at 3302 a model of a customer's electronics assembly system, which can have a plurality of possible configurations or solutions. A measure of performance for the assembly system is selected, as in the descriptions presented above, in accordance with customer needs at step 3304, and a subset of the plurality of the configurations (which may be all the configurations) are selected for evaluation. At step 3308, a set of one or more criteria or selected for comparison against the subset of the evaluated configurations. The criteria could, alternatively, have been set well in advance of the method by the customer alone, or by the customer with the assistance of the consultant/salesperson, or, as shown, might theoretically be modified if appropriate during iterations of the approach. The model is then run, at 3310, to generate a predicted measure of performance for each of the subset of configurations selected at 3306 to be evaluated. The results are compared at 3312 to the criteria in order to select at least one preferred configuration. If, as determined at step 3314, it is determined that none of the configurations or solutions meets the customer criteria, control is returned to step 3306, where a new set of configurations or solutions may be selected or otherwise arrived at. If, on the other hand, an evaluated configuration or solution meets the customer's criteria, then the method is complete, but could be followed by any number of follow sales scenarios. As before, this consultative sales process is preferably implemented using the methods and tools described above in the course of a consultation or sales meeting with a customer.

Another aspect of the present invention concerns methods for pricing or financing electronics assembly solution or equipment purchases. This aspect of the present invention is based on the recognition of the potential value of customer benefit sharing in the electronics assembly industry, as well as in the practicability of such an approach given the methods and tools for modeling and evaluating such systems, as described above.

Figure 34:
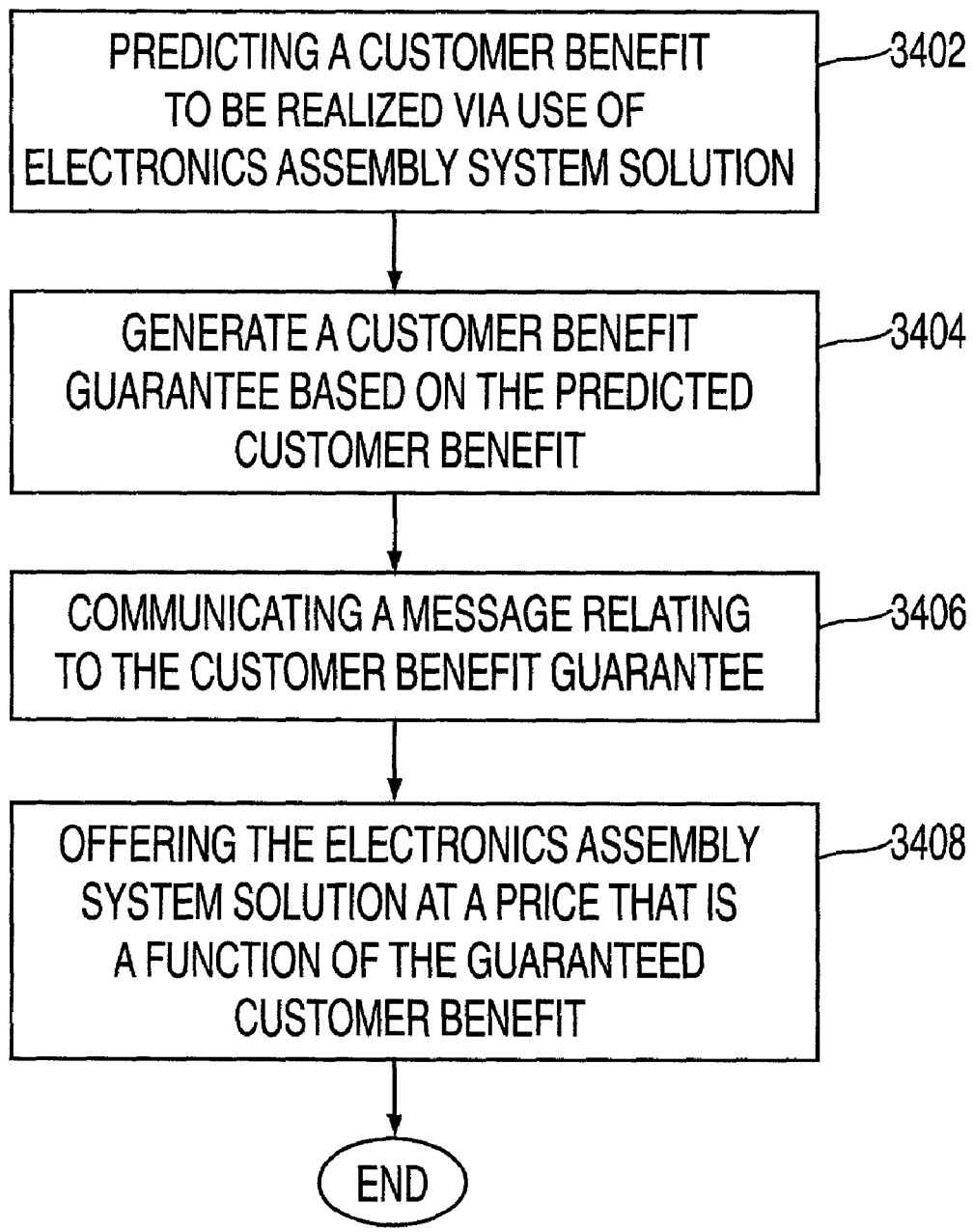
FIG. 34 is a flowchart illustrating a method for pricing an electronics assembly system solution.

One customer benefit sharing approach according to the present invention is shown in the flowchart of FIG. 34, which is directed to a method for pricing an electronics assembly system solution or configuration. A customer benefit that might be realized through the adoption of a proposed electronics assembly solution or configuration is predicted (e.g., using the methods and tools described above) at step 3402. A customer benefit computation may involve any measure that affects a customer's actual or perceived valuation for an electronics assembly system, including without limitation, the cost of ownership of the electronics assembly system, described above and in the literature. The purveyor of electronics assembly equipment, or of solutions involving such equipment, may then generate, at step 3406, a customer benefit guarantee associated with the electronics assembly solution. The purveyor's ability to generate such a guarantee with any comfort stems from its ability to effectively use the methods and tools for customer benefit modeling described above. When a customer benefit guarantee has been arrived at, it is then communicated to the customer at step 3406. The purveyor can then, at step 3408, offer the electronics assembly system configuration or solution to the customer at a price that is a function of the guaranteed customer benefit. For example, the price may be set as a mutually agreeable percentage of the guaranteed benefit, so that, from the customer's perspective, the electronics assembly configuration or solution is seen as "paying for itself" in real economic terms. In addition, consistent with the guarantee, the purveyor could bind itself to receive compensation, or full compensation, only if the guaranteed customer benefit were actually to be realized.

Figure 35:
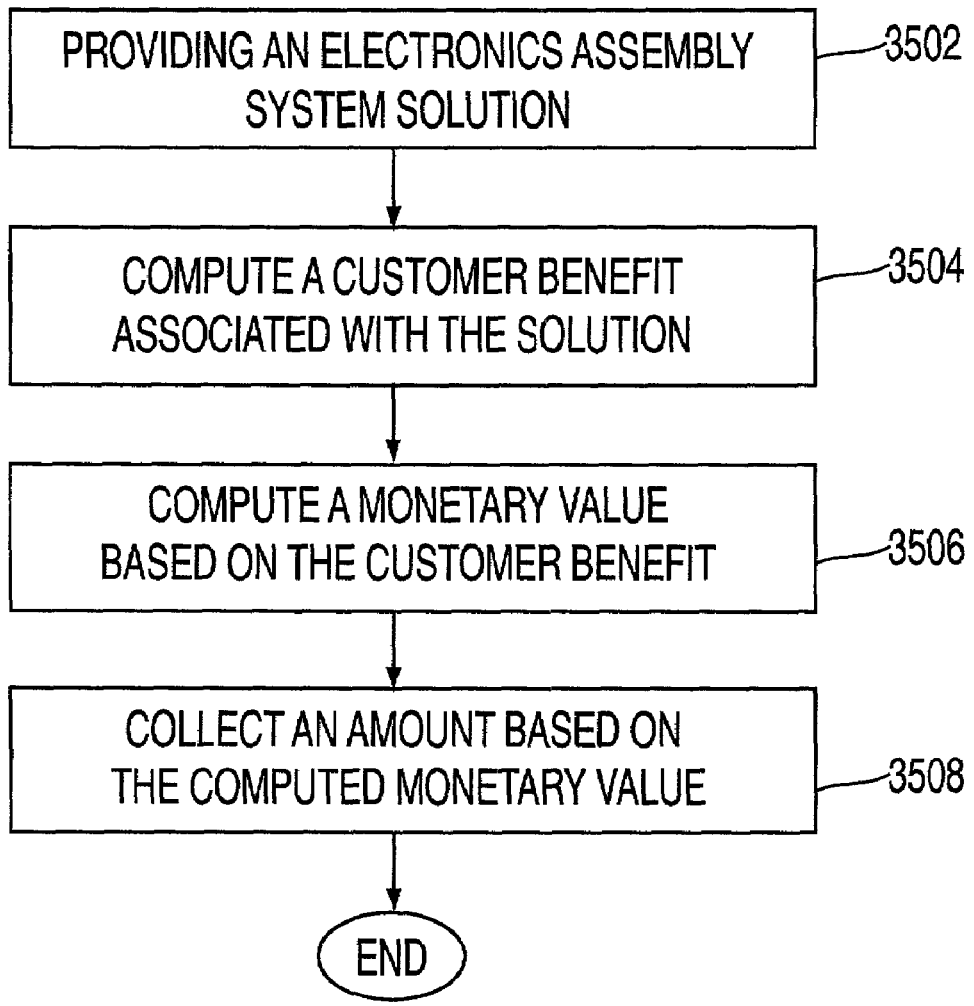
FIG. 35 is a flowchart illustrating a method for financing the price of a customer's purchase of an electronic assembly system solution.

FIG. 35 shows an alternative approach for a purveyor of electronics assembly equipment and/or solutions involving such equipment and/or related services, to engage in benefit sharing with a customer. At step 3502, an electronics assembly system solution or configuration is defined and the definition provided for customer consideration. A customer benefit associated with the provided solution or configuration is computer at 3504 above, and a monetary value based on the customer benefit is computed at 3506, both steps in accordance with the techniques described. Finally, an economic amount based on the computed monetary value is collected from the customer, at step 3508. The collectible amount could be, for example, a fraction of the monetary value of the customer benefit computed at step 3506, which fraction could be the subject of negotiation between the purveyor of electronics assembly equipment or solutions and the customer. Alternatively, the collectible amount could be a function of the customer benefit actually realized, which would involve monitoring the actual performance of the electronics assembly system or solution purchased by the customer.

Figure 36:
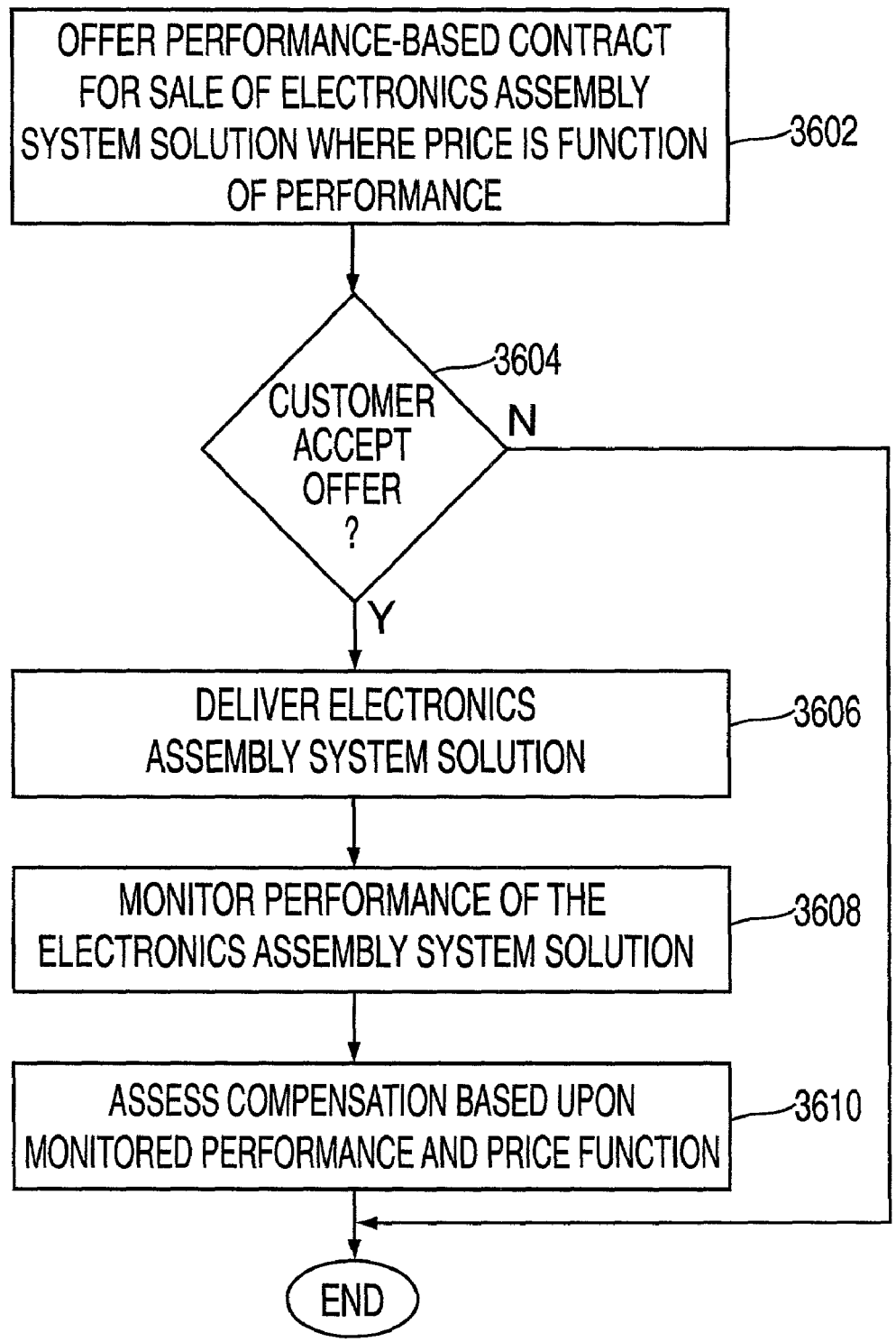
FIG. 36 is a flowchart illustrating a method for selling a customer an electronic assembly system solution.

FIG. 36 provides a flowchart showing a method for selling a customer an electronic assembly system solution according to a performance-based contract. The purveyor of electronic assembly systems or solutions offers, at 3602, a performance based contract for a particular sale, where the price associated with the contract is set as a function of the performance of the system or solution that is being offered for sale. If the customer accepts the offer, as determined at 3604, the electronics assembly system solution (which may comprise assembly equipment), is delivered to the customer at 3606. If at 3604 the customer did not accept the offer, the method would be complete, although it could be re-initiated with a modified offer at 3602. Following the delivery at step 3606, the performance of the deliverables are monitored at step 3608. Based on the monitored performance, as well as on the price function set at 3602, the purveyor's compensation—i.e., the price for the deliverables—is assessed. In this way, the benefit to the customer is shared between the customer and the purveyor. Actual payment could either be made in advance, with adjustments made as the performance-based assessments are made, or could be made following the assessments, depending upon the two parties' preferences. As with the previous examples, the purveyor's ability to comfortably enter into this type of transaction depends at least in part upon an ability to adequately model the expected customer benefit in advance, which can be done using the methods and tools described in this application.

In addition to the embodiments of the aspects of the present invention described above and in the code listings set forth herein, those of skill in the art will be able to arrive at a variety of other arrangements and steps which, if not explicitly described in this document, nevertheless embody the principles of the invention and fall within the scope of the appended claims.

What is claimed is:

1. A method for modeling an electronic components assembly system, the method comprising:

representing equipment having specific operating parameters in a proposed line configuration;
for each piece of equipment in the proposed line configuration, associating values for the specific operating parameters;
building a simulation;
running the simulation on a computer; and
generating a report for the simulation,
wherein the steps of representing the equipment having specific operating parameters in a proposed line configuration, associating values for the specific operating parameters for each piece of equipment in the proposed line configuration, and building a simulation are performed within approximately thirty minutes.

2. The method according to claim 1, wherein the step of building the simulation further comprises building simulation objects from templates.

3. The method of claim 2, wherein the templates are completed with values for specific operating parameters.

4. The method of claim 3, further comprising the step of customizing the simulation report.

5. A method for configuring an electronics assembly system, comprising the steps of:
  a. generating a model of an assembly system having a first configuration;
  b. selecting a measure of performance for the assembly system;
  c. selecting a criterion for the evaluation of the measured performance of the assembly system;
  d. running the model on a computer to generate a performance measure for the system having the first configuration;
  e. testing whether the measure of performance satisfies the criterion; and
  f. if in the test of step d the criterion is not satisfied, modifying the configuration,
  wherein the performance measure is a cost of ownership of the electronics assembly system.

6. A method for configuring an electronics assembly system, comprising the steps of:
  a. generating a model of an assembly system having a first configuration;
  b. selecting a measure of performance for the assembly system;
  c. selecting a criterion for the evaluation of the measured performance of the assembly system;
  d. running the model on a computer to generate a performance measure for the system having the first configuration;
  e. testing whether the measure of performance satisfies the criterion; and
  f. if in the test of step d the criterion is not satisfied, modifying the configuration,
  wherein the model is generated within approximately one half hour.

7. The method according to claim 5, wherein the criterion is a value for the cost of ownership of the electronics assembly system.

8. The method according to claim 5, wherein the model represents the assembly system at the material flow level of abstraction.

9. The method according to claim 5, wherein the step of generating the model comprises the steps of:
  selecting components from a set of such components that have been at least partially modeled in advance and;
  entering values corresponding to the selected, at least partially modeled components,
  wherein the selected components and entered values serve as the basis for a simulation of the system.

10. A method for configuring an electronics assembly system, comprising the steps of:
  a. generating a model of an assembly system having a first configuration;
  b. selecting a measure of performance for the assembly system;
  c. selecting a criterion for the evaluation of the measured performance of the assembly system;
  d. running the model on a computer to generate a performance measure for the system having the first configuration;
  e. testing whether the measure of performance satisfies the criterion; and
  f. if in the test of step d the criterion is not satisfied, modifying the configuration,
  wherein the model is generated using a spreadsheet program in combination with a simulation program.

11. A method for configuring an electronics assembly system, comprising the steps of:
  a. generating a model of an assembly system having a first configuration;
  b. selecting a measure of performance for the assembly system;
  c. selecting a criterion for the evaluation of the measured performance of the assembly system;
  d. running the model on a computer to generate a performance measure for the system having the first configuration;
  e. testing whether the measure of performance satisfies the criterion; and
  f. if in the test of step d the criterion is not satisfied, modifying the configuration,
  wherein information relating to at least one method step is transmitted over a network.

12. A computer system configured to model an electronic component assembly line, comprising:
  means for selecting, from a predetermined list, specific equipment for a proposed line configuration, the specific equipment having operating parameters;
  means for associating predetermined values with the operating parameters;
  means for performing a simulation; and
  means for generating a report,
  wherein the means for selecting specific equipment for a proposed line configuration is a spreadsheet.

13. The computer system of claim 12, wherein the means for associating predetermined values with the operating parameters is a macro that copies values for the operating parameters from a database.

14. The computer system of claim 13, wherein the database is a second spreadsheet.

15. The computer system of claim 14, wherein the means for performing a simulation is discrete event simulation software.

16. The computer system of claim 15, wherein the means for generating a report is a third spreadsheet.

17. The computer system of claim 16, wherein the third spreadsheet contains user selectable inputs for generating custom reports.

18. A method for assembling an electronic apparatus, comprising:
  a. creating an electronics assembly system configuration by:
    i. selecting assembly system components using a customer benefit modeling approach, ii. purchasing the components, and
iii. installing the components;
b. selecting settings of electronics assembly system parameters using a customer benefit modeling approach;
c. imposing those settings on the electronics assembly system; and
d. running the electronics assembly system to produce the electronic apparatus, wherein the customer benefit modeling approach comprises generating a model of the electronics assembly system having a given configuration, predicting on a computer a performance measure for the electronics assembly system having the given configuration using the model, comparing the predicted performance measure against a criterion to determine if the criterion is met by the predicted performance, and, if the predicted performance does not meet the criterion, modifying the configuration of the electronics assembly system, and wherein the model comprises a spreadsheet component and a simulation model component.

19. The method according to claim 18, wherein the model represents the assembly system at the material flow level of abstraction.

* * * * *